(12) United States Patent
Apte et al.

(10) Patent No.: US 10,920,674 B2
(45) Date of Patent: *Feb. 16, 2021

(54) VARIABLE PRESSURE INVENTORY CONTROL OF CLOSED CYCLE SYSTEM WITH A HIGH PRESSURE TANK AND AN INTERMEDIATE PRESSURE TANK

(71) Applicant: Malta Inc., Cambridge, MA (US)

(72) Inventors: Raj Apte, Mountain View, CA (US); Philippe Larochelle, Mountain View, CA (US)

(73) Assignee: MALTA INC., Cambridge, MA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/576,329

(22) Filed: Sep. 19, 2019

(65) Prior Publication Data

US 2020/0025042 A1  Jan. 23, 2020

Related U.S. Application Data

(63) Continuation of application No. 15/392,927, filed on Dec. 28, 2016, now Pat. No. 10,458,284.

(51) Int. Cl.
*F02C 9/24* (2006.01)
*F01K 13/02* (2006.01)
(Continued)

(52) U.S. Cl.
CPC ............... *F02C 9/24* (2013.01); *F01D 15/10* (2013.01); *F01K 3/02* (2013.01); *F01K 3/06* (2013.01);
(Continued)

(58) Field of Classification Search
CPC .... F02C 1/00; F02C 1/005; F02C 1/02; F02C 1/04; F02C 1/08; F02C 1/10; F02C 1/105;
(Continued)

(56) References Cited

U.S. PATENT DOCUMENTS 1,576,019 A   3/1926 Samuel et al.
1,758,567 A   5/1930 Fernandez et al.
(Continued)

FOREIGN PATENT DOCUMENTS

DE   2904232 A1   12/1980
DE   2928691 A1   2/1981
(Continued)

OTHER PUBLICATIONS

Ackeret et al., "Aerodynamic Heat-Power Engine Operating on a Closed Cycle," NACA Technical Memorandum, No. 1034, Nov. 1942, 35 pages.
(Continued)

*Primary Examiner* — Mark A Laurenzi
*Assistant Examiner* — Mickey H France
(74) *Attorney, Agent, or Firm* — Barnes & Thornburg LLP

(57) ABSTRACT

Systems and methods for variable pressure inventory control of a closed thermodynamic cycle power generation system or energy storage system, such as a reversible Brayton cycle system, with at least a high pressure tank and an intermediate pressure tank are disclosed. Operational parameters of the system such as working fluid pressure, turbine torque, turbine RPM, generator torque, generator RPM, and current, voltage, phase, frequency, and/or quantity of electrical power generated and/or distributed by the generator may be the basis for controlling a quantity of working fluid that circulates through a closed cycle fluid path of the system.

20 Claims, 33 Drawing Sheets

(51) Int. Cl.

| | | |
|---|---|---|
| F01K 25/10 | (2006.01) | |
| F01D 15/10 | (2006.01) | |
| F01K 3/06 | (2006.01) | |
| F22B 1/00 | (2006.01) | |
| F01K 3/18 | (2006.01) | |
| F01K 7/38 | (2006.01) | |
| F01K 3/02 | (2006.01) | |
| F01K 3/12 | (2006.01) | |
| F02C 1/04 | (2006.01) | |
| F02C 1/10 | (2006.01) | |
| F02C 9/16 | (2006.01) | |
| F01K 25/06 | (2006.01) | |

(52) U.S. Cl.
CPC ............... *F01K 3/12* (2013.01); *F01K 3/18* (2013.01); *F01K 7/38* (2013.01); *F01K 13/02* (2013.01); *F01K 25/103* (2013.01); *F02C 1/04* (2013.01); *F02C 1/10* (2013.01); *F02C 1/105* (2013.01); *F02C 9/16* (2013.01); *F22B 1/006* (2013.01); *F01K 25/06* (2013.01); *Y02E 20/16* (2013.01)

(58) Field of Classification Search
CPC .... F02C 9/16; F02C 9/24; F25B 11/00; F25B 11/02; F25B 25/00; F25B 25/02; F25B 25/005; F01K 13/02; F01K 25/00; F01K 3/02; F01K 3/06; F01K 3/12; F01K 3/18; F01K 7/38; F01K 25/103; F01K 25/06; F01D 15/10; F22B 1/006; Y02E 20/16
USPC .......... 60/643, 614–620, 645–647, 650, 652, 60/659, 660, 682, 684
See application file for complete search history.

(56) References Cited

U.S. PATENT DOCUMENTS

| | | |
|---|---|---|
| 1,881,965 A | 10/1932 | Moroni et al. |
| 2,065,974 A | 12/1936 | Fritz et al. |
| 2,171,253 A | 8/1939 | Day et al. |
| 2,172,910 A | 9/1939 | Curt et al. |
| 2,203,731 A | 6/1940 | Curt et al. |
| 2,246,513 A | 6/1941 | Hammond et al. |
| 2,319,995 A | 5/1943 | Curt et al. |
| 2,336,178 A | 12/1943 | Curt et al. |
| 2,414,170 A | 1/1947 | Fritz et al. |
| 2,446,108 A | 7/1948 | Fritz et al. |
| 2,453,886 A | 11/1948 | Jakob et al. |
| 2,454,358 A | 11/1948 | Walter et al. |
| 2,566,817 A | 9/1951 | Edward et al. |
| 2,689,680 A | 9/1954 | Cyril et al. |
| 2,697,326 A | 12/1954 | Joseph et al. |
| 2,788,195 A | 4/1957 | John et al. |
| 2,791,204 A | 5/1957 | Andrus et al. |
| 2,820,348 A | 1/1958 | Josef et al. |
| 2,860,493 A | 11/1958 | Capps et al. |
| 2,911,792 A | 11/1959 | Herre et al. |
| 3,152,442 A | 10/1964 | Rowekamp et al. |
| 3,220,191 A | 11/1965 | Berchtold |
| 3,285,567 A | 11/1966 | Richardson et al. |
| 3,352,774 A | 11/1967 | Williams et al. |
| 3,537,517 A | 11/1970 | Doyle et al. |
| 3,630,022 A | 12/1971 | Jubb et al. |
| 3,797,516 A * | 3/1974 | Forster .............. F02C 9/24 137/340 |
| 3,818,697 A | 6/1974 | Gilli |
| 3,897,170 A | 7/1975 | Darvishian et al. |
| 3,955,359 A | 5/1976 | Yannone et al. |
| 4,024,908 A | 5/1977 | Meckler et al. |
| 4,054,124 A | 10/1977 | Knoos et al. |
| 4,089,744 A | 5/1978 | Cahn et al. |
| 4,094,148 A | 6/1978 | Nelson et al. |
| 4,110,987 A | 9/1978 | Cahn et al. |
| 4,117,682 A | 10/1978 | Smith et al. |
| 4,124,061 A | 11/1978 | Mitchell et al. |
| 4,126,291 A | 11/1978 | Gilbert et al. |
| 4,148,191 A | 4/1979 | Frutschi et al. |
| 4,158,384 A | 6/1979 | Brautigam et al. |
| 4,215,553 A | 8/1980 | Nussdorfer et al. |
| 4,362,290 A | 12/1982 | Marx et al. |
| 4,405,010 A | 9/1983 | Schwartz |
| 4,408,654 A | 10/1983 | Doomernik |
| 4,430,241 A | 2/1984 | Fiorucci |
| 4,438,630 A | 3/1984 | Rowe |
| 4,444,024 A | 4/1984 | McFee |
| 4,479,352 A | 10/1984 | Yamaoka et al. |
| 4,523,629 A | 6/1985 | Copeland |
| 4,566,668 A | 1/1986 | Koppenberg |
| 4,583,372 A | 4/1986 | Egan et al. |
| 4,628,692 A | 12/1986 | Pierce |
| 4,643,212 A | 2/1987 | Rothrock |
| 4,670,205 A | 6/1987 | Montierth |
| 4,715,576 A | 12/1987 | Montierth |
| 4,727,930 A | 3/1988 | Bruckner et al. |
| 5,131,231 A | 7/1992 | Trimble et al. |
| 5,160,689 A | 11/1992 | Kamen |
| 5,269,145 A | 12/1993 | Krause et al. |
| 5,537,822 A | 7/1996 | Shnaid et al. |
| 5,644,928 A | 7/1997 | Uda et al. |
| 5,653,656 A | 8/1997 | Thomas et al. |
| 5,653,670 A | 8/1997 | Endelman |
| 6,119,682 A | 9/2000 | Hazan |
| 6,532,745 B1 | 3/2003 | Neary |
| 6,629,413 B1 | 10/2003 | Wendt et al. |
| 6,634,410 B1 | 10/2003 | Wilson et al. |
| 6,644,062 B1 | 11/2003 | Hays |
| 6,701,711 B1 | 3/2004 | Litwin |
| 6,749,011 B2 | 6/2004 | Horng et al. |
| 6,787,116 B2 | 9/2004 | Williams et al. |
| 7,028,481 B1 | 4/2006 | Morrow |
| 7,086,231 B2 | 8/2006 | Pinkerton |
| 7,226,554 B2 | 6/2007 | Sudo et al. |
| 7,299,633 B2 | 11/2007 | Murphy et al. |
| 7,458,418 B2 | 12/2008 | Sienel |
| 7,603,858 B2 | 10/2009 | Bennett |
| 7,937,930 B1 | 5/2011 | Dunn |
| 7,954,320 B2 | 6/2011 | Ellensohn et al. |
| 7,954,321 B2 | 6/2011 | Shinnar |
| 8,113,011 B2 | 2/2012 | Howes et al. |
| 8,136,358 B1 | 3/2012 | Brostmeyer |
| 8,206,075 B2 | 6/2012 | White et al. |
| 8,403,613 B2 | 3/2013 | Van Der Meulen |
| 8,424,284 B2 | 4/2013 | Staffend et al. |
| 8,453,677 B2 | 6/2013 | Howes et al. |
| 8,496,026 B2 | 7/2013 | Howes et al. |
| 8,500,388 B2 | 8/2013 | Van Der Meulen et al. |
| 8,613,195 B2 | 12/2013 | Held et al. |
| 8,656,712 B2 | 2/2014 | Howes et al. |
| 8,671,686 B2 | 3/2014 | Pinkerton et al. |
| 8,826,664 B2 | 9/2014 | Howes et al. |
| 8,833,079 B2 | 9/2014 | Smith |
| 8,833,101 B2 | 9/2014 | Howes et al. |
| 8,863,641 B2 | 10/2014 | Howes |
| 8,904,793 B2 | 12/2014 | Hemrle et al. |
| 8,931,277 B2 | 1/2015 | Peterson et al. |
| 8,991,183 B2 | 3/2015 | Stiesdal |
| 9,316,121 B2 | 4/2016 | Davidson et al. |
| 9,518,786 B2 | 12/2016 | Howes et al. |
| 9,658,004 B2 | 5/2017 | Howes et al. |
| 9,932,830 B2 | 4/2018 | Laughlin |
| 10,012,448 B2 | 7/2018 | Laughlin et al. |
| 10,082,045 B2 | 9/2018 | Larochelle et al. |
| 10,082,104 B2 | 9/2018 | Apte |
| 10,094,219 B2 | 10/2018 | Laughlin |
| 10,221,775 B2 | 3/2019 | Apte et al. |
| 10,233,787 B2 | 3/2019 | Larochelle et al. |
| 10,233,833 B2 | 3/2019 | Apte et al. |
| 10,288,357 B2 | 5/2019 | Laughlin et al. |
| 10,436,109 B2 | 10/2019 | Apte et al. |
| 2001/0054449 A1 | 12/2001 | Jones et al. |
| 2003/0074900 A1 | 4/2003 | McFarland |
| 2003/0131623 A1 | 7/2003 | Suppes |

(56) References Cited

U.S. PATENT DOCUMENTS

| | | |
|---|---|---|
| 2004/0008010 A1 | 1/2004 | Ebrahim et al. |
| 2004/0042579 A1* | 3/2004 | Bolton .................... G21C 1/07 376/383 |
| 2004/0083731 A1 | 5/2004 | Lasker |
| 2004/0088980 A1 | 5/2004 | Emmel et al. |
| 2004/0099994 A1 | 5/2004 | Brinkhues |
| 2005/0126171 A1 | 6/2005 | Lasker |
| 2006/0053792 A1 | 3/2006 | Bourgeois |
| 2006/0137869 A1 | 6/2006 | Steinhauser |
| 2006/0185626 A1 | 8/2006 | Allen et al. |
| 2006/0248886 A1 | 11/2006 | Ma |
| 2007/0295673 A1 | 12/2007 | Enis et al. |
| 2008/0121387 A1 | 5/2008 | Taniguchi et al. |
| 2009/0126377 A1 | 5/2009 | Shibata et al. |
| 2009/0179429 A1 | 7/2009 | Ellis et al. |
| 2009/0293502 A1 | 12/2009 | Vandor |
| 2010/0024421 A1 | 2/2010 | Litwin et al. |
| 2010/0126171 A1 | 5/2010 | Smith |
| 2010/0175365 A1 | 7/2010 | Ota |
| 2010/0199694 A1 | 8/2010 | Taras et al. |
| 2010/0218500 A1 | 9/2010 | Ruer |
| 2010/0251712 A1 | 10/2010 | Nakhamkin |
| 2010/0275616 A1 | 11/2010 | Saji et al. |
| 2010/0301062 A1 | 12/2010 | Litwin et al. |
| 2010/0301614 A1 | 12/2010 | Ruer |
| 2010/0305516 A1 | 12/2010 | Xu et al. |
| 2011/0027066 A1 | 2/2011 | Ono et al. |
| 2011/0036091 A1 | 2/2011 | Waterstripe et al. |
| 2011/0100010 A1 | 5/2011 | Freund et al. |
| 2011/0100011 A1 | 5/2011 | Staffend |
| 2011/0100213 A1 | 5/2011 | Finkenrath et al. |
| 2011/0100356 A1 | 5/2011 | Bliesner |
| 2011/0100611 A1 | 5/2011 | Ohler et al. |
| 2011/0126539 A1 | 6/2011 | Ramaswamy et al. |
| 2011/0139407 A1 | 6/2011 | Ohler et al. |
| 2011/0146940 A1 | 6/2011 | Golbs et al. |
| 2011/0204655 A1 | 8/2011 | Waibel |
| 2011/0209496 A1 | 9/2011 | Horlyk et al. |
| 2011/0259007 A1 | 10/2011 | Aoyama et al. |
| 2011/0262269 A1 | 10/2011 | Lior |
| 2011/0277471 A1 | 11/2011 | Shinnar |
| 2011/0283700 A1 | 11/2011 | Zohar et al. |
| 2011/0289941 A1 | 12/2011 | Salazar et al. |
| 2011/0314839 A1 | 12/2011 | Brook et al. |
| 2012/0017622 A1 | 1/2012 | Kondo et al. |
| 2012/0039701 A1 | 2/2012 | Diddi et al. |
| 2012/0055661 A1 | 3/2012 | Feher |
| 2012/0060501 A1 | 3/2012 | Hemrle et al. |
| 2012/0067047 A1 | 3/2012 | Peterson et al. |
| 2012/0080161 A1 | 4/2012 | Kelly |
| 2012/0137684 A1 | 6/2012 | Yogev et al. |
| 2012/0222423 A1 | 9/2012 | Mercangoez et al. |
| 2012/0267955 A1 | 10/2012 | Zhan et al. |
| 2012/0308364 A1 | 12/2012 | Hofmann |
| 2012/0319410 A1 | 12/2012 | Ambrosek et al. |
| 2013/0033044 A1 | 2/2013 | Wright et al. |
| 2013/0045388 A1 | 2/2013 | Thenhaus |
| 2013/0105127 A1 | 5/2013 | Postma et al. |
| 2013/0111904 A1 | 5/2013 | Stiesdal |
| 2013/0118344 A1 | 5/2013 | Howes et al. |
| 2013/0125546 A1 | 5/2013 | Barmeier et al. |
| 2013/0147197 A1 | 6/2013 | Goebel et al. |
| 2013/0197704 A1 | 8/2013 | Pan et al. |
| 2013/0257056 A1 | 10/2013 | Ma |
| 2013/0266424 A1 | 10/2013 | Soehner |
| 2013/0276917 A1 | 10/2013 | Howes et al. |
| 2013/0318969 A1 | 12/2013 | Zhou et al. |
| 2014/0008033 A1 | 1/2014 | Howes et al. |
| 2014/0014290 A1 | 1/2014 | Howes et al. |
| 2014/0014302 A1 | 1/2014 | Gutai |
| 2014/0060051 A1 | 3/2014 | Ohler et al. |
| 2014/0075970 A1 | 3/2014 | Benson |
| 2014/0165572 A1 | 6/2014 | Pang et al. |
| 2014/0190659 A1 | 7/2014 | Laurberg |
| 2014/0224447 A1 | 8/2014 | Reznik et al. |
| 2015/0034188 A1 | 2/2015 | Howes |
| 2015/0069758 A1 | 3/2015 | Davidson et al. |
| 2015/0084567 A1 | 3/2015 | Howes |
| 2015/0113940 A1 | 4/2015 | Sinatov et al. |
| 2015/0114217 A1 | 4/2015 | Howes |
| 2015/0114591 A1 | 4/2015 | Howes et al. |
| 2015/0136115 A1 | 5/2015 | Bruch et al. |
| 2015/0167648 A1 | 6/2015 | Bergan |
| 2015/0211386 A1 | 7/2015 | Howes et al. |
| 2015/0260463 A1* | 9/2015 | Laughlin .................... F01K 3/00 165/10 |
| 2015/0267612 A1 | 9/2015 | Bannari |
| 2015/0361832 A1 | 12/2015 | Franke et al. |
| 2015/0372538 A1 | 12/2015 | Siegler et al. |
| 2016/0011617 A1 | 1/2016 | Liu et al. |
| 2016/0018134 A1 | 1/2016 | Ueda et al. |
| 2016/0030856 A1 | 2/2016 | Kaplan et al. |
| 2016/0032783 A1 | 2/2016 | Howes et al. |
| 2016/0047361 A1 | 2/2016 | Al-Sulaiman |
| 2016/0248299 A1 | 8/2016 | Ouvry |
| 2016/0290281 A1 | 10/2016 | Schmalz |
| 2017/0159495 A1 | 6/2017 | Laughlin et al. |
| 2017/0159496 A1 | 6/2017 | Laughlin et al. |
| 2017/0159497 A1 | 6/2017 | Laughlin et al. |
| 2017/0159498 A1 | 6/2017 | Laughlin et al. |
| 2017/0159499 A1 | 6/2017 | Laughlin et al. |
| 2017/0159500 A1 | 6/2017 | Laughlin et al. |
| 2017/0321967 A1 | 11/2017 | Laughlin et al. |
| 2017/0350658 A1 | 12/2017 | Kerth et al. |
| 2018/0179917 A1 | 6/2018 | Apte et al. |
| 2018/0179955 A1 | 6/2018 | Apte et al. |
| 2018/0180363 A1 | 6/2018 | Apte et al. |
| 2018/0185942 A1 | 7/2018 | Apte et al. |
| 2018/0187572 A1 | 7/2018 | Apte |
| 2018/0187595 A1 | 7/2018 | Apte et al. |
| 2018/0187597 A1 | 7/2018 | Apte et al. |
| 2018/0187627 A1 | 7/2018 | Apte et al. |
| 2019/0003308 A1 | 1/2019 | Laughlin |
| 2019/0030593 A1 | 1/2019 | Merrill et al. |
| 2019/0162082 A1 | 5/2019 | Larochelle et al. |
| 2019/0162116 A1 | 5/2019 | Apte et al. |
| 2019/0162122 A1 | 5/2019 | Apte et al. |
| 2019/0195571 A1 | 6/2019 | Laughlin et al. |
| 2019/0212070 A1 | 7/2019 | Laughlin et al. |

FOREIGN PATENT DOCUMENTS

| | | |
|---|---|---|
| DE | 3118101 A1 | 2/1983 |
| DE | 202013004654 U1 | 8/2014 |
| EP | 0003980 A1 | 9/1979 |
| EP | 1577548 A1 | 9/2005 |
| EP | 1857614 A2 | 11/2007 |
| EP | 2241737 A1 | 10/2010 |
| EP | 2275649 A1 | 1/2011 |
| EP | 2312129 A1 | 4/2011 |
| EP | 2390473 A1 | 11/2011 |
| EP | 2400120 A1 | 12/2011 |
| EP | 2441925 A1 | 4/2012 |
| EP | 2441926 A1 | 4/2012 |
| EP | 2532843 A1 | 12/2012 |
| EP | 2905432 B1 | 4/2018 |
| GB | 2501795 A | 11/2013 |
| JP | H03286103 A | 12/1991 |
| JP | H0868341 A | 3/1996 |
| JP | H0893633 A | 4/1996 |
| JP | 2000154733 A | 6/2000 |
| JP | 2011106755 A | 6/2011 |
| KR | 20040045337 A | 6/2004 |
| KR | 20120042921 A | 5/2012 |
| KR | 101370843 B1 | 3/2014 |
| KR | 20150089110 A | 8/2015 |
| RU | 2012104762 A | 8/2013 |
| WO | 2005019756 A2 | 3/2005 |
| WO | WO-2011099891 A1 | 8/2011 |
| WO | 2011161094 A2 | 12/2011 |
| WO | 2013037658 A1 | 3/2013 |
| WO | 2013094905 A1 | 6/2013 |
| WO | 2013119145 A2 | 8/2013 |
| WO | 2013164563 A1 | 11/2013 |

(56) References Cited

FOREIGN PATENT DOCUMENTS

| WO | 2013164653 A1 | 11/2013 |
|---|---|---|
| WO | 2014027093 A1 | 2/2014 |
| WO | 2014052927 A1 | 4/2014 |
| WO | 2014114531 A1 | 7/2014 |
| WO | 2015185891 A1 | 12/2015 |
| WO | 2016000016 A1 | 1/2016 |
| WO | WO-2018125511 A2 | 7/2018 |

OTHER PUBLICATIONS

Al-Attab et al., "Externally Fired Gas Turbine Technology: A Review," Applied Energy, 2015, pp. 474-487, vol. 138.

Bammert et al., "Layout and Present Status of the Closed-Cycle Helium Turbine Plant Oberhausen," ASME 1974 International Gas Turbine Conference and Products Show, 1974, 9 pages.

Bammert et al., "Operation and Control of the 50-Mw Closed-Cycle Helium Turbine Oberhausen," ASME 1974 International Gas Turbine Conference and Products Show, Mar. 1974, 8 pages.

Bammert et al., "Status Report on Closed-Cycle Power Plants in the Federal Republic of Germany," Journal of Engineering for Power, Jan. 1977, pp. 37-46, vol. 99, No. 1.

Bammert et al., "Twenty-Five Years of Operating Experience With the Coal-Fired, Closed-Cycle Gas Turbine Cogeneration Plant at Coburg," Journal of Engineering for Power, Oct. 1983, 10 pages, vol. 105.

Baofix, Historical Review of Closed Cycle Gas Turbine (CCGT) Power Plants, Malta, 20 Pages.

Deuster et al., "Long-Time Operating Experiences with Oberhausen Closed-Cycle Gas-Turbine Plant," ASME 1970 International Gas Turbine Conference and Products Show, Jan. 1970, 15 pages.

Fraas et al., "Summary of Research and Development Effort on Closed-cycle Gas Turbines," Engineering Technology Division, Jun. 1981, 39 pages.

Keller et al., "Industrial Closed-Cycle Gas Turbines for Conventional and Nuclear Fuel," ASME 1967 Gas Turbine Conference and Products Show, 1967, 14 pages.

Keller et al., "Operating Experience and Design Features of Closed Cycle Gas Turbine Power Plants," the American Society of Mechanical Engineers (ASME) 1956 Gas Turbine Power Conference, Apr. 1956, 52 pages.

Keller et al., "The Aerodynamic Turbine in the Iron and Steel Works," Swiss Construction Newspaper, 1943, 7 pages, vol. 121/122.

Keller et al., "The Coal-Burning Closed-Cycle Gas Turbine," ASME 1961 Gas Turbine Power Conference and Exhibit, 1961, 7 pages.

La Fleur et al., "The Closed-Cycle Gas Turbine and Cryogenics: A New Application," ASME 1965 Gas Turbine Conference and Products Show, 1965, 5 pages.

McDonald et al., "Helium and Combustion Gas Turbine Power Conversion Systems Comparison," ASME 1995 International Gas Turbine and Aeroengine Congress and Exposition, Jun. 1995, 12 pages.

McDonald et al., "Helium Turbomachinery Operating Experience From Gas Turbine Power Plants and Test Facilities," Applied Thermal Engineering, 2012, pp. 108-142, vol. 44.

Morimoto et al., "The 2000kw Gas Turbine Plant," Mechanical Div., Engineering Department, 1956, pp. 63-68, vol. 2, No. 3.

Morimoto et al., "The First Closed-Cycle Gas Turbine Power Plant in Japan," Thermal Machine Div., Design Dep't., 1958, pp. 57-64, vol. 4, No. 3.

Non-Final Office Action dated Feb. 5, 2020, for U.S. Appl. No. 16/111,151, filed Aug. 23, 2018, 9 pages.

Olumayegun et al., "Closed-Cycle Gas Turbine for Power Generation: A State-of-the-Art Review," Fuel, Sep. 2016, pp. 694-717, vol. 180.

Pasch et al., "Supercritical Carbon Dioxide Closed Brayton Cycle: Development and Applications," Sandia National Laboratories, Albuquerque, NM (United States), 2014, 16 pages.

Rochau, Gary E., "Supercritical CO2 Brayton Cycle Development," Advance SMR Energy Conversion, Nuclear Energy, Jun. 2014, 23 pages.

Scott et al., "The Redesign and Simulated Test of a Small Closed Brayton Cycle Turbine-compressor Set for Nuclear Application," ASME 1969 Gas Turbine Conference and Products Show, 1969, 11 pages.

Taygun et al., "Conventional and Nuclear Gas Turbines for Combined Power and Heat Production," ASME 1970 International Gas Turbine Conference and Products Show, 1970, 9 pages.

Taygun F., "Discussion: Bureau of Mines Progress in Developing Open and Closed-Cycle Coal-Burning Gas Turbine Power Plants," Journal of Engineering for Power, Oct. 1966, pp. 320-322, vol. 88, No. 4.

Zabrasnsky M., et al., "Heat Capacities of Organic Compounds in the Liquid State I. C1 to C18 1-Alkanols," Journal of Physical and Chemical Reference Data, May 1990, vol. 19 (3), pp. 719-762.

Non-Final Office Action dated May 14, 2018, for U.S. Appl. No. 15/392,657, filed Dec. 28, 2016, 27 pages.

Non-Final Office Action dated Jan. 15, 2019, for U.S. Appl. No. 15/440,295, filed Feb. 23, 2017, 22 pages.

Non-Final Office Action dated Nov. 15, 2018, for U.S. Appl. No. 15/440,306, filed Feb. 23, 2017, 13 pages.

Non-Final Office Action dated Mar. 23, 2017 for U.S. Appl. No. 13/965,048, filed Aug. 12, 2013, 20 pages.

Non-Final Office Action dated May 25, 2018, for U.S. Appl. No. 15/393,874, filed Dec. 29, 2016.

Non-Final Office Action dated Feb. 26, 2015, for U.S. Appl. No. 12/932,775, filed Mar. 4, 2011, 14 pages.

Non-Final Office Action dated Mar. 26, 2019 for U.S. Appl. No. 15/392,523, filed Dec. 28, 2016, 9 pages.

Non-Final Office Action dated Jun. 28, 2018, for U.S. Appl. No. 15/392,927, filed Dec. 28, 2016, 11 pages.

Non-Final Office Action dated Mar. 28, 2013, for U.S. Appl. No. 12/932,775, filed Mar. 4, 2011, 12 pages.

Non-Final Office Action dated Jan. 31, 2017, for U.S. Appl. No. 14/668,610, filed Mar. 25, 2015, 38 pages.

Non-Final Office Action dated Oct. 31, 2018, for U.S. Appl. No. 15/440,289, filed Feb. 23, 2017, 25 pages.

Notice of Allowance dated Jul. 1, 2019 for U.S. Appl. No. 15/440,312, filed Feb. 23, 2017, 19 pages.

Notice of Allowance dated Jun. 3, 2019 for U.S. Appl. No. 15/440,289, filed Feb. 23, 2017, 23 pages.

Notice of Allowance dated Jun. 3, 2019 for U.S. Appl. No. 15/440,295, filed Feb. 23, 2017, 14 pages.

Notice of Allowance dated Jun. 5, 2018, for U.S. Appl. No. 15/392,571, filed Dec. 28, 2016, 11 pages.

Notice of Allowance dated Sep. 6, 2019 for U.S. Appl. No. 15/440,300, filed Feb. 23, 2017, 20 pages.

Notice of Allowance dated Apr. 8, 2019 for U.S. Appl. No. 15/440,297, filed Feb. 23, 2017, 5 pages.

Notice of Allowance dated Jul. 8, 2019, for U.S. Appl. No. 15/440,297, filed Feb. 23, 2017, 5 pages.

Notice of Allowance dated Apr. 9, 2019, for U.S. Appl. No. 15/440,306, filed Feb. 23, 2017, 2 pages.

Notice of Allowance dated Apr. 11, 2019 for U.S. Appl. No. 15/396,461, filed Dec. 31, 2016, 7 pages.

Notice of Allowance dated Mar. 11, 2019 for U.S. Appl. No. 15/440,306, filed Feb. 23, 2017, 8 pages.

Notice of Allowance dated Sep. 11, 2019 for U.S. Appl. No. 15/396,461, filed Dec. 31, 2016, 8 pages.

Notice of Allowance dated Jun. 15, 2018, for U.S. Appl. No. 15/395,040, filed Dec. 30, 2016, 12 pages.

Notice of Allowance dated Apr. 17, 2019 for U.S. Appl. No. 15/440,295, filed Feb. 23, 2017, 5 pages.

Notice of Allowance dated Feb. 19, 2019 for U.S. Appl. No. 15/440,300, filed Feb. 23, 2017, 8 pages.

Notice of Allowance dated Oct. 19, 2018 for U.S. Appl. No. 15/392,653, filed Dec. 28, 2016, 5 pages.

Notice of Allowance dated May 21, 2018 for U.S. Appl. No. 14/668,610, filed Mar. 25, 2015, 2 pages.

Notice of Allowance dated Jan. 22, 2019 for U.S. Appl. No. 15/440,308, filed Feb. 23, 2017, 3 pages.

(56) References Cited

OTHER PUBLICATIONS

Notice of Allowance dated Jul. 22, 2019 for U.S. Appl. No. 15/392,927, filed Dec. 28, 2016, 8 pages.
Notice of Allowance dated Apr. 26, 2018, for U.S. Appl. No. 14/668,610, filed Mar. 25, 2015, 12 pages.
Notice of Allowance dated Dec. 28, 2017, for U.S. Appl. No. 13/965,048, filed Aug. 12, 2013, 9 pages.
Notice of Allowance dated Jun. 28, 2019 for U.S. Appl. No. 15/440,306, filed Feb. 23, 2017, 5 pages.
Notice of Allowance dated May 28, 2019 for U.S. Appl. No. 15/440,300, filed Feb. 23, 2017, 8 pages.
Notice of Allowance dated Apr. 29, 2019 for U.S. Appl. No. 15/440,289, filed Feb. 23, 2017, 5 pages.
Notice of Allowance dated May 30, 2018 for U.S. Appl. No. 14/668,610, filed Mar. 25, 2015, 1 pages.
Notice of Allowance dated Dec. 31, 2018 for U.S. Appl. No. 15/393,874, filed Dec. 29, 2016, 5 pages.
Notice of Allowance dated May 31, 2018 for U.S. Appl. No. 12/932,775, filed Mar. 4, 2011, 10 pages.
Nunes V.M.B., et al., "Viscosity of Molten Sodium Nitrate," International Journal of Thermophysics, Nov. 2006, vol. 27 (6), pp. 1638-1649.
Parsons., "Cost Estimates for Thermal Peaking Power Plant," Parsons Brinckerhoff New Zealand Ltd, 2008, Version 2, 26 pages.
Peng Q., et al, "High-Temperature Thermal Stability of Molten Salt Materials," International Journal of Energy Research, Oct. 2008, vol. 32(12), pp. 1164-1174.
Pickett P.E., et al., "Heated Turbulent Flow of Helium-Argon Mixtures in Tubes," International Journal of Heat and Mass Transfer, May 1979, vol. 22 (5), pp. 705-719.
Raade JW., et al, "Development of Molten Salt Heat Transfer Fluid With Low Melting Point and High Thermal Stability," Journal of Solar Energy Engineering, Aug. 2011, vol. 133(3), pp. 031013-1 to 031013-6.
Ruer., et al, "Pumped Heat Energy Storage," 2010, vol. 1-14.
Silverman MD., et al., "Survey of Technology for Storage of Thermal Energy in Heat Transfer Salt," Oak Ridge National Laboratory, ORNL/TM-5682, Jan. 1977, 32 pages.
Turchi C., "NREL Advanced Concepts," Solar Energy Technologies Program Peer Review, May 2010, 13 pages.
U.S. Appl. No. 15/396,461, Notice of Allowance dated Sep. 3, 2019.
Vanco M.R., "Analytical Comparison of Relative Heat-Transfer Coefficients and Pressure Drops of Inert Gases and Their Binary Mixtures," U.S. National Aeronautics and Space Administration, Feb. 1965, 18 pages.
Way J., "Storing the Sun: Molten Salt Provides Highly Efficient Thermal Storage," LTD, Jun. 2008, 2 pages. http://www.renewableenergyworld.com/articles/2008/06/storing-the-sun-molten-salt-provides-highly-efficient-thermalstorage-52873.html.
Wesoff E., "Breakthrough in Energy Storage: Isentropic Energy," Feb. 2010, 3 pages,https://www.greentechmedia.com/articles/read/breakthrough-in-utility-scale-energy-storage-isentropic.
Yergovich T.W., et al, "Density and Viscosity of Aqueous Solutions of Methanol and Acetone from the Freezing Point to 10.degree. C," Journal of Chemical and Engineering Data, Apr. 1971, vol. 16(2), pp. 222-226.
Bauer T., et al., "Sodium Nitrate for High Temperature Latent Heat Storage," the 11th International Conference on Thermal Energy Storage—Effstock, Jun. 2009, 8 pages.
Boyce M.P., "Axial-Flow compressors", 2003 (date estimated), Internet, 33 pages.
Bradshaw R.W., et al., "Molten Nitrate Salt Development for Thermal Energy Storage in Parabolic Trough Solar Power Systems," ASME 2008 2nd International Conference on Energy Sustainability, ES2008-54174, 2008, vol. 2, pp. 631-637.
Desrues T., et al., "A Thermal Energy Storage Process for Large Scale Electric Applications," Applied Thermal Engineering, Apr. 2010, vol. 30 (5), pp. 425-432.

Dewing E.W., "Heat Capacities of Liquid Sodium and Potassium Nitrates," Journal of Chemical and Engineering, 1975, vol. 20(3), pp. 221-223.
Diguilio R.M., et al., "The Thermal Conductivity of the Molten NaN03—KN03 Eutectic Between 525 and 590 K," International Journal of Thermophysics, Jul. 1992, vol. 13 (4), pp. 575-592.
Final Office Action dated Jun. 12, 2019 for U.S. Appl. No. 15/392,927, filed Dec. 28, 2016, 42 pages.
Final Office Action dated Aug. 1, 2017, for U.S. Appl. No. 13/965,048, filed Aug. 12, 2013, 16 pages.
Final Office Action dated Apr. 2, 2019, for U.S. Appl. No. 15/440,312, filed Feb. 23, 2017, 13 pages.
Final Office Action dated Jun. 6, 2018 for U.S. Appl. No. 15/396,461, filed Dec. 31, 2016, 10 pages.
Final Office Action dated Nov. 6, 2015, for U.S. Appl. No. 12/932,775, filed Mar. 4, 2011, 15 pages.
Final Office Action dated Jan. 9, 2014 for U.S. Appl. No. 12/932,775, filed Mar. 4, 2011, 11 pages.
Final Office Action dated Feb. 19, 2019 for U.S. Appl. No. 15/440,289, filed Feb. 23, 2017, 10 pages.
Final Office Action dated Feb. 21, 2019 for U.S. Appl. No. 15/440,297, filed Feb. 23, 2017, 11 pages.
Final Office Action dated Aug. 22, 2016, for U.S. Appl. No. 13/965,048, filed Aug. 12, 2013, 13 pages.
Final Office Action dated Jul. 25, 2017 for U.S. Appl. No. 12/932,775, filed Mar. 4, 2011, 19 pages.
Final Office Action dated Sep. 25, 2017, for U.S. Appl. No. 14/668,610, filed Mar. 25, 2015, 28 pages.
Freeman E.S., "The Kinetics of the Thermal Decomposition of Sodium Nitrate and of the Reaction Between Sodium Nitrate and Oxygen," the Journal of Physical Chemistry, Nov. 1956, vol. 60 (11), pp. 1487-1493.
Frutschi H.U., "Closed-Cycle Gas Turbines," New York, ASME, 2005, Jan. 29, 2016. Retrieved from the internet: URL:http://ebooks.asmedigitalcollection.asme.org/books.aspx.
International Preliminary Report on Patentability for Application No. PCT/US2013/062469, dated Mar. 31, 2015, 9 pages.
International Search Report and Written Opinion of PCT Application No. PCT/US2013/062469, dated Jan. 2, 2014, 11 pages.
International Search Report and Written Opinion of PCT Application No. PCT/US2017/062117, dated Feb. 22, 2018, 17 pages.
International Search Report and Written Opinion of PCT Application No. PCT/US2017/063289, dated Apr. 16, 2018, 17 pages.
International Search Report and Written Opinion of PCT Application No. PCT/US2017/063519, dated Apr. 12, 2018, 16 pages.
International Search Report and Written Opinion of PCT Application No. PCT/US2017/063521, dated Mar. 12, 2018, 18 pages.
International Search Report and Written Opinion of PCT Application No. PCT/US2017/064074, dated Feb. 26, 2018, 13 pages.
International Search Report and Written Opinion of PCT Application No. PCT/US2017/064076, dated Jul. 30, 2018, 15 pages.
International Search Report and Written Opinion of PCT Application No. PCT/US2017/064839, dated Mar. 20, 2018, 13 pages.
International Search Report and Written Opinion of PCT Application No. PCT/US2017/065200, dated Mar. 26, 2018, 15 pages.
International Search Report and Written Opinion of PCT Application No. PCT/US2017/065201, dated Mar. 27, 2018, 13 pages.
International Search Report and Written Opinion of PCT Application No. PCT/US2017/065643, dated Mar. 29, 2018, 17 pages.
International Search Report and Written Opinion of PCT Application No. PCT/US2017/065645, dated Mar. 26, 2018, 16 pages.
International Search Report and Written Opinion of PCT Application No. PCT/US2017/067049, dated Mar. 29, 2018, 16 pages.
Isentropic, "A new era in electrical energy storage and recovery," 2014, http://www.isenlropic.co.uk/our-phesechnology, 2 pages.
Kupiec H., "Chamfer or Fillet: It's More than a Coin Toss," 2016, Engineering.com, 3 pages, Retrieved from the Internet: URL:https://www.engineering.com/AdvancedManufacturing/ArticleID/12682/Chamfer-or-Fillet-Its-More-Than-a-Coin-Toss.aspx.
Laughlin et al., U.S. Appl. No. 61/706,337, filed Sep. 27, 2012, 28 pages.
Laughlin et al., U.S. Appl. No. 61/868,070, filed Aug. 20, 2013, 31 pages.

(56) References Cited

OTHER PUBLICATIONS

Laughlin R., "Here Comes the Sun," Stanford Physics Department Colloquium, Jan. 2010, 23 pages.
Laughlin R.B., U.S. Appl. No. 61/339,577, filed Mar. 4, 2010, 18 pages.
MacNaghten J., "Commercial potential of different large scale thermal storage technologies under development globally," Isentropic LTD, Jun. 2016, 21 pages.
Non-Final Office Action dated Apr. 1, 2019 for U.S. Appl. No. 15/393,891, filed Dec. 29, 2016, 13 pages.
Non-Final Office Action dated Nov. 1, 2018, for U.S. Appl. No. 15/440,297, filed Feb. 23, 2017, 11 pages.
Non-Final Office Action dated Nov. 3, 2016, for U.S. Appl. No. 12/932,775, filed Mar. 4, 2011, 17 pages.
Non-Final Office Action dated Dec. 4, 2015, for U.S. Appl. No. 13/965,048, filed Aug. 12, 2013, 11 pages.
Non-Final Office Action dated Feb. 8, 2018, for U.S. Appl. No. 15/396,461, filed Dec. 31, 2016, 09 pages.
Non-Final Office Action dated Nov. 8, 2018, for U.S. Appl. No. 15/440,300, filed Feb. 23, 2017, 26 pages.
Non-Final Office Action dated Jan. 9, 2019, for U.S. Appl. No. 15/396,461, filed Dec. 31, 2016, 13 pages.
Non-Final Office Action dated Jan. 11, 2019, for U.S. Appl. No. 15/440,312, filed Feb. 23, 2017, 14 pages.
Non-Final Office Action dated Feb. 13, 2018, for U.S. Appl. No. 14/668,610, filed Mar. 25, 2015, 13 pages.
Non-Final Office Action dated May 14, 2018, for U.S. Appl. No. 15/392,653, filed Dec. 28, 2016, 26 pages.
Final Office Action dated Apr. 28, 2020 for U.S. Appl. No. 15/392,542, filed Dec. 28, 2016, 27 pages.
Final Office Action dated Apr. 8, 2020 for U.S. Appl. No. 15/395,622, filed Dec. 30, 2016, 28 pages.
Non-Final Office Action dated May 42020, for U.S. Appl. No. 16/289,017, filed Feb. 28, 2019, 84 pages.
Non-Final Office Action dated May 4, 2020, for U.S. Appl. No. 16/354,824, filed Mar. 15, 2019, 83 pages.
Non-Final Office Action dated Apr. 13, 2020, for U.S. Appl. No. 16/260,859, filed Jan. 29, 2019, 72 pages.
Non-Final Office Action dated Apr. 13, 2020, for U.S. Appl. No. 16/260,932, filed Jan. 29, 2019, 71 pages.
Notice of Allowance dated Apr. 29, 2020, for U.S. Appl. No. 16/111,151, filed Aug. 23, 2018, 17 pages.
European Patent Application No. 17885998.9, Extended European Search Report dated Jul. 13, 2020.
European Patent Application No. 17886005.2, Extended European Search Report dated Jul. 22, 2020.
European Patent Application No. 17886168.8, Extended European Search Report dated Oct. 19, 2020.
European Patent Application No. 17886168.8, Partial Supplementary European Search Report dated Jul. 15, 2020.
European Patent Application No. 17886274.4, Extended European Search Report dated Oct. 19, 2020.
European Patent Application No. 17886274.4, Partial Supplementary European Search Report dated Jul. 15, 2020.
European Patent Application No. 17887008.5, Extended European Search Report dated Jul. 20, 2020.
Final Office Action dated Jun. 25, 2020, for U.S. Appl. No. 16/289,017, filed Feb. 28, 2019, 22 pages.
Final Office Action dated Jun. 25, 2020, for U.S. Appl. No. 16/354,824, filed Mar. 15, 2019, 21 pages.
John, "Stem and CPower to Combine Behind-the-Meter Batteries and Demand Response," Energy Storage, Aug. 8, 2017, 5 pages.
Morimoto, Takaoki, "12.000 KW Gas Turbine Power Generating Unit for Steel Works," Fuji Denki Review, 1960, pp. 93-101, vol. 8, No. 4.
Non-Final Office Action dated Jun. 9, 2020 for U.S. Appl. No. 15/392,542, filed Dec. 28, 2016, 17 pages.
Notice of Allowance dated Jun. 1, 2020, for U.S. Appl. No. 16/111,151, filed Aug. 23, 2018, 14 pages.
Notice of Allowance dated Jun. 10, 2020 for U.S. Appl. No. 15/395,622, filed Dec. 30, 2016, 17 pages.
Notice of Allowance dated Oct. 15, 2020 on for U.S. Appl. No. 16/260,932, filed Jan. 29, 2019, 7 pages.
Notice of Allowance dated Jun. 15, 2020 for U.S. Appl. No. 16/260,859, filed Jan. 29, 2019, 11 pages.
Notice of Allowance dated Jun. 22, 2020, for U.S. Appl. No. 16/260,932, filed Jan. 29, 2019, 10 pages.
Notice of Allowance dated Aug. 5, 2020 for U.S. Appl. No. 15/395,622, filed Dec. 30, 2016, 4 pages.
Notice of Allowance dated Oct. 7, 2020 for U.S. Appl. No. 16/260,859, filed Jan. 29, 2019, 7 pages.
Notice of Allowance dated Sep. 11, 2020 for U.S. Appl. No. 16/260,929, filed Jan. 29, 2019, 10 pages.
Notice of Allowance dated May 19, 2020 for U.S. Appl. No. 16/260,929, filed Jan. 29, 2019, 80 pages.
Notice of Allowance dated Sep. 23, 2020 for U.S. Appl. No. 16/260,929, filed Jan. 29, 2019, 5 pages.
Notice of Allowance dated Jul. 24, 2020 for U.S. Appl. No. 16/576,357, filed Sep. 19, 2019, 9 pages.
Notice of Allowance dated Sep. 25, 2020 for U.S. Appl. No. 16/111,151, filed Aug. 23, 2018, 9 pages.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Anheden, M., "Economic Evaluation of Externally Fired Gas Turbine Cycles for Small-Scale Biomass Cogeneration," Technical Report, Jan. 2001, 112 pages.
Bardia, Alexander, "Dynamics and Control Modeling of the Closed-cycle Gas Turbine (GT-HTGR) Power Plant," Fourth Power Plant Dynamics, Control and Testing Symposium, General Atomic Company, Feb. 1980, 35 pages.
Böke, Erhan, "Comparison of Thermal Efficiency of the Closed-Cycle Gas Turbine with and without Regeneration," the Second Scientific Technical Seminar on Gas Turbine Engine, Nov. 1996, 9 pages.
Boyce, Meherwan P., "7-Axial-Flow Compressors," Gas Turbine Engineering Handbook (Fourth Edition), 2012, pp. 303-355.
Crotogino et al., "Huntort CAES: More than 20 Years of Successful Operation," Spring Meeting, Apr. 2001, 7 pages.
Eisenberg, B., "Development of a New Front Stage for an Industrial Axial Flow Compressor," the American Society of Mechanical Engineers, Feb. 2015, 9 pages, Paper No. 93-GT-327.
Früchtel et al., "Development of the GT36 Sequential Combustor," Ansaldo Energio, 2017, 18 pages.
Gamannossi et al., "Analysis of the GT26 Single Shaft Gas Turbine Performance and Emissions," Energy Procedia, Sep. 2017, pp. 461-468, vol. 126.
Hansen, Curt, "Land Based Gas Turbines for Power Production," ASEN 5063, Dec. 2009, 18 pages.
Ho et al., "Cost and Performance Tradeoffs of Alternative Solar Driven S—C02 Brayton Cycle Configuration," Proceedings of the ASME 2015 Power and Energy Conversion Conference, Jul. 2015, 10 pages.
Keller, Curt, "Forty Years of Experience on Closed-Cycle Gas Turbines," Annals of Molecular Biology, Jun. 1978, pp. 405-422, vol. 5.
Kuo et al., "Closed Cycle Gas Turbine Systems in Europe," United Technology Research Center, Office of Naval Research, Mar. 1977, 24 pages.
Kuo et al., "The Prospects for Solar-Powered Closed-Cycle Gas Turbines," the American Society of Mechanical Engineers, Mar. 1980, 9 pages.
La Fleur, James K., "Description of an Operating Closed Cycle—Helium Gas Turbine," the American Society of Mechanical Engineers, 1963, 8 pages, Paper No. 63-AGHT-74.
Man Turbo, Engineering the Future, Since 1758, Apr. 2009, 40 pages.
McDonald et al., "Closed-Cycle Gas Turbine Applications for Fusion Reactors," the American Society of Mechanical Engineers, Dec. 1981, pp. 1-18, vol. 13, No. 1.

(56) References Cited

OTHER PUBLICATIONS

Non-Final Office Action dated Nov. 13, 2019, for U.S. Appl. No. 15/392,542, filed Dec. 28, 2016, 13 pages.
Non-Final Office Action dated Oct. 17, 2019, for U.S. Appl. No. 15/395,622, filed Dec. 30, 2016, 14 pages.
Pathirathna K.A.B., "Gas Turbine Thermodynamic and Performance Analysis Methods Using Available Catalog Data", Faculty of Engineering and Sustainable Development, Oct. 2013, 103 pages.

* cited by examiner

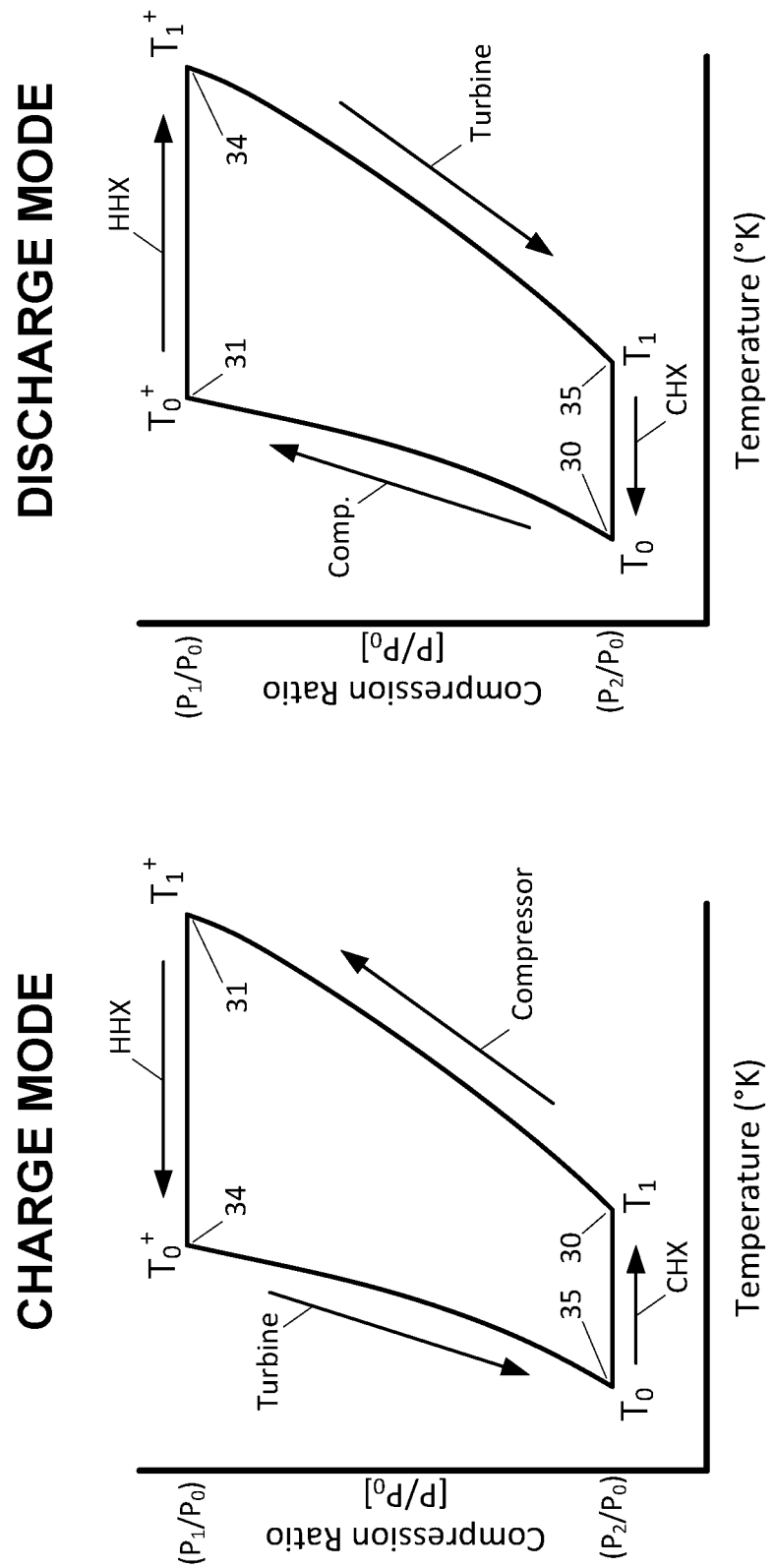

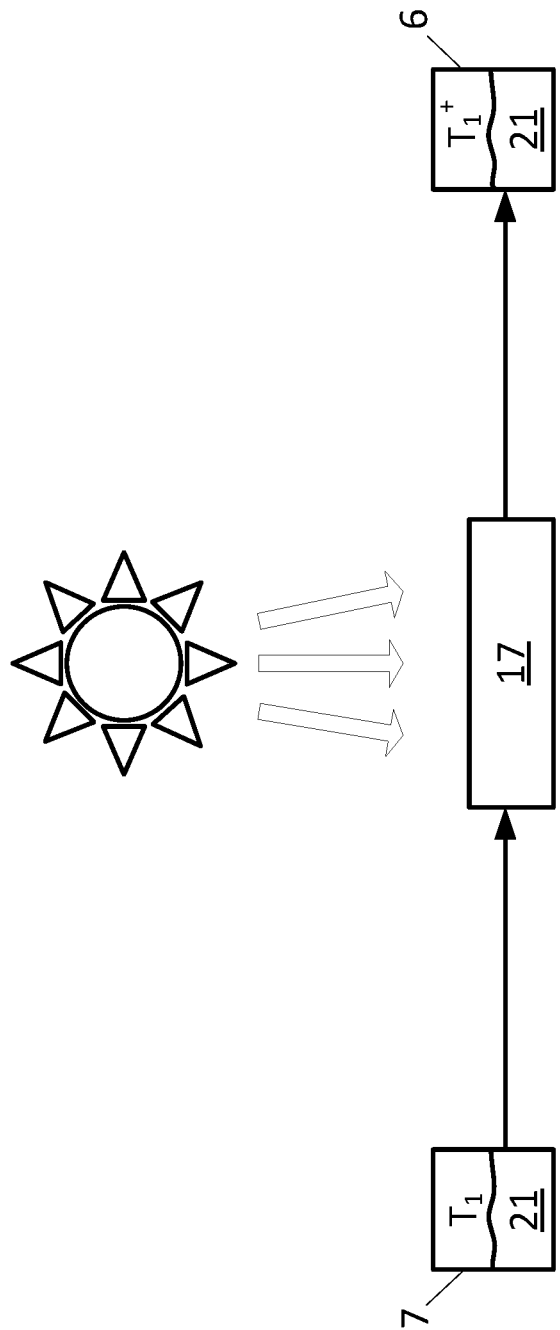

VARIABLE PRESSURE INVENTORY CONTROL OF CLOSED CYCLE SYSTEM WITH A HIGH PRESSURE TANK AND AN INTERMEDIATE PRESSURE TANK

CROSS REFERENCE

This application is a continuation of U.S. patent application Ser. No. 15/392,927, filed Dec. 28, 2016, which is entirely incorporated herein by reference.

BACKGROUND

In a heat engine or heat pump, a heat exchanger may be employed to transfer heat between a thermal storage material and a working fluid for use with turbomachinery. The heat engine may be reversible, i.e., it is also a heat pump, and the working fluid and heat exchanger may be used to transfer heat or cold to a plurality of thermal stores. The thermal energy within a given system may be stored in various forms and in a variety of containers, including pressure vessels and/or insulated vessels.

SUMMARY

A closed thermodynamic cycle power generation system or energy storage system, such as a reversible Brayton cycle system, may include at least a working fluid circulated through a closed cycle fluid path including at least two heat exchangers, a turbine, and a compressor. In some systems, one or more recuperative heat exchangers may also be included. At least two temperature reservoirs may hold thermal fluids which may be pumped through the heat exchangers, providing and/or extracting thermal energy from the working fluid. A motor/generator may be used to obtain work from the thermal energy in the system, preferably by generating electricity from mechanical energy received from the turbine.

The system may further include a high pressure tank and an intermediate pressure tank and fluid connections between the tanks and the closed cycle fluid path may be controlled to vary a quantity of working fluid that circulates through the closed cycle fluid path. The fluid connections may be controlled based on one or more operational parameters of the system. Beneficially, varying the quantity of working fluid that circulates through the closed cycle fluid path may be used to control system power.

Example methods may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; closing the first fluid connection when pressure of the working fluid in the high pressure tank reaches a first threshold pressure value; and removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Example methods may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; closing the first fluid connection when pressure of the working fluid reaches a first threshold pressure value; and removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Example methods may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; closing the first fluid connection when pressure of the working fluid in the intermediate pressure tank reaches a first threshold pressure value; and adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

Example methods may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; closing the first fluid connection when pressure of the working fluid reaches a first threshold pressure value; and adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

Example non-transitory computer readable media may include stored therein instructions executable by a computing device to cause the computing device to perform functions, the functions include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; closing the first fluid connection when pressure of the working fluid in the high pressure tank reaches a first threshold pressure value; and removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Example non-transitory computer readable media may include stored therein instructions executable by a computing device to cause the computing device to perform functions, the functions include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; closing the first fluid connection when pressure of the working fluid reaches a first threshold pressure value; and removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Example non-transitory computer readable media may include stored therein instructions executable by a computing device to cause the computing device to perform functions, the functions include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; closing the first fluid connection when pressure of the working fluid in the intermediate pressure tank reaches a first threshold pressure value; and adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

Example non-transitory computer readable media may include stored therein instructions executable by a computing device to cause the computing device to perform functions, the functions include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; closing the first fluid connection when pressure of the working fluid reaches a first threshold pressure value; and adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

Example systems may include in a closed cycle system, means for circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; means for removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; means for closing the first fluid connection when pressure of the working fluid in the high pressure tank reaches a first threshold pressure value; and means for removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Example systems may include in a closed cycle system, means for circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; means for removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; means for closing the first fluid connection when pressure of the working fluid reaches a first threshold pressure value;

and means for removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Example systems may include in a closed cycle system, means for circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; means for adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; means for closing the first fluid connection when pressure of the working fluid in the intermediate pressure tank reaches a first threshold pressure value; and means for adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

Example systems may include in a closed cycle system, means for circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; means for adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; means for closing the first fluid connection when pressure of the working fluid reaches a first threshold pressure value; and means for adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

BRIEF DESCRIPTION OF THE DRAWINGS

FIG. 4 is a schematic pressure and temperature diagram of the working fluid as it undergoes the charge cycle in FIG. 2.

FIG. 5 is a schematic pressure and temperature diagram of the working fluid as it undergoes the discharge cycle in FIG. 3.

FIG. 19 is a schematic flow diagram of hot side recharging in a pumped heat cycle in solar mode with heating of a solar salt solely by solar power.

DETAILED DESCRIPTION

Figure 1:
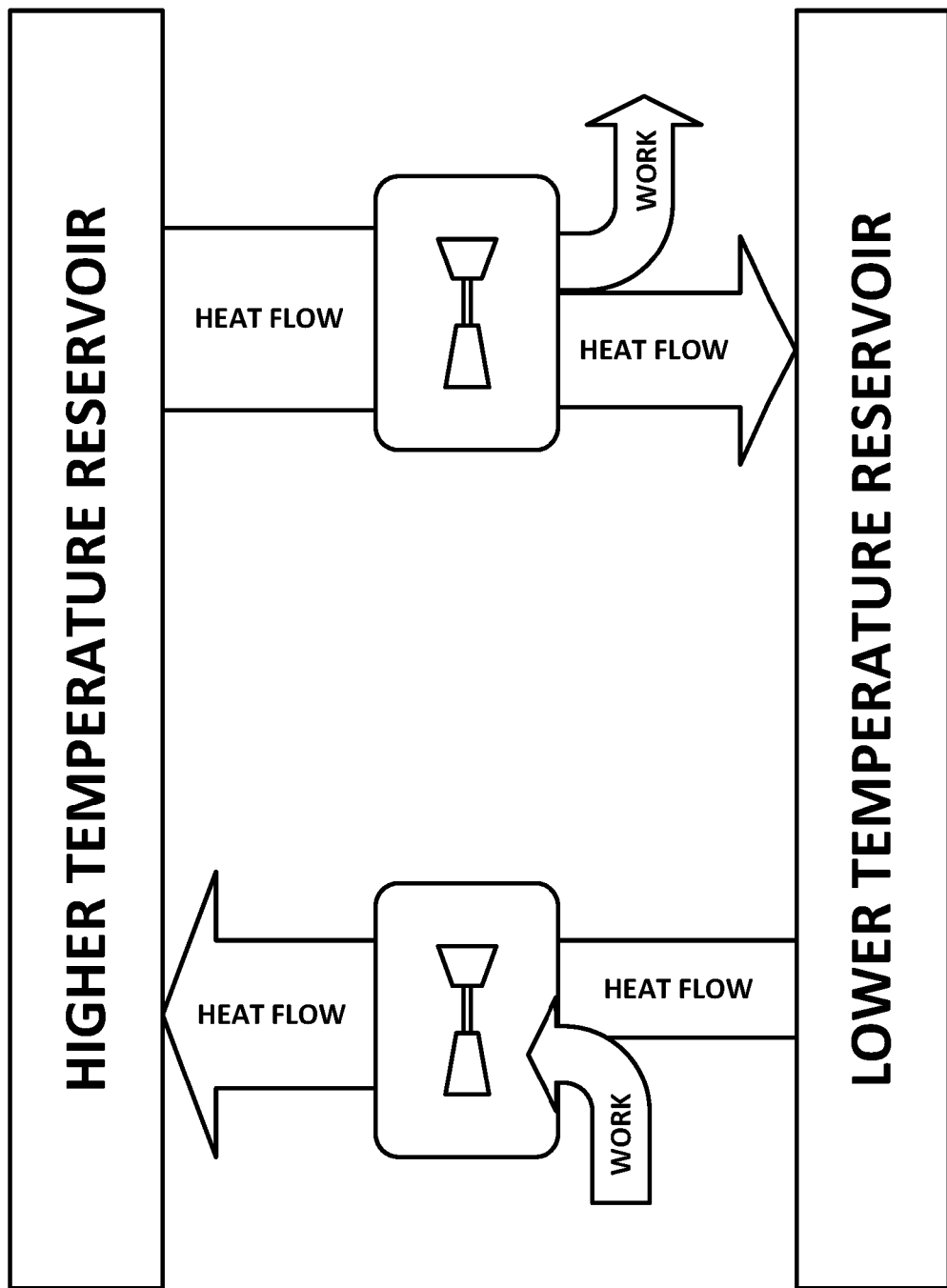
FIG. 1 schematically illustrates operation of a pumped thermal electric storage system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferable embodiments of the present invention are shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The term "reversible," as used herein, generally refers to a process or operation that can be reversed via infinitesimal changes in some property of the process or operation without substantial entropy production (e.g., dissipation of energy). A reversible process may be approximated by a process that is at thermodynamic equilibrium. In some examples, in a reversible process, the direction of flow of energy is reversible. As an alternative, or in addition to, the general direction of operation of a reversible process (e.g., the direction of fluid flow) can be reversed, such as, e.g., from clockwise to counterclockwise, and vice versa.

The term "sequence," as used herein, generally refers to elements (e.g., unit operations) in order. Such order can refer to process order, such as, for example, the order in which a fluid flows from one element to another. In an example, a compressor, heat storage unit and turbine in sequence includes the compressor upstream of the heat exchange unit, and the heat exchange unit upstream of the turbine. In such a case, a fluid can flow from the compressor to the heat exchange unit and from the heat exchange unit to the turbine. A fluid flowing through unit operations in sequence can flow through the unit operations sequentially. A sequence of elements can include one or more intervening elements. For example, a system comprising a compressor, heat storage unit and turbine in sequence can include an auxiliary tank between the compressor and the heat storage unit. A sequence of elements can be cyclical.

I. Overview

An example heat engine in which variable pressure inventory control methods and systems may be implemented is a closed thermodynamic cycle power generation system or energy storage system, such as a reversible Brayton cycle system. The system may be a closed reversible system and may include a recuperative heat exchanger. A Brayton cycle system may use a generator/motor connected to a turbine and a compressor which act on a working fluid circulating in the system. Examples of working fluids include air, argon, carbon dioxide, or gaseous mixtures. A Brayton cycle system may have a hot side and/or a cold side. Each side may include a heat exchanger coupled to one or more cold storage containers and/or one or more hot storage containers. Preferably, the heat exchangers may be arranged as counterflow heat exchangers for higher thermal efficiency. Liquid thermal storage medium may be utilized and may include, for example, liquids that are stable at high temperatures, such as molten nitrate salt or solar salt, or liquids that are stable at low temperatures, such as glycols or alkanes such as hexane. For an example molten salt and hexane system, the hot side molten salt may include a hot storage at approximately 565° C. and a cold storage at approximately 290° C. and the cold side hexane may include a hot storage at approximately 35° C. and a cold storage at approximately −60° C.

In the Brayton cycle system, the working fluid may circulate through a closed cycle fluid path and the closed cycle fluid path may include a high pressure leg and a low pressure leg. An example embodiment of variable pressure inventory control may involve removing a first quantity of working fluid from a closed cycle fluid path by opening a first fluid connection between the high pressure leg and a high pressure tank, such that pressure of the working fluid in the closed cycle fluid path decreases and pressure in the high pressure tank increases; closing the first fluid connection; and removing a second quantity of working fluid from the closed cycle fluid path by opening a second fluid connection between the high pressure leg and an intermediate pressure tank, such that pressure of the working fluid in the closed cycle fluid path decreases and pressure in the intermediate tank increases.

Another example embodiment variable pressure inventory control may involve adding a first quantity of working fluid to the closed cycle fluid path by opening a first fluid connection between the low pressure leg and an intermediate pressure tank, such that pressure of the working fluid in the closed cycle fluid path increases and pressure in the intermediate pressure tank decreases; closing the first fluid connection; and adding a second quantity of working fluid to the closed cycle by opening a second fluid connection between the closed cycle fluid path and a high pressure tank, such that pressure of the working fluid in the closed cycle fluid path increases and pressure in the high pressure tank decreases.

The fluid connections between the closed cycle fluid path and the tanks may be closed based on pressure of the working fluid. In some embodiments, the first fluid connection between the high pressure leg and the high pressure tank may be closed when pressure of the working fluid in the high pressure tank reaches a threshold pressure value. Moreover, in some embodiments, the first fluid connection between the high pressure leg and the intermediate pressure tank may be closed when pressure of the working fluid in the intermediate pressure tank reaches a threshold pressure value.

In some embodiments, the threshold pressure value related to closing the first fluid connection between the high pressure leg and the intermediate pressure tank may be different than the threshold pressure value related to closing the first fluid connection between the high pressure leg and the intermediate pressure tank.

II. Illustrative Reversible Heat Engine

A. Pumped Thermal Systems

The disclosure provides pumped thermal systems capable of storing electrical energy and/or heat, and releasing energy (e.g., producing electricity) at a later time. The pumped thermal systems of the disclosure may include a heat engine, and a heat pump (or refrigerator). In some cases, the heat engine can be operated in reverse as a heat pump. In some cases, the heat engine can be operated in reverse as a refrigerator. Any description of heat pump/heat engine systems or refrigerator/heat engine systems capable of reverse operation herein may also be applied to systems comprising separate and/or a combination of separate and reverse-operable heat engine system(s), heat pump system(s) and/or refrigerator system(s). Further, as heat pumps and refrigerators share the same operating principles (albeit with differing objectives), any description of configurations or operation of heat pumps herein may also be applied to configurations or operation of refrigerators, and vice versa.

Systems of the present disclosure can operate as heat engines or heat pumps (or refrigerators). In some situations, systems of the disclosure can alternately operate as heat engines and heat pumps. In some examples, a system can operate as a heat engine to generate power, and subsequently operate as a heat pump to store energy, or vice versa. Such systems can alternately and sequentially operate as heat engines as heat pumps. In some cases, such systems reversibly or substantially reversibly operate as heat engines as heat pumps.

Reference will now be made to the figures, wherein like numerals refer to like parts throughout. It will be appreciated that the figures and features therein are not necessarily drawn to scale.

FIG. 1 schematically illustrates operating principles of pumped thermal electric storage using a heat pump/heat engine electricity storage system. Electricity may be stored in the form of thermal energy of two materials or media at different temperatures (e.g., thermal energy reservoirs comprising heat storage fluids or thermal storage media) by using a combined heat pump/heat engine system. In a charging or heat pump mode, work may be consumed by the system for transferring heat from a cold material or medium to a hot material or medium, thus lowering the temperature (e.g., sensible energy) of the cold material and increasing the temperature (i.e., sensible energy) of the hot material. In a discharging or heat engine mode, work may be produced by the system by transferring heat from the hot material to the cold material, thus lowering the temperature (i.e., sensible energy) of the hot material and increasing the temperature (i.e., sensible energy) of the cold material. The system may be configured to ensure that the work produced by the system on discharge is a favorable fraction of the energy consumed on charge. The system may be configured to achieve high roundtrip efficiency, defined herein as the work produced by the system on discharge divided by the work consumed by the system on charge. Further, the system may be configured to achieve the high roundtrip efficiency using components of a desired (e.g., acceptably low) cost. Arrows H and W in FIG. 1 represent directions of heat flow and work, respectively.

Heat engines, heat pumps and refrigerators of the disclosure may involve a working fluid to and from which heat is transferred while undergoing a thermodynamic cycle. The heat engines, heat pumps and refrigerators of the disclosure may operate in a closed cycle. Closed cycles allow, for example, a broader selection of working fluids, operation at elevated cold side pressures, operation at lower cold side temperatures, improved efficiency, and reduced risk of turbine damage. One or more aspects of the disclosure described in relation to systems having working fluids undergoing closed cycles may also be applied to systems having working fluids undergoing open cycles.

In one example, the heat engines may operate on a Brayton cycle and the heat pumps/refrigerators may operate on a reverse Brayton cycle (also known as a gas refrigeration cycle). Other examples of thermodynamic cycles that the working fluid may undergo or approximate include the Rankine cycle, the ideal vapor-compression refrigeration cycle, the Stirling cycle, the Ericsson cycle or any other cycle advantageously employed in concert with heat exchange with heat storage fluids of the disclosure.

The working fluid can undergo a thermodynamic cycle operating at one, two or more pressure levels. For example, the working fluid may operate in a closed cycle between a low pressure limit on a cold side of the system and a high pressure limit on a hot side of the system. In some implementations, a low pressure limit of about 10 atmospheres (atm) or greater can be used. In some instances, the low pressure limit may be at least about 1 atm, at least about 2 atm, at least about 5 atm, at least about 10 atm, at least about 15 atm, at least about 20 atm, at least about 30 atm, at least about 40 atm, at least about 60 atm, at least about 80 atm, at least about 100 atm, at least about 120 atm, at least about 160 atm, or at least about 200 atm, 500 atm, 1000 atm, or more. In some instances, a sub-atmospheric low pressure limit may be used. For example, the low pressure limit may be less than about 0.1 atm, less than about 0.2 atm, less than about 0.5 atm, or less than about 1 atm. In some instances, the low pressure limit may be about 1 atmosphere (atm). In the case of a working fluid operating in an open cycle, the low pressure limit may be about 1 atm or equal to ambient pressure.

In some cases, the value of the low pressure limit may be selected based on desired power output and/or power input requirements of the thermodynamic cycle. For example, a pumped thermal system with a low pressure limit of about 10 atm may be able to provide a power output comparable to an industrial gas turbine with ambient (1 atm) air intake. The value of the low pressure limit may also be subject to cost/safety tradeoffs. Further, the value of the low pressure limit may be limited by the value of the high pressure limit, the operating ranges of the hot side and cold side heat storage media (e.g., pressure and temperature ranges over which the heat storage media are stable), pressure ratios and operating conditions (e.g., operating limits, optimal operating conditions, pressure drop) achievable by turbomachinery and/or other system components, or any combination thereof. The high pressure limit may be determined in accordance with these system constraints. In some instances, higher values of the high pressure limit may lead to improved heat transfer between the working fluid and the hot side storage medium.

Working fluids used in pumped thermal systems may include air, argon, other noble gases, carbon dioxide, hydrogen, oxygen, or any combination thereof, and/or other fluids in gaseous, liquid, critical, or supercritical state (e.g., supercritical $CO_2$). The working fluid can be a gas or a low viscosity liquid (e.g., viscosity below about $500 \times 10^{-6}$ Poise at 1 atm), satisfying the requirement that the flow be continual. In some implementations, a gas with a high specific heat ratio may be used to achieve higher cycle efficiency than a gas with a low specific heat ratio. For example, argon (e.g., specific heat ratio of about 1.66) may be used to substitute air (e.g., specific heat ratio of about 1.4). In some cases, the working fluid may be a blend of one, two, three or more fluids. In one example, helium (having a high thermal conductivity and a high specific heat) may be added to the working fluid (e.g., argon) to improve heat transfer rates in heat exchangers.

Pumped thermal systems herein may utilize heat storage media or materials, such as one or more heat storage fluids. The heat storage media can be gases or low viscosity liquids, satisfying the requirement that the flow be continual. The systems may utilize a first heat storage medium on a hot side of the system ("hot side thermal storage (HTS) medium" or "HTS" herein) and a second heat storage medium on a cold side of the system ("cold side thermal storage (CTS) medium" or "CTS" herein). The thermal storage media (e.g., low viscosity liquids) can have high heat capacities per unit volume (e.g., heat capacities above about 1400 Joule (kilogram Kelvin)$^{-1}$) and high thermal conductivities (e.g., thermal conductivities above about 0.7 Watt (meter Kelvin)$^{-1}$). In some implementations, several different thermal storage media (also "heat storage media" herein) on either the hot side, cold side or both the hot side and the cold side may be used.

The operating temperatures of the hot side thermal storage medium can be in the liquid range of the hot side thermal storage medium, and the operating temperatures of the cold side thermal storage medium can be in the liquid range of the cold side thermal storage medium. In some examples, liquids may enable a more rapid exchange of large amounts of heat by convective counter-flow than solids or gases. Thus, in some cases, liquid HTS and CTS media may advantageously be used. Pumped thermal systems utilizing thermal storage media herein may advantageously provide a safe, non-toxic and geography-independent energy (e.g., electricity) storage alternative.

In some implementations, the hot side thermal storage medium can be a molten salt or a mixture of molten salts. Any salt or salt mixture that is liquid over the operating temperature range of the hot side thermal storage medium may be employed. Molten salts can provide numerous advantages as thermal energy storage media, such as low vapor pressure, lack of toxicity, chemical stability, low chemical reactivity with typical steels (e.g., melting point below the creep temperature of steels, low corrosiveness, low capacity to dissolve iron and nickel), and low cost. In one example, the HTS is a mixture of sodium nitrate and potassium nitrate. In some examples, the HTS is a eutectic mixture of sodium nitrate and potassium nitrate. In some examples, the HTS is a mixture of sodium nitrate and potassium nitrate having a lowered melting point than the individual constituents, an increased boiling point than the individual constituents, or a combination thereof. Other examples include potassium nitrate, calcium nitrate, sodium nitrate, sodium nitrite, lithium nitrate, mineral oil, or any combination thereof. Further examples include any gaseous (including compressed gases), liquid or solid media (e.g., powdered solids) having suitable (e.g., high) thermal storage capacities and/or capable of achieving suitable (e.g., high) heat transfer rates with the working fluid. For example, a mix of 60% sodium nitrate and 40% potassium nitrate (also referred to as a solar salt in some situations) can have a heat capacity of approximately 1500 Joule (Kelvin mole)$^{-1}$ and a thermal conductivity of approximately 0.75 Watt (meter Kelvin)$^{-1}$ within a temperature range of interest. The hot side thermal storage medium may be operated in a temperature range that structural steels can handle.

In some cases, liquid water at temperatures of about 0° C. to 100° C. (about 273 K-373 K) and a pressure of about 1 atm may be used as the cold side thermal storage medium. Due to a possible explosion hazard associated with presence of steam at or near the boiling point of water, the operating temperature can be kept below about 100° C. or less while maintaining an operating pressure of 1 atm (i.e., no pressurization). In some cases, the temperature operating range of the cold side thermal storage medium may be extended (e.g., to −30° C. to 100° C. at 1 atm) by using a mixture of water and one or more antifreeze compounds (e.g., ethylene glycol, propylene glycol, or glycerol).

As described in greater detail elsewhere herein, improved storage efficiency may be achieved by increasing the temperature difference at which the system operates, for example, by using a cold side heat storage fluid capable of operating at lower temperatures. In some examples, the cold side thermal storage media may comprise hydrocarbons, such as, for example, alkanes (e.g., hexane or heptane), alkenes, alkynes, aldehydes, ketones, carboxylic acids (e.g., HCOOH), ethers, cycloalkanes, aromatic hydrocarbons, alcohols (e.g., butanol), other type(s) of hydrocarbon molecules, or any combinations thereof. In some cases, the cold side thermal storage medium can be hexane (e.g., n-hexane). Hexane has a wide liquid range and can remain fluid (i.e., runny) over its entire liquid range (−94° C. to 68° C. at 1 atm). Hexane's low temperature properties are aided by its immiscibility with water. Other liquids, such as, for example, ethanol or methanol can become viscous at the low temperature ends of their liquid ranges due to pre-crystallization of water absorbed from air. In some cases, the cold side thermal storage medium can be heptane (e.g., n-heptane). Heptane has a wide liquid range and can remain fluid (i.e., runny) over its entire liquid range (−91° C. to 98° C. at 1 atm). Heptane's low temperature properties are aided by its immiscibility with water. At even lower temperatures, other heat storage media can be used, such as, for example, isohexane (2-methylpentane). In some examples, cryogenic liquids having boiling points below about −150° C. (123 K) or about −180° C. (93.15 K) may be used as cold side thermal storage media (e.g., propane, butane, pentane, nitrogen, helium, neon, argon and krypton, air, hydrogen, methane, or liquefied natural gas). In some implementations, choice of cold side thermal storage medium may be limited by the choice of working fluid. For example, when a gaseous working fluid is used, a liquid cold side thermal storage medium having a liquid temperature range at least partially or substantially above the boiling point of the working fluid may be required.

In some cases, the operating temperature range of CTS and/or HTS media can be changed by pressurizing (i.e., raising the pressure) or evacuating (i.e., lowering the pressure) the tanks and thus changing the temperature at which the storage media undergo phase transitions (e.g., going from liquid to solid, or from liquid to gas).

In some cases, the hot side and the cold side heat storage fluids of the pumped thermal systems are in a liquid state over at least a portion of the operating temperature range of the energy storage device. The hot side heat storage fluid may be liquid within a given range of temperatures. Similarly, the cold side heat storage fluid may be liquid within a given range of temperatures. The heat storage fluids may be heated, cooled or maintained to achieve a suitable operating temperature prior to, during or after operation.

Pumped thermal systems of the disclosure may cycle between charged and discharged modes. In some examples, the pumped thermal systems can be fully charged, partially charged or partially discharged, or fully discharged. In some cases, cold side heat storage may be charged (also "recharged" herein) independently from hot side heat storage. Further, in some implementations, charging (or some portion thereof) and discharging (or some portion thereof) can occur simultaneously. For example, a first portion of a hot side heat storage may be recharged while a second portion of the hot side heat storage together with a cold side heat storage are being discharged.

The pumped thermal systems may be capable of storing energy for a given amount of time. In some cases, a given amount of energy may be stored for at least about 1 second, at least about 30 seconds, at least about 1 minute, at least about 5 minutes, at least about 30 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours at least about 14 hours, at least about 16 hours, at least about 18 hours, at least about 20 hours, at least about 22 hours, at least about 24 hours (1 day), at least about 2 days, at least about 4 days, at least about 6 days, at least about 8 days, at least about 10 days, 20 days, 30 days, 60 days, 100 days, 1 year or more.

Pumped thermal systems of the disclosure may be capable of storing/receiving input of, and/or extracting/providing output of a substantially large amount of energy and/or power for use with power generation systems (e.g., intermittent power generation systems such as wind power or solar power), power distribution systems (e.g. electrical grid), and/or other loads or uses in grid-scale or stand-alone settings. During a charge mode of a pumped thermal system, electric power received from an external power source (e.g., a wind power system, a solar photovoltaic power system, an electrical grid etc.) can be used operate the pumped thermal system in a heat pump mode (i.e., transferring heat from a low temperature reservoir to a high temperature reservoir, thus storing energy). During a discharge mode of the pumped thermal system, the system can supply electric power to an external power system or load (e.g., one or more electrical grids connected to one or more loads, a load, such as a factory or a power-intensive process, etc.) by operating in a heat engine mode (i.e., transferring heat from a high temperature reservoir to a low temperature reservoir, thus extracting energy). As described elsewhere herein, during charge and/or discharge, the system may receive or reject thermal power, including, but not limited to electromagnetic power (e.g., solar radiation) and thermal power (e.g., sensible energy from a medium heated by solar radiation, heat of combustion etc.).

In some implementations, the pumped thermal systems are grid-synchronous. Synchronization can be achieved by matching speed and frequency of motors/generators and/or turbomachinery of a system with the frequency of one or more grid networks with which the system exchanges power. For example, a compressor and a turbine can rotate at a given, fixed speed (e.g., 3600 revolutions per minute (rpm)) that is a multiple of grid frequency (e.g., 60 hertz (Hz)). In some cases, such a configuration may eliminate the need for additional power electronics. In some implementations, the turbomachinery and/or the motors/generators are not grid synchronous. In such cases, frequency matching can be accomplished through the use of power electronics. In some implementations, the turbomachinery and/or the motors/generators are not directly grid synchronous but can be matched through the use of gears and/or a mechanical gearbox. As described in greater detail elsewhere herein, the pumped thermal systems may also be rampable. Such capabilities may enable these grid-scale energy storage systems to operate as peaking power plants and/or as a load following power plants. In some cases, the systems of the disclosure may be capable of operating as base load power plants.

Pumped thermal systems can have a given power capacity. In some cases, power capacity during charge may differ from power capacity during discharge. For example, each system can have a charge and/or discharge power capacity of less than about 1 megawatt (MW), at least about 1 megawatt, at least about 2 MW, at least about 3 MW, at least about 4 MW, at least about 5 MW, at least about 6 MW, at least about 7 MW, at least about 8 MW, at least about 9 MW, at least about 10 MW, at least about 20 MW, at least about 30 MW, at least about 40 MW, at least about 50 MW, at least about 75 MW, at least about 100 MW, at least about 200 MW, at least about 500 MW, at least about 1 gigawatt (GW), at least about 2 GW, at least about 5 GW, at least about 10 GW, at least about 20 GW, at least about 30 GW, at least about 40 GW, at least about 50 GW, at least about 75 GW, at least about 100 GW, or more.

Pumped thermal systems can have a given energy storage capacity. In one example, a pumped thermal system is configured as a 100 MW unit operating for 10 hours. In another example, a pumped thermal system is configured as a 1 GW plant operating for 12 hours. In some instances, the energy storage capacity can be less than about 1 megawatt hour (MWh), at least about 1 megawatt hour, at least about 10 MWh, at least about 100 MWh, at least about 1 gigawatt hour (GWh), at least about 5 GWh, at least about 10 GWh, at least about 20 GWh, at least 50 GWh, at least about 100 GWh, at least about 200 GWh, at least about 500 GWh, at least about 700 GWh, at least about 1000 GWh, or more.

In some cases, a given power capacity may be achieved with a given size, configuration and/or operating conditions of the heat engine/heat pump cycle. For example, size of turbomachinery, ducts, heat exchangers, or other system components may correspond to a given power capacity.

In some implementations, a given energy storage capacity may be achieved with a given size and/or number of hot side thermal storage tanks and/or cold side thermal storage tanks. For example, the heat engine/heat pump cycle can operate at a given power capacity for a given amount of time set by the heat storage capacity of the system or plant. The number and/or heat storage capacity of the hot side thermal storage tanks may be different from the number and/or heat storage capacity of the cold side thermal storage tanks. The number of tanks may depend on the size of individual tanks. The size of hot side storage tanks may differ from the size of cold side thermal storage tanks. In some cases, the hot side thermal storage tanks, the hot side heat exchanger and the hot side thermal storage medium may be referred to as a hot side heat (thermal) storage unit. In some cases, the cold side thermal storage tanks, the cold side heat exchanger and the cold side thermal storage medium may be referred to as a cold side heat (thermal) storage unit.

A pumped thermal storage facility can include any suitable number of hot side storage tanks, such as at least about 2, at least about 4, at least about 10, at least about 50, at least about 100, at least about 500, at least about 1,000, at least about 5,000, at least about 10,000, and the like. In some examples, a pumped thermal storage facility includes 2, 3, 4, 5, 6, 7, 8, 9, 10, 15, 20, 30, 40, 50, 60, 70, 80, 90, 100, 200, 300, 400, 500, 600, 700, 800, 900, 1,000 or more hot side tanks.

A pumped thermal storage facility can also include any suitable number of cold side storage tanks, such as at least about 2, at least about 4, at least about 10, at least about 50, at least about 100, at least about 500, at least about 1,000, at least about 5,000, at least about 10,000, and the like. In some examples, a pumped thermal storage facility includes 2, 3, 4, 5, 6, 7, 8, 9, 10, 15, 20, 30, 40, 50, 60, 70, 80, 90, 100, 200, 300, 400, 500, 600, 700, 800, 900, 1,000 or more cold side tanks.

B. Pumped Thermal Storage Cycles

An aspect of the disclosure relates to pumped thermal systems operating on pumped thermal storage cycles. In some examples, the cycles allow electricity to be stored as heat (e.g., in the form of a temperature differential) and then converted back to electricity through the use of at least two pieces of turbomachinery, a compressor and a turbine. The compressor consumes work and raises the temperature and pressure of a working fluid (WF). The turbine produces work and lowers the temperature and pressure of the working fluid. In some examples, more than one compressor and more than one turbine is used. In some cases, the system can include at least 1, at least 2, at least 3, at least 4, or at least 5 compressors. In some cases, the system can include at least 1, at least 2, at least 3, at least 4, or at least 5 turbines. The compressors may be arranged in series or in parallel. The turbines may be arranged in series or in parallel.

Figure 2:
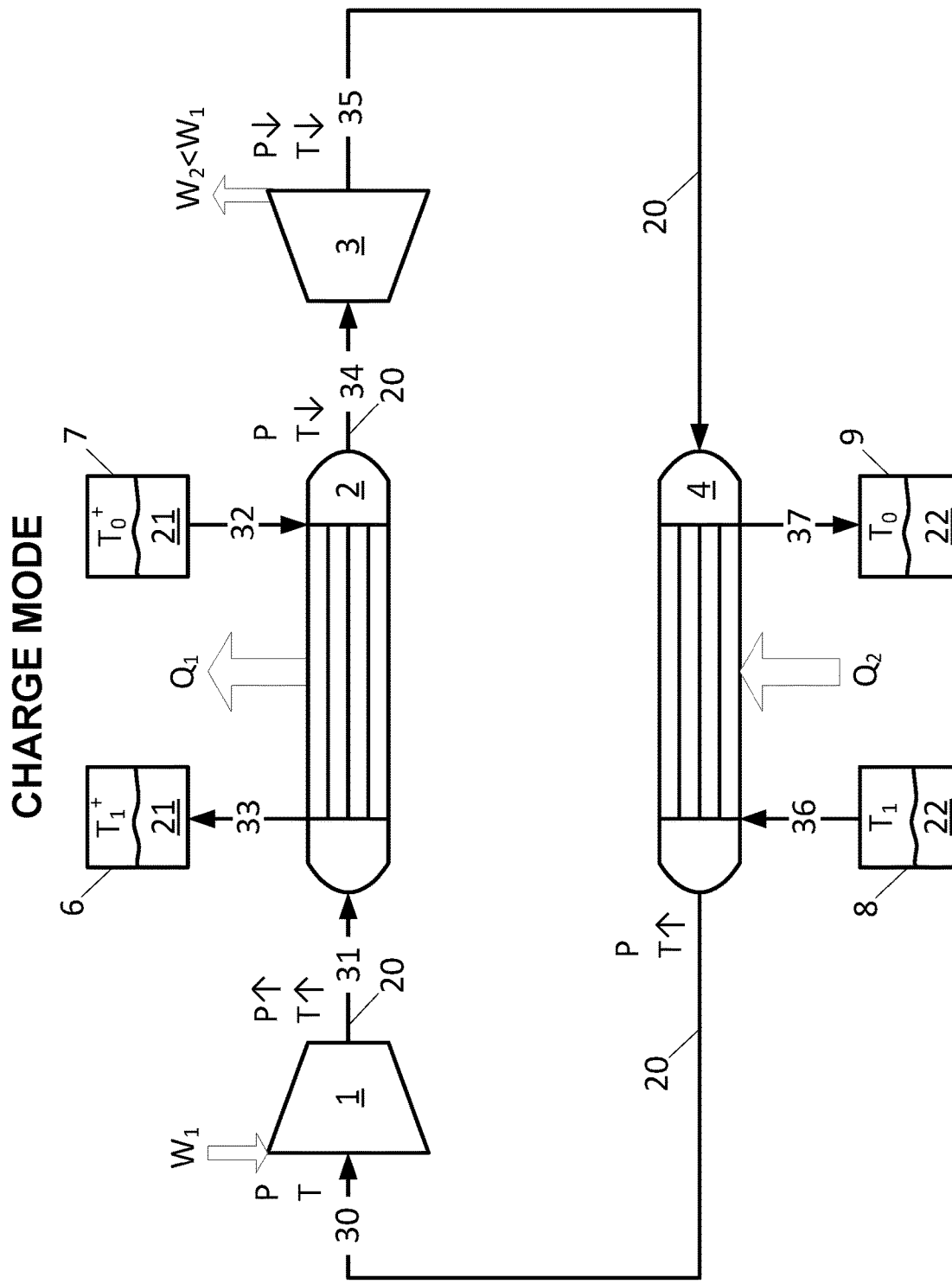
FIG. 2 is a schematic flow diagram of working fluid and heat storage media of a pumped thermal system in a charge/heat pump mode.
Figure 3:
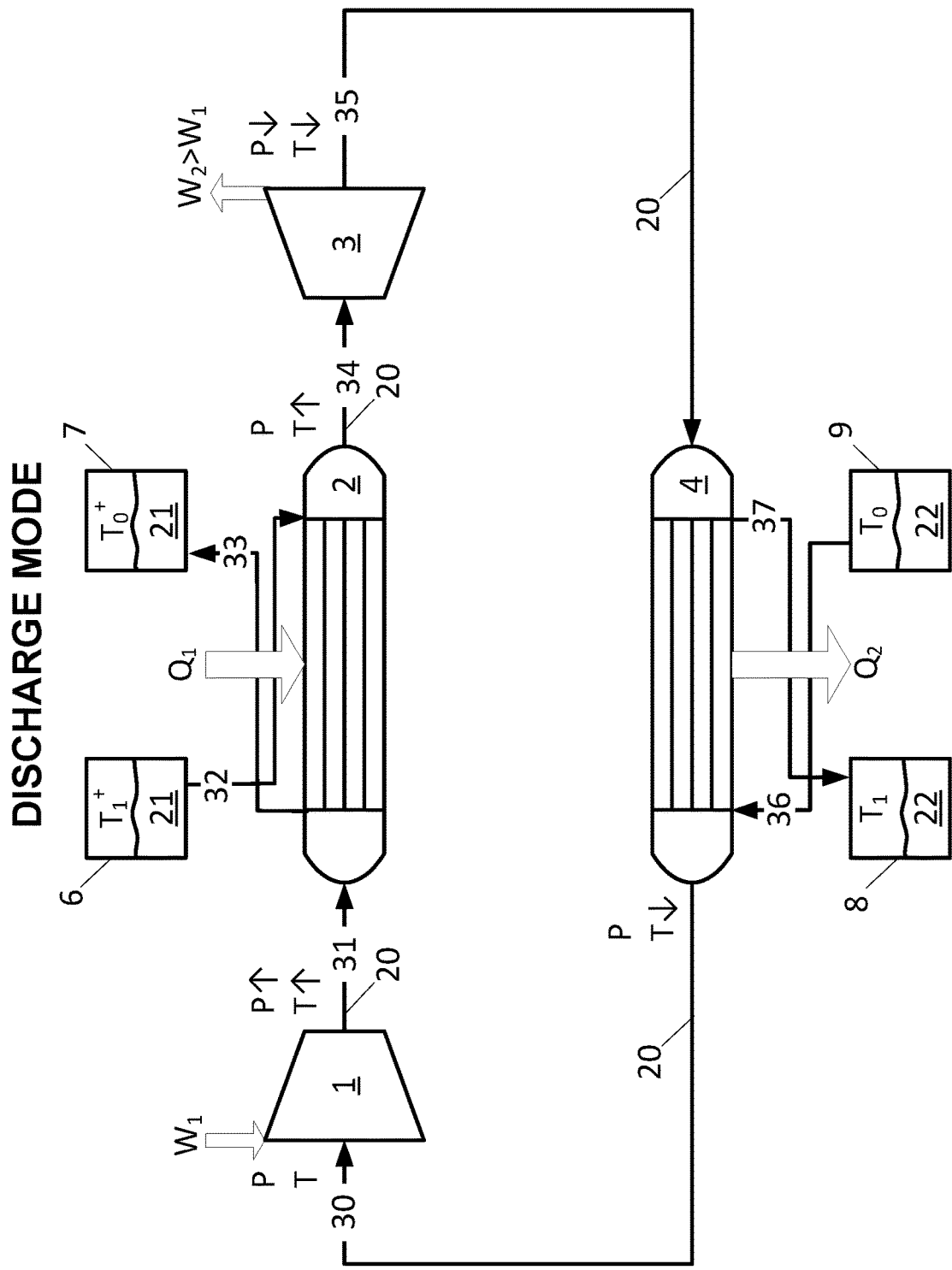
FIG. 3 is a schematic flow diagram of working fluid and heat storage media of a pumped thermal system in a discharge/heat engine mode.

FIGS. 2 and 3 are schematic flow diagrams of working fluid and heat storage media of an exemplary pumped thermal system in a charge/heat pump mode and in a discharge/heat engine mode, respectively. The system may be idealized for simplicity of explanation so that there are no losses (i.e., entropy generation) in either the turbomachinery or heat exchangers. The system can include a working fluid 20 (e.g., argon gas) flowing in a closed cycle between a compressor 1, a hot side heat exchanger 2, a turbine 3 and a cold side heat exchanger 4. Fluid flow paths/directions for the working fluid 20 (e.g., a gas), a hot side thermal storage (HTS) medium 21 (e.g., a low viscosity liquid) and a cold side thermal storage (CTS) medium 22 (e.g., a low viscosity liquid) are indicated by arrows.

FIGS. 4 and 5 are schematic pressure and temperature diagrams of the working fluid 20 as it undergoes the charge cycles in FIGS. 2 and 3, respectively, once again simplified in the approximation of no entropy generation. Normalized pressure is shown on the y-axes and temperature is shown on the x-axes. The direction of processes taking place during the cycles is indicated with arrows, and the individual processes taking place in the compressor 1, the hot side CFX 2, the turbine 3 and the cold side CFX 4 are indicated on the diagram with their respective numerals.

The heat exchangers 2 and 4 can be configured as counter-flow heat exchangers (CFXs), where the working fluid flows in one direction and the substance it is exchanging heat with is flowing in the opposite direction. In an ideal counter-flow heat exchanger with correctly matched flows (i.e., balanced capacities or capacity flow rates), the temperatures of the working fluid and thermal storage medium flip (i.e., the counter-flow heat exchanger can have unity effectiveness).

The counter-flow heat exchangers 2 and 4 can be designed and/or operated to reduce entropy generation in the heat exchangers to negligible levels compared to entropy generation associated with other system components and/or processes (e.g., compressor and/or turbine entropy generation). In some cases, the system may be operated such that entropy generation in the system is minimized. For example, the system may be operated such that entropy generation associated with heat storage units is minimized. In some cases, a temperature difference between fluid elements exchanging heat can be controlled during operation such that entropy generation in hot side and cold side heat storage units is minimized. In some instances, the entropy generated in the hot side and cold side heat storage units is negligible when compared to the entropy generated by the compressor, the turbine, or both the compressor and the turbine. In some instances, entropy generation associated with heat transfer in the heat exchangers 2 and 4 and/or entropy generation associated with operation of the hot side storage unit, the cold side storage unit or both the hot side and cold side storage units can be less than about 50%, less than about 25%, less than about 20%, less than about 15%, less than about 10%, less than about 5%, less than about 4%, less than about 3%, less than about 2%, or less than about 1% of the total entropy generated within the system (e.g., entropy generated by the compressor 1, the hot side heat exchanger 2, the turbine 3, the cold side heat exchanger 4 and/or other components described herein, such as, for example, a recuperator). For example, entropy generation can be reduced or minimized if the two substances exchanging heat do so at a local temperature differential $\Delta T \to 0$ (i.e., when the temperature difference between any two fluid elements that are in close thermal contact in the heat exchanger is small). In some examples, the temperature differential $\Delta T$ between any two fluid elements that are in close thermal contact may be less than about 300 Kelvin (K), less than about 200 K, less than about 100 K, less than about 75 K, less than about 50 K, less than about 40 K, less than about 30 K, less than about 20 K, less than about 10 K, less than about 5 K, less than about 3 K, less than about 2 K, or less than about 1 K. In another example, entropy generation associated with pressure drop can be reduced or minimized by suitable design. In some examples, the heat exchange process can take place at a constant or near-constant pressure. Alternatively, a non-negligible pressure drop may be experienced by the working fluid and/or one or more thermal storage media during passage through a heat exchanger. Pressure drop in heat exchangers may be controlled (e.g., reduced or minimized) through suitable heat exchanger design. In some examples, the pressure drop across each heat exchanger may be less than about 20% of inlet pressure, less than about 10% of inlet pressure, less than about 5% of inlet pressure, less than about 3% of inlet pressure, less than about 2% of inlet pressure, less than about 1% of inlet pressure, less than about 0.5% of inlet pressure, less than about 0.25% of inlet pressure, or less than about 0.1% of inlet pressure.

Upon entering the heat exchanger 2, the temperature of the working fluid can either increase (taking heat from the HTS medium 21, corresponding to the discharge mode in FIGS. 3 and 5) or decrease (giving heat to the HTS medium 21, corresponding to the charge mode in FIGS. 2 and 4), depending on the temperature of the HTS medium in the heat exchanger relative the temperature of the working fluid. Similarly, upon entering the heat exchanger 4, the temperature of the working fluid can either increase (taking heat from the CTS medium 22, corresponding to the charge mode in FIGS. 2 and 4) or decrease (giving heat to the CTS medium 22, corresponding to the discharge mode in FIGS. 3 and 5), depending on the temperature of the CTS medium in the heat exchanger relative the temperature of the working fluid.

As described in more detail with reference to the charge mode in FIGS. 2 and 4, the heat addition process in the cold side CFX 4 can take place over a different range of temperatures than the heat removal process in the hot side CFX 2. Similarly, in the discharge mode in FIGS. 3 and 5, the heat rejection process in the cold side CFX 4 can take place over a different range of temperatures than the heat addition process in the hot side CFX 2. At least a portion of the temperature ranges of the hot side and cold side heat exchange processes may overlap during charge, during discharge, or during both charge and discharge.

As used herein, the temperatures $T_0$, $T_1$, $T_0^+$ and $T_1^+$ are so named because $T_0^+$, $T_1^+$ are the temperatures achieved at the exit of a compressor with a given compression ratio r, adiabatic efficiency $\eta_c$ and inlet temperatures of $T_0$, $T_1$ respectively. The examples in FIGS. 2, 3, 4 and 5 can be idealized examples where $\eta_c=1$ and where adiabatic efficiency of the turbine $\eta_t$ also has the value $\eta_t=1$.

With reference to the charge mode shown in FIGS. 2 and 4, the working fluid 20 can enter the compressor 1 at position 30 at a pressure P and a temperature T (e.g., at $T_1$, $P_2$). As the working fluid passes through the compressor, work $W_1$ is consumed by the compressor to increase the pressure and temperature of the working fluid (e.g., to $T_1^+$, $P_1$), as indicated by P↑ and T↑ at position 31. In the charge mode, the temperature $T_1^+$ of the working fluid exiting the compressor and entering the hot side CFX 2 at position 31 is higher than the temperature of the HTS medium 21 entering the hot side CFX 2 at position 32 from a second hot side thermal storage tank 7 at a temperature $T_0^+$ (i.e., $T_0^+<T_1^+$). As these two fluids pass in thermal contact with each other in the heat exchanger, the working fluid's temperature decreases as it moves from position 31 position 34, giving off heat $Q_1$ to the HTS medium, while the temperature of the HTS medium in turn increases as it moves from position 32 to position 33, absorbing heat $Q_1$ from the working fluid. In an example, the working fluid exits the hot side CFX 2 at position 34 at the temperature $T_0^+$ and the HTS medium exits the hot side CFX 2 at position 33 into a first hot side thermal storage tank 6 at the temperature $T_1^+$. The heat exchange process can take place at a constant or near-constant pressure such that the working fluid exits the hot side CFX 2 at position 34 at a lower temperature but same pressure $P_1$, as indicated by P and T↓ at position 34. Similarly, the temperature of the HTS medium 21 increases in the hot side CFX 2, while its pressure can remain constant or near-constant.

Upon exiting the hot side CFX 2 at position 34 (e.g., at $T_0^+$, $P_1$), the working fluid 20 undergoes expansion in the turbine 3 before exiting the turbine at position 35. During the expansion, the pressure and temperature of the working fluid decrease (e.g., to $T_0$, $P_2$), as indicated by P↓ and T↓ at position 35. The magnitude of work $W_2$ generated by the turbine depends on the enthalpy of the working fluid entering the turbine and the degree of expansion. In the charge mode, heat is removed from the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being lower than the enthalpy of the gas exiting the compressor, the work $W_2$ generated by the turbine 3 is smaller than the work $W_1$ consumed by the compressor 1 (i.e., $W_2<W_1$).

Because heat was taken out of the working fluid in the hot side CFX 2, the temperature $T_0$ at which the working fluid exits the turbine at position 35 is lower than the temperature $T_1$ at which the working fluid initially entered the compressor at position 30. To close the cycle (i.e., to return the pressure and temperature of the working fluid to their initial values $T_1$, $P_2$ at position 30), heat $Q_2$ is added to the working fluid from the CTS medium 22 in the cold side CFX 4 between positions 35 and 30 (i.e., between the turbine 3 and the compressor 1). In an example, the CTS medium 22 enters the cold side CFX 4 at position 36 from a first cold side thermal storage tank 8 at the temperature $T_1$ and exits the cold side CFX 4 at position 37 into a second cold side thermal storage tank 9 at the temperature $T_0$, while the working fluid 20 enters the cold side CFX 4 at position 35 at the temperature $T_0$ and exits the cold side CFX 4 at position 30 at the temperature $T_1$. Again, the heat exchange process can take place at a constant or near-constant pressure such that the working fluid exits the cold side CFX 2 at position 30 at a higher temperature but same pressure $P_2$, as indicated by P and T↑ at position 30. Similarly, the temperature of the CTS medium 22 decreases in the cold side CFX 2, while its pressure can remain constant or near-constant.

During charge, the heat $Q_2$ is removed from the CTS medium and the heat $Q_1$ is added to the HTS medium, wherein $Q_1>Q_2$. A net amount of work $W_1-W_2$ is consumed, since the work $W_1$ used by the compressor is greater than the work $W_2$ generated by the turbine. A device that consumes work while moving heat from a cold body or thermal storage medium to a hot body or thermal storage medium is a heat pump; thus, the pumped thermal system in the charge mode operates as a heat pump.

In an example, the discharge mode shown in FIGS. 3 and 5 can differ from the charge mode shown in FIGS. 2 and 4 in the temperatures of the thermal storage media being introduced into the heat exchangers. The temperature at which the HTS medium enters the hot side CFX 2 at position 32 is $T_1^+$ instead of $T_0^+$, and the temperature of the CTS medium entering the cold side CFX 4 at position 36 is $T_0$ instead of $T_1$. During discharge, the working fluid enters the compressor at position 30 at $T_0$ and $P_2$, exits the compressor at position 31 at $T_0^+ < T_1^+$ and $P_1$, absorbs heat from the HTS medium in the hot side CFX 2, enters the turbine 3 at position 34 at $T_1^+$ and $P_1$, exits the turbine at position 35 at $T_1 > T_0$ and $P_2$, and finally rejects heat to the CTS medium in the cold side CFX 4, returning to its initial state at position 30 at $T_0$ and $P_2$.

The HTS medium at temperature $T_1^+$ can be stored in a first hot side thermal storage tank 6, the HTS medium at temperature $T_0^+$ can be stored in a second hot side thermal storage tank 7, the CTS medium at temperature $T_1$ can be stored in a first cold side thermal storage tank 8, and the CTS medium at temperature $T_0$ can be stored in a second cold side thermal storage tank 9 during both charge and discharge modes. In one implementation, the inlet temperature of the HTS medium at position 32 can be switched between $T_1^+$ and $T_0^+$ by switching between tanks 6 and 7, respectively. Similarly, the inlet temperature of the CTS medium at position 36 can be switched between $T_1$ and $T_0$ by switching between tanks 8 and 9, respectively. Switching between tanks can be achieved by including a valve or a system of valves (e.g., valve systems 12 and 13 in FIG. 7) for switching connections between the hot side heat exchanger 2 and the hot side tanks 6 and 7, and/or between the cold side heat exchanger 4 and the cold side tanks 8 and 9 as needed for the charge and discharge modes. In some implementations, connections may be switched on the working fluid side instead, while the connections of storage tanks 6, 7, 8 and 9 to the heat exchangers 2 and 4 remain static. In some examples, flow paths and connections to the heat exchangers may depend on the design (e.g., shell-and-tube) of each heat exchanger. In some implementations, one or more valves can be used to switch the direction of both the working fluid and the heat storage medium through the counter-flow heat exchanger on charge and discharge. Such configurations may be used, for example, due to high thermal storage capacities of the heat exchanger component, to decrease or eliminate temperature transients, or a combination thereof. In some implementations, one or more valves can be used to switch the direction of only the working fluid, while the direction of the HTS or CTS can be changed by changing the direction of pumping, thereby maintaining the counter-flow configuration. In some implementations, different valve configurations may be used for the HTS and the CTS. Further, any combination of the valve configurations herein may be used. For example, the system may be configured to operate using different valve configurations in different situations (e.g., depending on system operating conditions).

In the discharge mode shown in FIGS. 3 and 5, the working fluid 20 can enter the compressor 1 at position 30 at a pressure P and a temperature T (e.g., at $T_0$, $P_2$). As the working fluid passes through the compressor, work $W_1$ is consumed by the compressor to increase the pressure and temperature of the working fluid (e.g., to $T_0^+$, $P_1$), as indicated by P↑ and T↑ at position 31. In the discharge mode, the temperature $T_0^+$ of the working fluid exiting the compressor and entering the hot side CFX 2 at position 31 is lower than the temperature of the HTS medium 21 entering the hot side CFX 2 at position 32 from a first hot side thermal storage tank 6 at a temperature $T_1^+$ (i.e., $T_0^+ < T_1^+$). As these two fluids pass in thermal contact with each other in the heat exchanger, the working fluid's temperature increases as it moves from position 31 position 34, absorbing heat $Q_1$ from the HTS medium, while the temperature of the HTS medium in turn decreases as it moves from position 32 to position 33, giving off heat $Q_1$ to the working fluid. In an example, the working fluid exits the hot side CFX 2 at position 34 at the temperature $T_1^+$ and the HTS medium exits the hot side CFX 2 at position 33 into the second hot side thermal storage tank 7 at the temperature $T_0^+$. The heat exchange process can take place at a constant or near-constant pressure such that the working fluid exits the hot side CFX 2 at position 34 at a higher temperature but same pressure $P_1$, as indicated by P and T↑ at position 34. Similarly, the temperature of the HTS medium 21 decreases in the hot side CFX 2, while its pressure can remain constant or near-constant.

Upon exiting the hot side CFX 2 at position 34 (e.g., at $T_1^+$, $P_1$), the working fluid 20 undergoes expansion in the turbine 3 before exiting the turbine at position 35. During the expansion, the pressure and temperature of the working fluid decrease (e.g., to $T_1$, $P_2$), as indicated by P↓ and T↓ at position 35. The magnitude of work $W_2$ generated by the turbine depends on the enthalpy of the working fluid entering the turbine and the degree of expansion. In the discharge mode, heat is added to the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being higher than the enthalpy of the gas exiting the compressor, the work $W_2$ generated by the turbine 3 is greater than the work $W_1$ consumed by the compressor 1 (i.e., $W_2 > W_1$).

Because heat was added to the working fluid in the hot side CFX 2, the temperature $T_1$ at which the working fluid exits the turbine at position 35 is higher than the temperature $T_0$ at which the working fluid initially entered the compressor at position 30. To close the cycle (i.e., to return the pressure and temperature of the working fluid to their initial values $T_0$, $P_2$ at position 30), heat $Q_2$ is rejected by the working fluid to the CTS medium 22 in the cold side CFX 4 between positions 35 and 30 (i.e., between the turbine 3 and the compressor 1). The CTS medium 22 enters the cold side CFX 4 at position 36 from a second cold side thermal storage tank 9 at the temperature $T_0$ and exits the cold side CFX 4 at position 37 into a first cold side thermal storage tank 8 at the temperature $T_1$, while the working fluid 20 enters the cold side CFX 4 at position 35 at the temperature $T_1$ and exits the cold side CFX 4 at position 30 at the temperature $T_0$. Again, the heat exchange process can take place at a constant or near-constant pressure such that the working fluid exits the cold side CFX 2 at position 30 at a higher temperature but same pressure $P_2$, as indicated by P and T↓ at position 30. Similarly, the temperature of the CTS medium 22 increases in the cold side CFX 2, while its pressure can remain constant or near-constant.

During discharge, the heat $Q_2$ is added to the CTS medium and the heat $Q_1$ is removed from the HTS medium, wherein $Q_1 > Q_2$. A net amount of work $W_2 - W_1$ is generated, since the work $W_1$ used by the compressor is smaller than the work $W_2$ generated by the turbine. A device that generates work while moving heat from a hot body or thermal storage medium to a cold body or thermal storage medium is a heat engine; thus, the pumped thermal system in the discharge mode operates as a heat engine.

Figure 6:
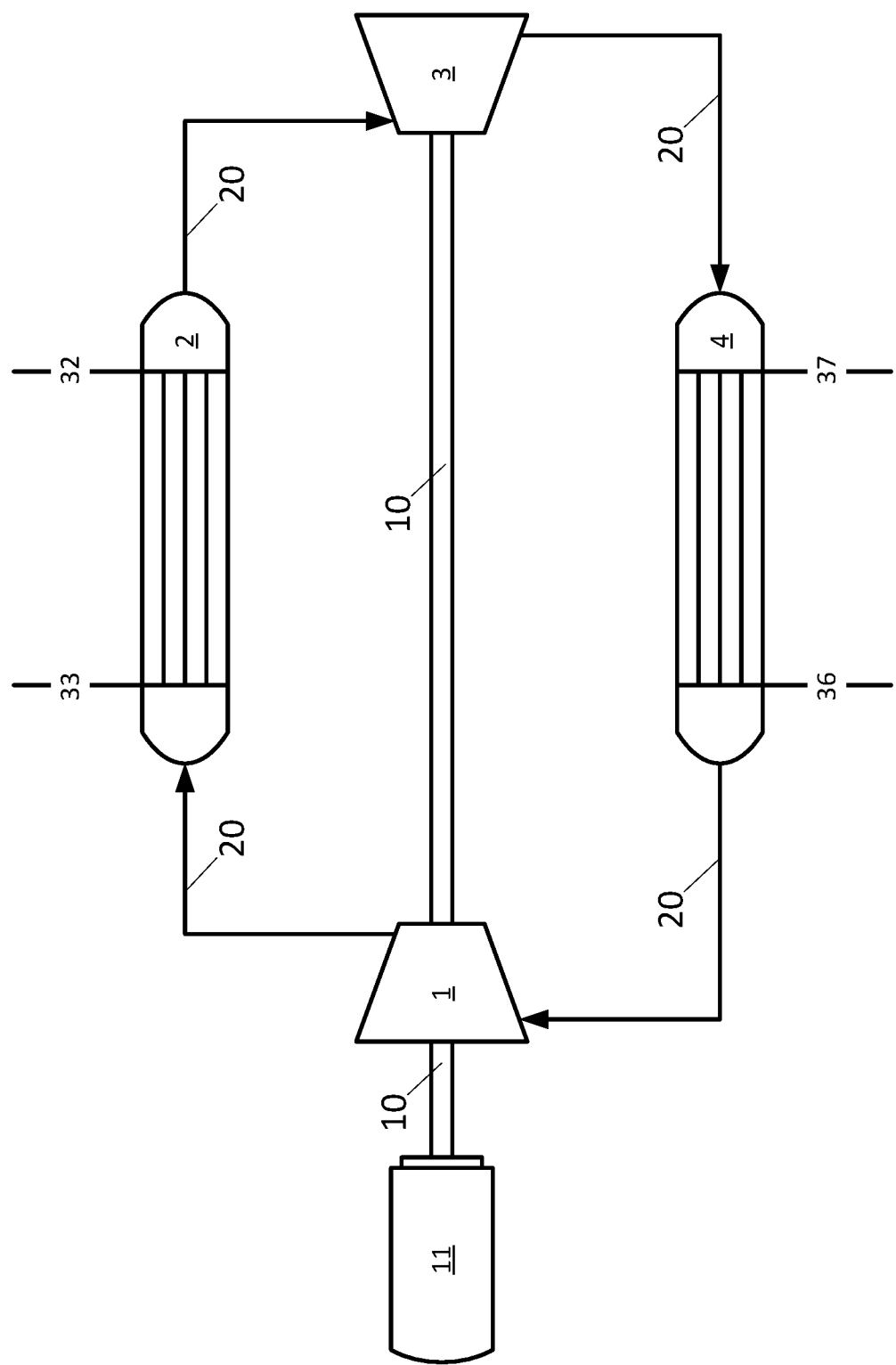
FIG. 6 is a schematic perspective view of a closed working fluid system in the pumped thermal system in FIGS. 2-3.

FIG. 6 is a simplified schematic perspective view of a closed working fluid system in the pumped thermal system in FIGS. 2-3. As indicated, the working fluid 20 (contained inside tubing) circulates clockwise between the compressor 1, the hot side heat exchanger 2, the turbine 3, and the cold side heat exchanger 4. The compressor 1 and the turbine 3 can be ganged on a common mechanical shaft 10 such that they rotate together. In some implementations, the compressor 1 and the turbine 3 can have separate mechanical shafts. A motor/generator 11 (e.g., including a synchronous motor—synchronous generator converter on a single common shaft) provides power to and from the turbomachinery. In this example, the compressor, the turbine and the motor/generator are all located on a common shaft. Pipes at positions 32 and 33 transfer hot side thermal storage fluid to and from the hot side heat exchanger 2, respectively. Pipes at positions 36 and 37 transfer cold side thermal storage fluid to and from the cold side heat exchanger 4, respectively.

Although the system of FIG. 6 is illustrated as comprising a compressor 1 and turbine 3, the system can include one or more compressors and one or more turbines, which may operate, for example, in a parallel configuration, or alternatively in a series configuration or in a combination of parallel and series configurations. In some examples, a system of compressors or turbines may be assembled such that a given compression ratio is achieved. In some cases, different compression ratios (e.g., on charge and discharge) can be used (e.g., by connecting or disconnecting, in a parallel and/or series configuration, one or more compressors or turbines from the system of compressors or turbines). In some examples, the working fluid is directed to a plurality of compressors and/or a plurality of turbines. In some examples, the compressor and/or turbine may have temperature dependent compression ratios. Arrangement and/or operation of the turbomachinery and/or other elements of the system may be adjusted in accordance with the temperature dependence (e.g., to optimize performance).

Figure 7:
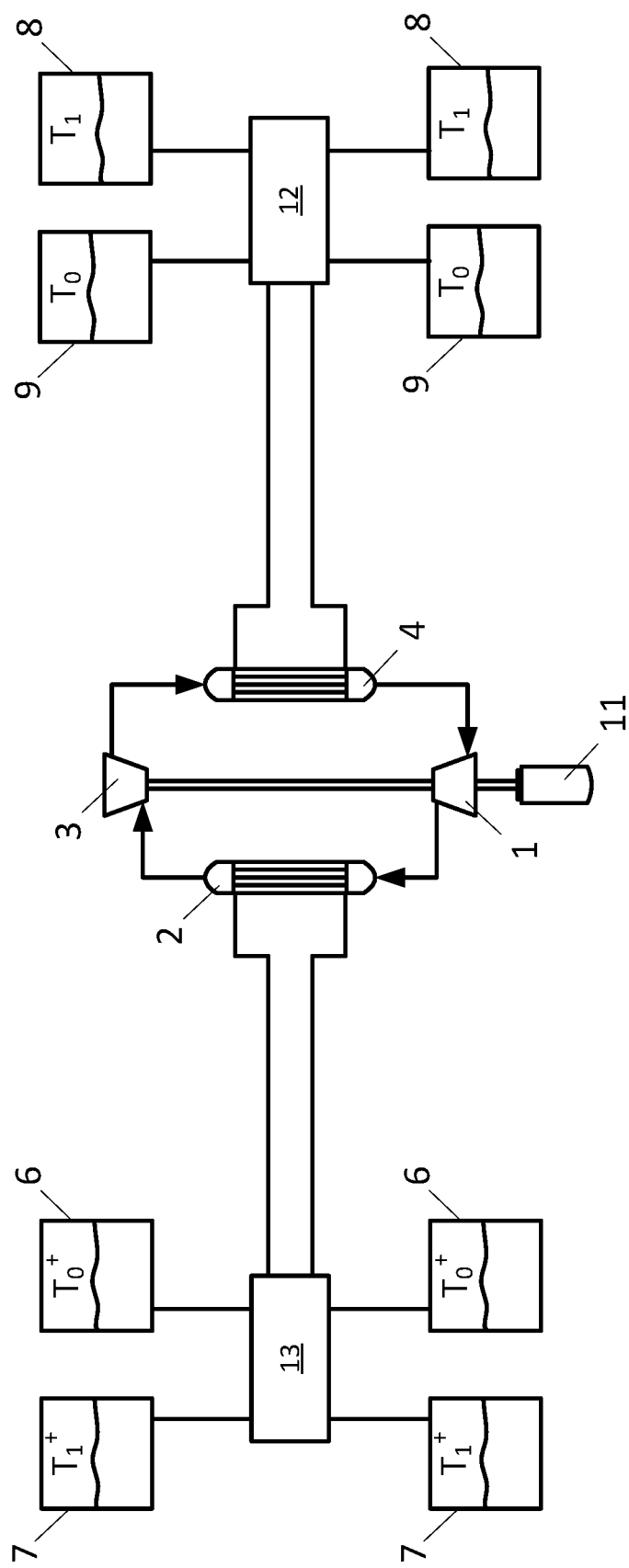
FIG. 7 is a schematic perspective view of the pumped thermal system in FIGS. 2-3 with hot side and cold side storage tanks and a closed cycle working fluid system.

FIG. 7 is a simplified schematic perspective view of the pumped thermal system in FIGS. 2-3 with hot side and cold side storage tanks and a closed cycle working fluid system. In this example, the HTS medium is a molten salt and the CTS medium is a low temperature liquid. One, two or more first hot side tanks 6 (at the temperature $T_1^+$) and one, two or more second hot side tanks 7 (at the temperature $T_0^+$), both for holding the HTS medium, are in fluid communication with a valve 13 configured to transfer the HTS medium to and from the hot side heat exchanger 2. One, two or more first cold side tanks 8 (at the temperature $T_1$) and one, two or more second cold side tanks 9 (at the temperature $T_0$), both for holding the CTS medium, are in fluid communication with a valve 12 configured to transfer the CTS medium to and from the cold side heat exchanger 4.

The thermal energy reservoirs or storage tanks may be thermally insulated tanks that can hold a suitable quantity of the relevant thermal storage medium (e.g., heat storage fluid). The storage tanks may allow for relatively compact storage of large amounts of thermal energy. In an example, the hot side tanks 6 and/or 7 can have a diameter of about 80 meters, while the cold side tanks 8 and/or 9 can have a diameter of about 60 meters. In another example, the size of each (i.e., hot side or cold side) thermal storage for a 1 GW plant operating for 12 hours can be about 20 medium-sized oil refinery tanks.

In some implementations, a third set of tanks containing storage media at intermediate temperatures between the other tanks may be included on the hot side and/or the cold side. In an example, a third storage or transfer tank (or set of tanks) at a temperature intermediate to the temperatures of a first tank (or set of tanks) and a second tank (or set of tanks) may be provided. A set of valves may be provided for switching the storage media between the different tanks and heat exchangers. For example, thermal media may be directed to different sets of tanks after exiting the heat exchangers depending on operating conditions and/or cycle being used. In some implementations, one or more additional sets of storage tanks at different temperatures may be added on the hot side and/or the cold side.

The storage tanks (e.g., hot side tanks comprising hot side thermal storage medium and/or cold side tanks comprising cold side thermal storage medium) may operate at ambient pressure. In some implementations, thermal energy storage at ambient pressure can provide safety benefits. Alternatively, the storage tanks may operate at elevated pressures, such as, for example, at a pressure of at least about 2 atm, at least about 5 atm, at least about 10 atm, at least about 20 atm, or more. Alternatively, the storage tanks may operate at reduced pressures, such as, for example, at a pressure of at most about 0.9 atm, at most about 0.7 atm, at most about 0.5 atm, at most about 0.3 atm, at most about 0.1 atm, at most about 0.01 atm, at most about 0.001 atm, or less. In some cases (e.g., when operating at higher/elevated or lower pressures or to avoid contamination of the thermal storage media), the storage tanks can be sealed from the surrounding atmosphere. Alternatively, in some cases, the storage tanks may not be sealed. In some implementations, the tanks may include one or more pressure regulation or relief systems (e.g., a valve for safety or system optimization).

As used herein, the first hot side tank(s) 6 (at the temperature $T_1^+$) can contain HTS medium at a higher temperature than the second hot side tank(s) 7 (at the temperature $T_0^+$), and the first cold side tank(s) 8 (at the temperature $T_1$) can contain CTS medium at a higher temperature than the second cold side tank(s) 9 (at the temperature $T_0$). During charge, HTS medium in the first (higher temperature) hot side tank(s) 6 and/or CTS medium in the second (lower temperature) cold side tank(s) 9 can be replenished. During discharge, HTS medium in the first (higher temperature) hot side tank(s) 6 and/or CTS medium in the second (lower temperature) cold side tank(s) 9 can be consumed.

In the foregoing examples, in either mode of operation, two of the four storage tanks 6, 7, 8 and 9 are feeding thermal storage medium to the heat exchangers 2 and 4 at the inlets 32 and 36, respectively, and the other two tanks are receiving thermal storage medium from the heat exchangers 2 and 4 from the exits 33 and 37, respectively. In this configuration, the feed tanks can contain a storage medium at a given temperature due to prior operating conditions, while the receiving tanks' temperatures can depend on current system operation (e.g., operating parameters, loads and/or power input). The receiving tank temperatures may be set by the Brayton cycle conditions. In some cases, the receiving tank temperatures may deviate from desired values due to deviations from predetermined cycle conditions (e.g., variation of absolute pressure in response to system demand) and/or due to entropy generation within the system. In some cases (e.g., due to entropy generation), at least one of the four tank temperatures can be higher than desired. In some implementations, a radiator can be used to reject or dissipate this waste heat to the environment. In some cases, heat rejection to the environment may be enhanced (e.g., using evaporative cooling etc.). The waste heat generated during operation of the pumped thermal systems herein can also be utilized for other purposes. For example, waste heat from one part of the system may be used elsewhere in the system. In another example, waste heat may be provided to an external process or system, such as, for example, a manufacturing process requiring low grade heat, commercial or residential heating, thermal desalination, commercial drying operations etc.

Components of pumped thermal systems of the disclosure may exhibit non-ideal performance, leading to losses and/or inefficiencies. The major losses in the system may occur due to inefficiencies of the turbomachinery (e.g., compressor and turbine) and the heat exchangers. The losses due to the heat exchangers may be small compared to the losses due to the turbomachinery. In some implementations, the losses due to the heat exchangers can be reduced to near zero with suitable design and expense. Therefore, in some analytical examples, losses due to the heat exchangers and other possible small losses due to pumps, the motor/generator and/or other factors may be neglected.

Losses due to turbomachinery can be quantified in terms of adiabatic efficiencies $\eta_c$ and $\eta_t$ (also known as isentropic efficiencies) for compressors and turbines, respectively. For large turbomachinery, typical values may range between $\eta_c$=0.85-0.9 for compressors and $\eta_t$=0.9-0.95 for turbines. The actual amount of work produced or consumed by a cycle can then be expressed as $$\Delta W = W_{actual}^{(out)} - W_{actual}^{(in)} = \eta_t W_{ideal}^{(out)} - \frac{1}{\eta_c} W_{ideal}^{(in)},$$

where, in an example assuming constant specific heats of the working fluid, $W_{ideal}^{(in)}=c_p T_{inlet}(\psi-1)$, $W_{ideal}^{(out)}=c_p T_{inlet}(1-\psi^{-1})$, where $$\psi = r^{\frac{\gamma-1}{\gamma}},$$

r is the compression ratio (i.e., ratio of the higher pressure to the lower pressure), and $\gamma=c_p/c_v$ is the ratio of specific heats of the working fluid. Due to compressor and turbine inefficiencies, more work is required to achieve a given compression ratio during compression, and less work is generated during expansion for a given compression ratio. Losses can also be quantified in terms of the polytropic, or single stage, efficiencies, $\eta_{cp}$ and $\eta_{tp}$, for compressors and turbines, respectively. The polytropic efficiencies are related to the adiabatic efficiencies $\eta_c$ and $\eta_t$ the equations $$\eta_c = \frac{\psi-1}{\psi^{1/\eta_{cp}}-1} \text{ and } \eta_t = \frac{1-\psi^{-\eta_{tp}}}{1-\psi^{-1}}.$$

In examples where $\eta_c=\eta_t=1$, pumped thermal cycles of the disclosure can follow identical paths in both charge and discharge cycles (e.g., as shown in FIGS. 4 and 5). In examples where $\eta_c<1$ and/or $\eta_t<1$, compression in the compressor can lead to a greater temperature increase than in the ideal case for the same compression ratio, and expansion in the turbine can lead to a smaller temperature decrease than in the ideal case.

In some implementations, the polytropic efficiency of the compressor $\eta_{cp}$ may be at least about 0.3, at least about 0.5, at least about 0.6, at least about 0.7, at least about 0.75, at least about 0.8, at least about 0.85, at least about 0.9, at least about 0.91, at least about 0.92, at least about 0.93, at least about 0.96, or more. In some implementations, the polytropic efficiency of the compressor $\eta_{tp}$ may be at least about 0.3, at least about 0.5, at least about 0.6, at least about 0.7, at least about 0.75, at least about 0.8, at least about 0.85, at least about 0.9, at least about 0.91, at least about 0.92, at least about 0.93, at least about 0.96, at least about 0.97 or more.

$T_0^+$, $T_1^+$ were previously defined as the temperatures achieved at the exit of a compressor with a given compression ratio r, adiabatic efficiency $\eta_c$ and inlet temperatures of $T_0$, $T_1$ respectively. In some examples, these four temperatures are related by the equation $$\frac{T_0^+}{T_0} = \frac{T_1^+}{T_1} = \psi^{1/\eta_{cp}}.$$

Figures 8, 9:
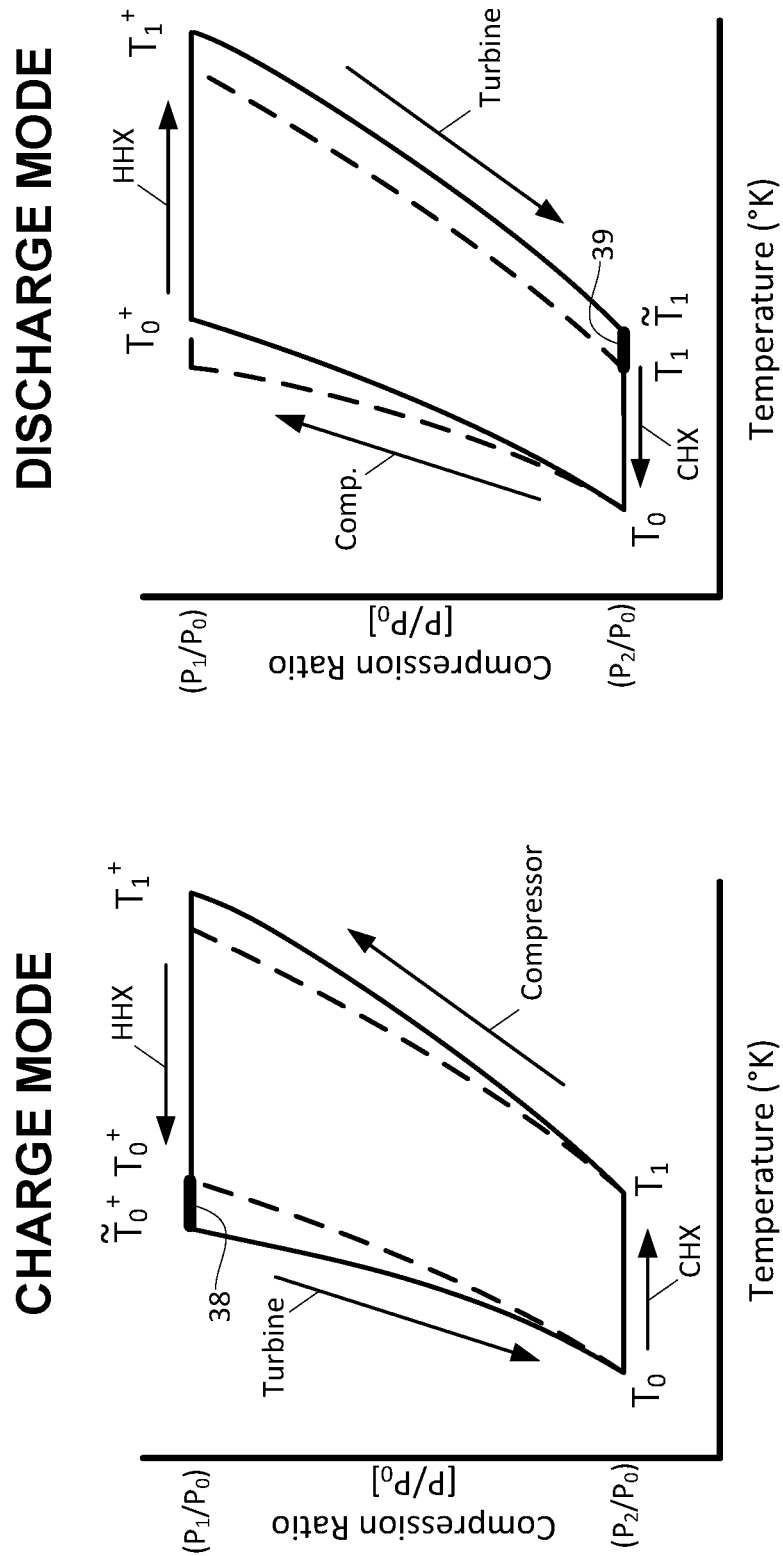
FIG. 8 shows a heat storage charge cycle for a water/molten salt system with $\eta_c$=0.9 and $\eta_t$=0.95. The dashed lines correspond to $\eta_c$=$\eta_t$=1.
FIG. 9 shows a heat storage discharge (extraction) cycle for the water/molten salt system in FIG. 8 with $\eta_c$=0.9 and $\eta_t$=0.95. The dashed lines correspond to $\eta_c$=$\eta_t$=1.

FIG. 8 shows an exemplary heat storage charge cycle for a water (CTS)/molten salt (HTS) system with $\eta_c$=0.9 and $\eta_t$=0.95. The dashed lines correspond to $\eta_c=\eta_t=1$ and the solid lines show the charge cycle with $\eta_t$=0.95 and $\eta_c$=0.9. In this example, the CTS medium on the cold side is water, and the HTS medium on the hot side is molten salt. In some cases, the system can include 4 heat storage tanks. In the charge cycle, the working fluid at $T_0$ and $P_2$ can exchange heat with a CTS medium in the cold side heat exchanger 4, whereby its temperature can increase to $T_1$ (assuming negligible pressure drop, its pressure can remain $P_2$). In the compressor 1 with $\eta_c$=0.9, the temperature and pressure of the working fluid can increase from $T_1$, $P_2$ to $T_1^+$, $P_1$. The working fluid can then exchange heat with an HTS medium in the hot side heat exchanger 2, such that its temperature can decrease (at constant pressure $P_1$, assuming negligible pressure drop). If the working fluid enters the turbine 3 with $\eta_t$=0.95 at the temperature $T_0^+$ and expands back to its original pressure $P_2$, its temperature when exiting the turbine may not be $T_0$. Instead, the working fluid may enter the turbine at a temperature $\tilde{T}_0^+$ and exit the turbine at the temperature $T_0$ and pressure $P_2$. In some examples, the temperatures are related by the relation $$\frac{\tilde{T}_0^+}{T_0} = \psi^{\eta_{tp}}.$$

In some examples, $\tilde{T}_0^+$ is the temperature at which the working fluid enters the inlet of a turbine with adiabatic efficiency $\eta_t$ and compression ratio r in order to exit at the temperature $T_0$.

In some implementations, the temperature $\tilde{T}_0^+$ may be incorporated into charge cycles of the disclosure by first heat exchanging the working fluid with the HTS medium from $T_1^+$ to $T_0^+$, followed by further cooling the working fluid from $T_0^+$ to $\tilde{T}_0^+$, as illustrated by section 38 of the cycle in FIG. 8.

FIG. 9 shows an exemplary heat storage discharge (extraction) cycle for the water/molten salt system in FIG. 8 with $\eta_c$=0.9 and $\eta_t$=0.95. The dashed lines correspond to $\eta_c=\eta_t=1$ and the solid lines show the charge cycle with $\eta_t$=0.95 and $\eta_c$=0.9. In the discharge cycle, the working fluid at $T_1$ and $P_2$ can exchange heat with a CTS medium in the cold side heat exchanger 4, whereby its temperature can decrease to $T_0$ (assuming negligible pressure drop, its pressure can remain $P_2$). In the compressor 1 with $\eta_c$=0.9, the temperature and pressure of the working fluid can increase from $T_0$, $P_2$ to $T_0^+$, $P_1$. The working fluid can then exchange heat with an HTS medium in the hot side heat exchanger 2, such that its temperature can increase (at constant pressure $P_1$, assuming negligible pressure drop). Working fluid entering the turbine 3 at $T_0^+$ may not exit the turbine at the temperature $T_1$ as in the charge cycle, but may instead exit at a temperature $\tilde{T}_1$, where, in some examples, $\tilde{T}_1=T_1^+\psi^{-\eta_{tp}}$.

In some examples, $\tilde{T}_1$ is the temperature at which the working fluid exits the outlet of a turbine with adiabatic efficiency $\eta_t$ and compression ratio r after entering the inlet of the turbine at the temperature $T_1^+$.

In some implementations, the temperature $\tilde{T}_1$ may be incorporated into the discharge cycles of the disclosure by first cooling the working fluid exiting the turbine at $\tilde{T}_1$ to $T_1$, as illustrated by section 39 of the cycle in FIG. 9, followed by heat exchanging the working fluid with the CTS medium from $T_1$ to $T_0$.

The charge and discharge cycles may be closed by additional heat rejection operations in sections 38 (between $T_0^+$ and $\tilde{T}_0^+$) and 39 (between $\tilde{T}_1$ and $T_1$), respectively. In some cases, closing the cycles through heat rejection in sections of the cycles where the working fluid can reject heat to ambient at low cost may eliminate the need for additional heat input into the system. The sections of the cycles where the working fluid can reject heat to ambient may be limited to sections where the temperature of the working fluid is high enough above ambient temperature for ambient cooling to be feasible. In some examples, heat may be rejected to the environment in sections 38 and/or 39. For example, heat may be rejected using one or more working fluid to air radiators, intermediate water cooling, or a number of other methods. In some cases, heat rejected in sections 38 and/or 39 may be used for another useful purpose, such as, for example, cogeneration, thermal desalination and/or other examples described herein.

Figure 10:
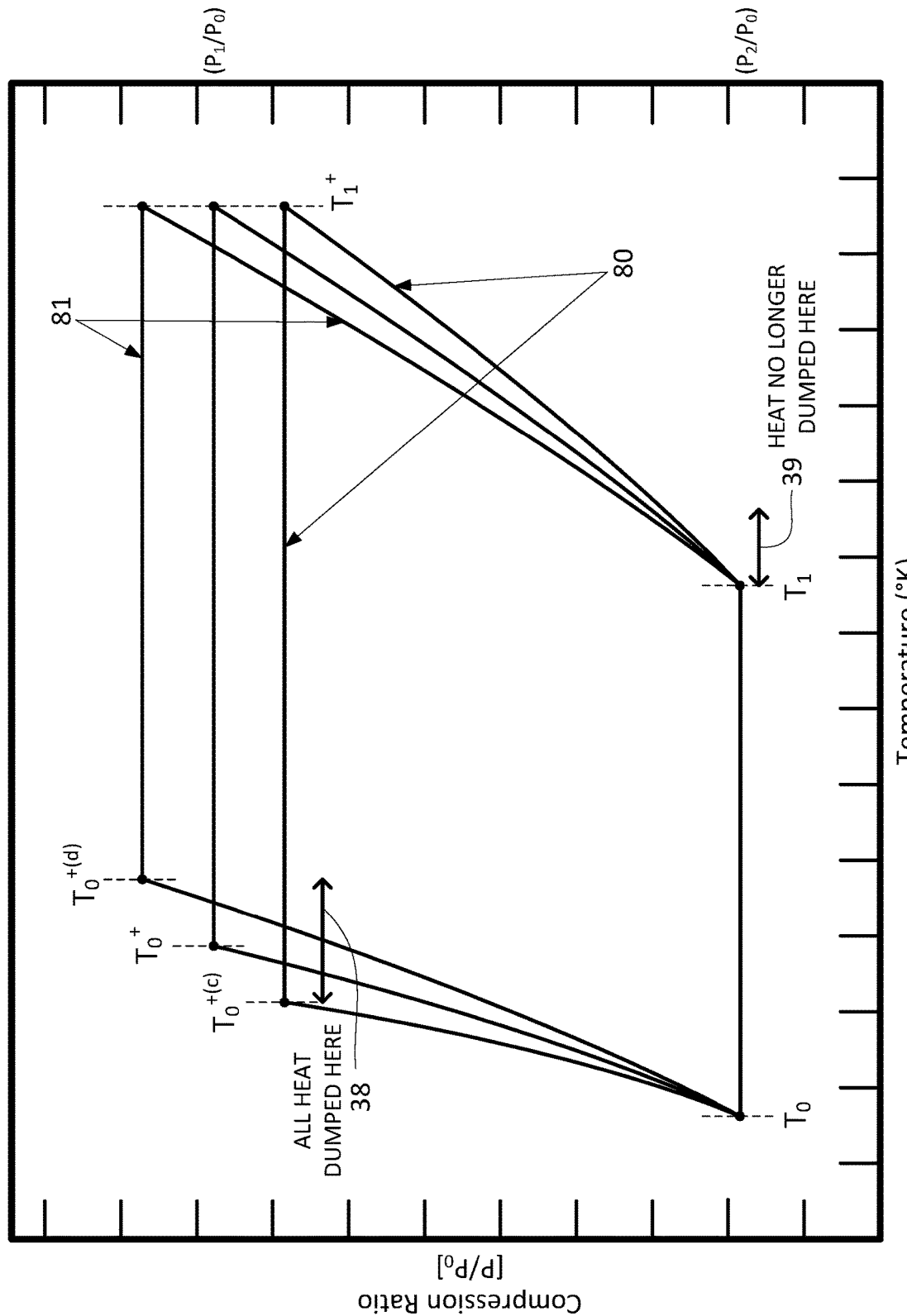
FIG. 10 shows a heat storage cycle in a pumped thermal system with variable compression ratios between the charge and discharge cycles.

In some implementations, the cycles may be closed by varying the compression ratios between the charge and discharge cycles, as shown, for example, in FIG. 10. The ability to vary compression ratio on charge and discharge may be implemented, for example, by varying the rotation speed of the compressor and/or turbine, by variable stator pressure control, by bypassing a subset of the compression or expansion stages on charge or discharge by the use of valves, or by using dedicated compressor/turbine pairs for charge and discharge mode. In one example, the compression ratio in the discharge cycle in FIG. 9 can be changed such that heat rejection in section is 39 is not used, and only heat rejection in section 38 in the charge cycle is used. Varying the compression ratio may allow heat (i.e., entropy) to be rejected at a lower temperature, thereby increasing overall roundtrip efficiency. In some examples of this configuration, the compression ratio on charge, $r_C$, can be set such that $$\frac{T_1^+}{T_1} = \psi_C^{1/\eta_{cp}},$$

and on discharge, the compression ratio $r_D$ can be set such that $$\frac{T_1^+}{T_1} = \psi_D^{\eta_{tp}}.$$

In some cases, the upper temperatures $T_1^+$ and $T_1$ can be identical on charge and discharge and no heat removal may be needed in this portion (also "leg" herein) of the cycle. In such cases, the temperature $T_0^+$ on charge (e.g., $T_0^{+(c)} = T_0 \psi_C^{\eta_{tp}}$) and the temperature $T_0^+$ on discharge (e.g., $T_0^{+(d)} = T_0 \psi_D^{1/\eta_{cp}}$) can be dissimilar and heat may be rejected (also "dissipated" or "dumped" herein) to the environment between the temperatures $T_0^{+(c)}$ and $T_0^{+(d)}$. In an implementation where only the storage media exchange heat with the environment, a heat rejection device (e.g., devices 55 and 56 shown in FIG. 16) can be used to lower the temperature of the CTS from $T_0^{+(d)}$ to $T_0^{+(c)}$ between discharge and charge.

FIG. 10 shows an example of a cycle with variable compression ratios. The compression ratio can be higher on discharge (when work is produced by the system) than on charge (when work is consumed by the system), which may increase an overall round trip efficiency of the system. For example, during a charge cycle 80 with $T_0^{+(c)}$, a lower compression ratio of <3 can be used; during a discharge cycle 81 with $T_0^{+(d)}$, a compression ratio of >3 can be used. The upper temperatures reached in both cycles 80 and 81 can be $T_1$ and $T_1^+$, and no excess heat may be rejected.

The compression ratio may be varied between charge and discharge such that the heat dissipation to the environment needed for closing the cycle on both charge and discharge occurs between the temperatures $T_0^{+(c)}$ (the temperature of the working fluid before it enters the turbine during the charge cycle) and $T_0^{+(D)}$ (the temperature of the working fluid as it exits the compressor on discharge) and not above the temperature $T_1$ (the temperature of the working fluid before it enters the compressor on charge and/or exits the turbine on discharge). In some examples, none of the heat is rejected at a temperature above the lowest temperature of the HTS medium.

In the absence of system losses and/or inefficiencies, such as, for example, in the case of pumped thermal systems comprising heat pump(s) and heat engine(s) operating at the zero entropy creation/isentropic limit, a given amount of heat $Q_H$ can be transferred using a given quantity of work Win heat pump (charge) mode, and the same $Q_H$ can be used in heat engine (discharge) mode to produce the same work W, leading to a unity (i.e., 100%) roundtrip efficiency. In the presence of system losses and/or inefficiencies, roundtrip efficiencies of pumped thermal systems may be limited by how much the components deviate from ideal performance.

The roundtrip efficiency of a pumped thermal system may be defined as $\eta_{store} = |W_{cv}^{extract}|/|W_{cv}^{charge}|$. In some examples, with an approximation of ideal heat exchange, the roundtrip efficiency can be derived by considering the net work output during the discharge cycle, $$|W_{cv}^{extract}| = \eta_t W_{ideal}^{out} - \frac{W_{ideal}^{in}}{\eta_c},$$

and the net work input during the charge cycle, $$|W_{cv}^{charge}| = \frac{W_{ideal}^{in}}{\eta_c} - \eta_t W_{ideal}^{out}$$

using the equations for work and temperature given above.

Roundtrip efficiencies may be calculated for different configurations of pumped thermal systems (e.g., for different classes of thermal storage media) based on turbomachinery component efficiencies, $\eta_c$ and $\eta_t$.

Figure 11:
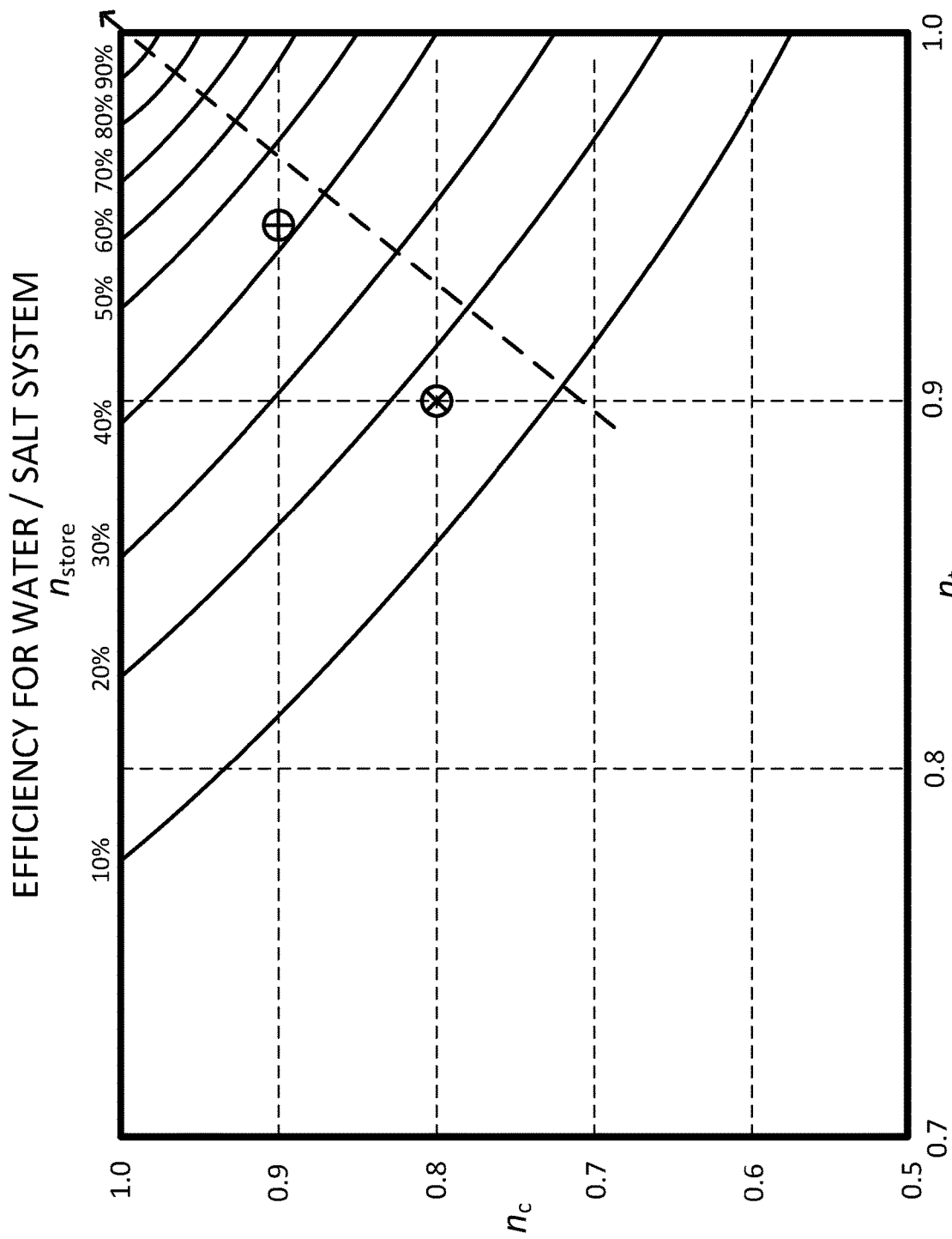
FIG. 11 shows roundtrip efficiency contours for a water/salt system. The symbols $\oplus$ and $\otimes$ represent an approximate range of present large turbomachinery adiabatic efficiency values. The dashed arrows represent the direction of increasing efficiency.

In one example, FIG. 11 shows roundtrip efficiency contours for a water/salt system, such as, for example, the water/salt system in FIGS. 8 and 9 with $T_0$=273 K (0° C.), $T_1$=373 K (100° C.) and a compression ratio of r=5.65 chosen to achieve compatibility with the salt(s) on the hot side. Exemplary roundtrip efficiency contours at values of $\eta_{store}$ of 10%, 20%, 30%, 40%, 50%, 60%, 70%, 80% and 90% are shown as a function of component efficiencies $\eta_c$ and $\eta_t$ on the x- and y-axes, respectively. The symbols ⊕ and ⊗ represent the approximate range of present large turbomachinery adiabatic efficiency values. The dashed arrows represent the direction of increasing efficiency.

Figure 12:
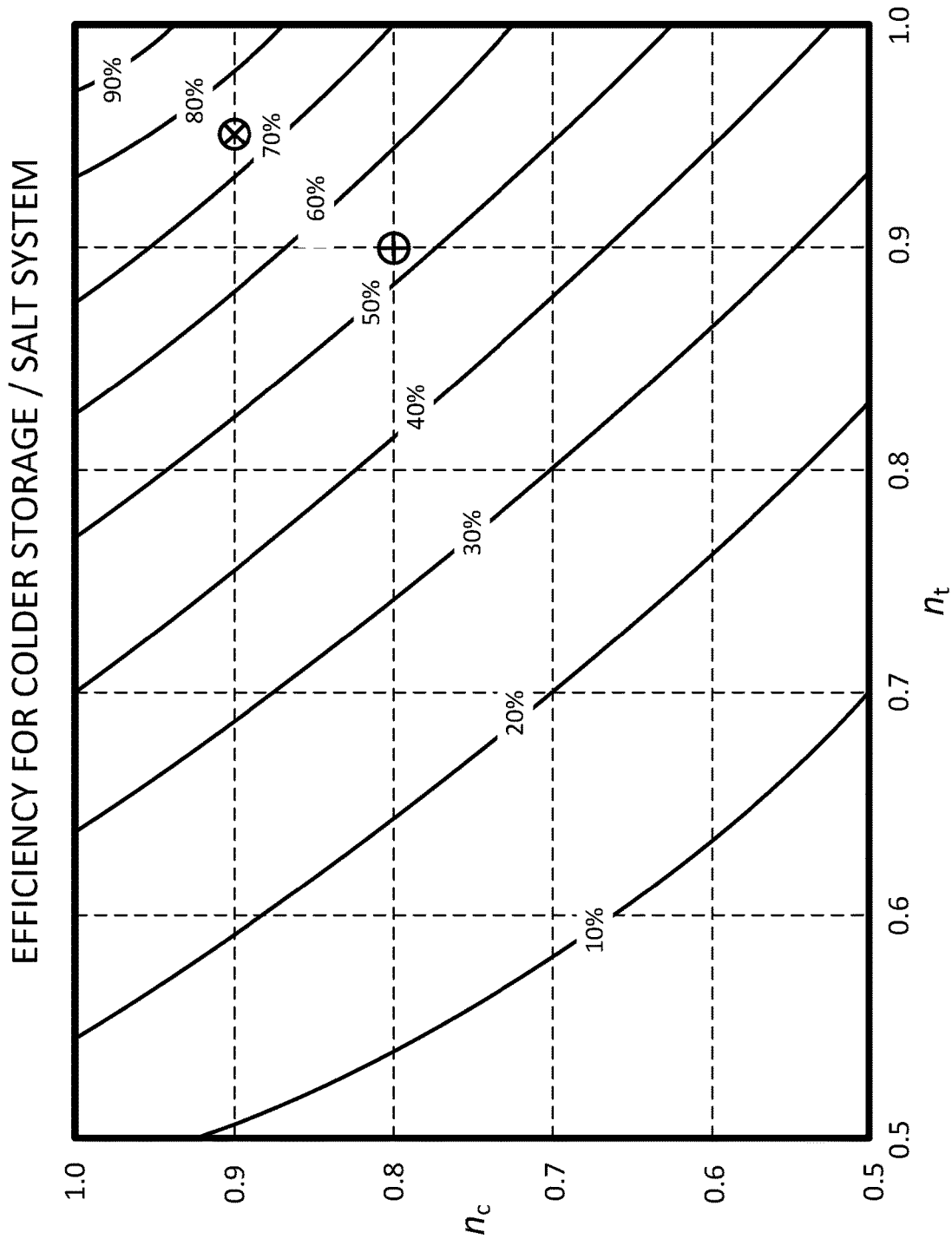
FIG. 12 shows roundtrip efficiency contours for a colder storage/salt system. The symbols $\oplus$ and $\otimes$ represent an approximate range of present large turbomachinery adiabatic efficiency values.

FIG. 12 shows roundtrip efficiency contours for a colder storage/salt system, such as, for example a hexane/salt system with a gas-gas heat exchanger in FIGS. 13, 14, 17 and 18 with $T_0$=194 K (−79° C.), $T_1$=494 K (221° C.) and a compression ratio of r=3.28. Exemplary roundtrip efficiency contours at values of $\eta_{store}$ of 10%, 20%, 30%, 40%, 50%, 60%, 70%, 80% and 90% are shown as a function of component efficiencies $\eta_c$ and $\eta_t$ on the x- and y-axes, respectively. The symbols ⊕ and ⊗ represent the approximate range of present large turbomachinery adiabatic efficiency values. As discussed in detail elsewhere herein, using hexane, heptane and/or another CTS medium capable of low temperature operation may result in significant improvements of system efficiency.

C. Pumped Thermal Storage Cycles with Recuperation

Another aspect of the disclosure is directed to pumped thermal systems with recuperation. In some situations, the terms regeneration and recuperation can be used interchangeably, although they may have different meanings. As used herein, the terms "recuperation" and "recuperator" generally refer to the presence of one or more additional heat exchangers where the working fluid exchanges heat with itself during different segments of a thermodynamic cycle through continuous heat exchange without intermediate thermal storage. The roundtrip efficiency of pumped thermal systems may be substantially improved if the allowable temperature ranges of the storage materials can be extended. In some implementations, this may be accomplished by choosing a material or medium on the cold side that can go to temperatures below 273 K (0° C.). For example, a CTS medium (e.g., hexane) with a low temperature limit of approximately $T_0$=179 K (−94° C.) may be used in a system with a molten salt HTS medium. However, $T_0^+$ (i.e., the lowest temperature of the working fluid in the hot side heat exchanger) at some (e.g., modest) compression ratios may be below the freezing point of the molten salt, making the molten salt unviable as the HTS medium. In some implementations, this can be resolved by including a working fluid to working fluid (e.g., gas-gas) heat exchanger (also "recuperator" herein) in the cycle.

Figure 13:
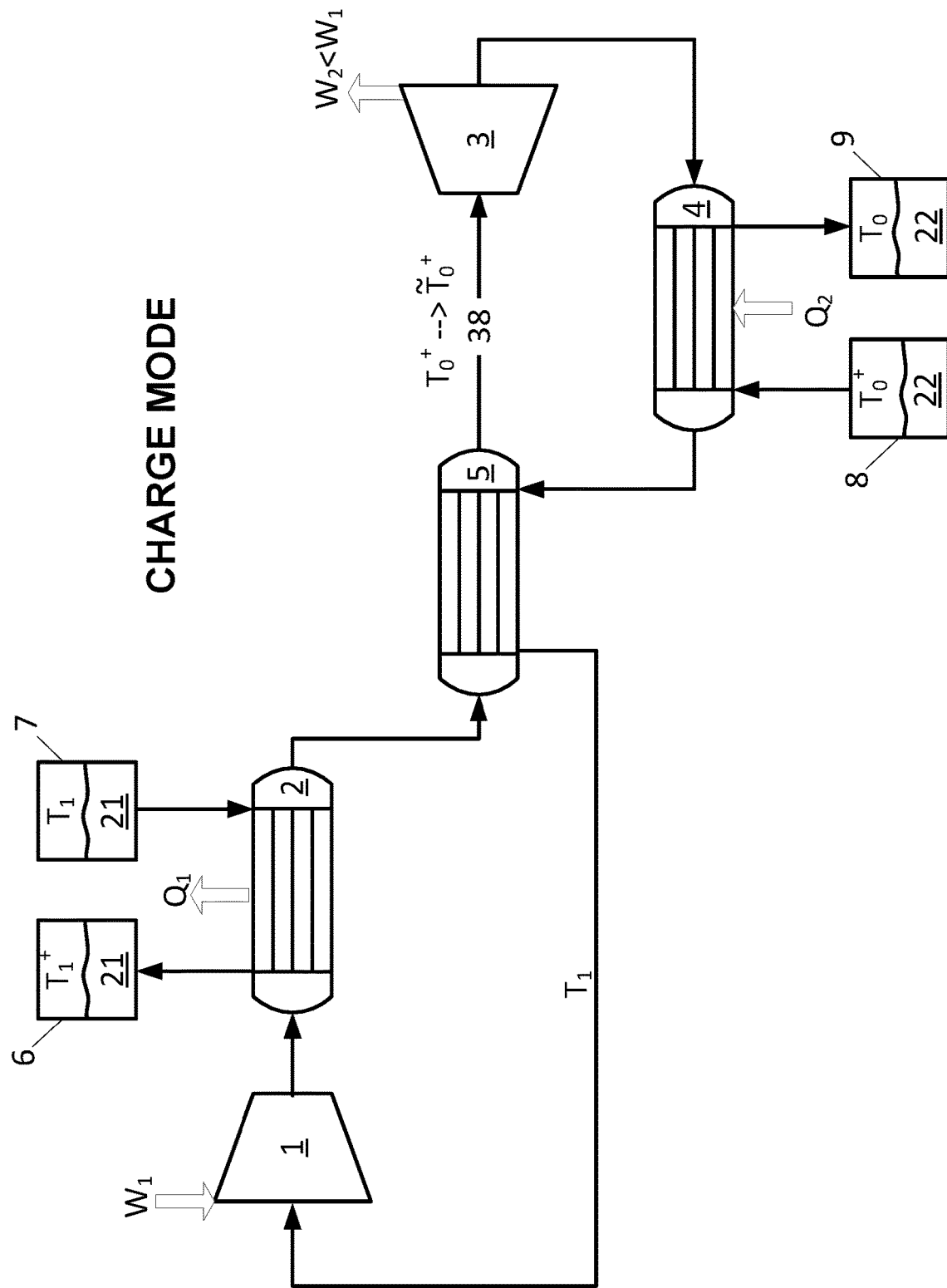
FIG. 13 is a schematic flow diagram of working fluid and heat storage media of a pumped thermal system with a gas-gas heat exchanger for the working fluid in a charge/heat pump mode.

FIG. 13 is a schematic flow diagram of working fluid and heat storage media of a pumped thermal system in a charge/heat pump mode with a gas-gas heat exchanger 5 for the working fluid. The use of the gas-gas heat exchanger can enable use of colder heat storage medium on the cold side of the system. The working fluid can be air. The working fluid can be dry air. The working fluid can be nitrogen. The working fluid can be argon. The working fluid can be a mixture of primarily argon mixed with another gas such as helium. For example, the working fluid may comprise at least about 50% argon, at least about 60% argon, at least about 70% argon, at least about 80% argon, at least about 90% argon, or about 100% argon, with balance helium.

Figure 17:
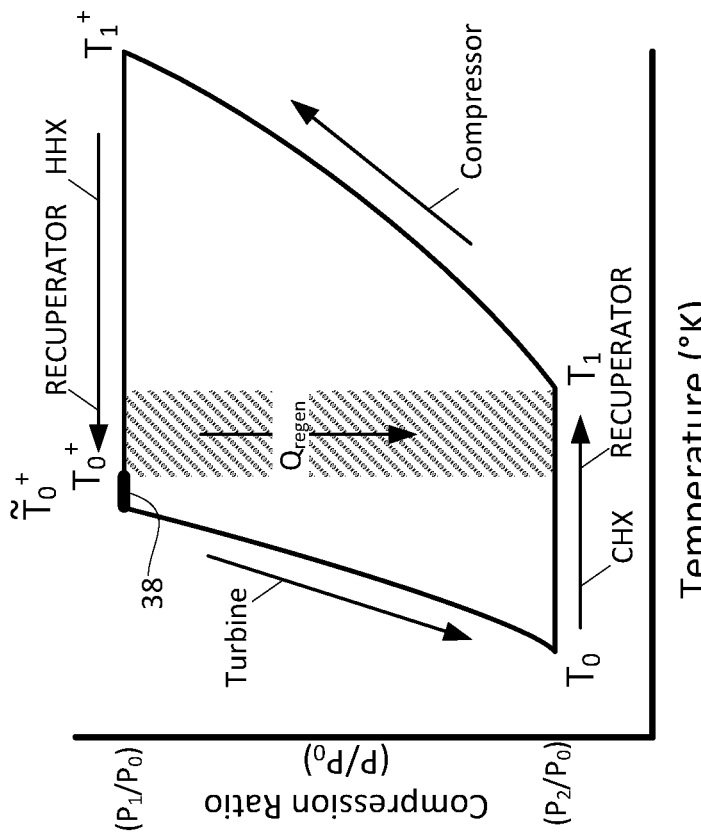
FIG. 17 shows a heat storage charge cycle for a storage system with a gas-gas heat exchanger, a cold side storage medium capable of going down to temperatures significantly below ambient temperature and $\eta_c$=0.9 and $\eta_t$=0.95.

FIG. 17 shows a heat storage charge cycle for the storage system in FIG. 13 with a cold side storage medium (e.g., liquid hexane) capable of going down to approximately to 179 K (−94° C.) and a molten salt as the hot side storage, and $\eta_c$=0.9 and $\eta_t$=0.95. The CTS medium can be hexane or heptane and the HTS medium can be molten salt. In some cases, the system can include four heat storage tanks.

In one implementation, during charge in FIGS. 13 and 17, the working fluid enters the compressor at $T_1$ and $P_2$, exits the compressor at $T_1^+$ and $P_1$, rejects heat $Q_1$ to the HTS medium 21 in the hot side CFX 2, exiting the hot side CFX 2 at $T_1$ and $P_1$, rejects heat $Q_{recup}$ (also "$Q_{regen}$" herein, as shown, for example, in the accompanying drawings) to the cold (low pressure) side working fluid in the heat exchanger or recuperator 5, exits the recuperator 5 at $T_0^+$ and $P_1$, rejects heat to the environment (or other heat sink) in section 38 (e.g., a radiator), enters the turbine 3 at $\tilde{T}_0^+$ and $P_1$, exits the turbine at $T_0$ and $P_2$, absorbs heat $Q_2$ from the CTS medium 22 in the cold side CFX 4, exiting the cold side CFX 4 at $T_0^+$ and $P_2$, absorbs heat $Q_{recup}$ from the hot (high pressure) side working fluid in the heat exchanger or recuperator 5, and finally exits the recuperator 5 at $T_1$ and $P_2$, returning to its initial state before entering the compressor.

Figure 14:
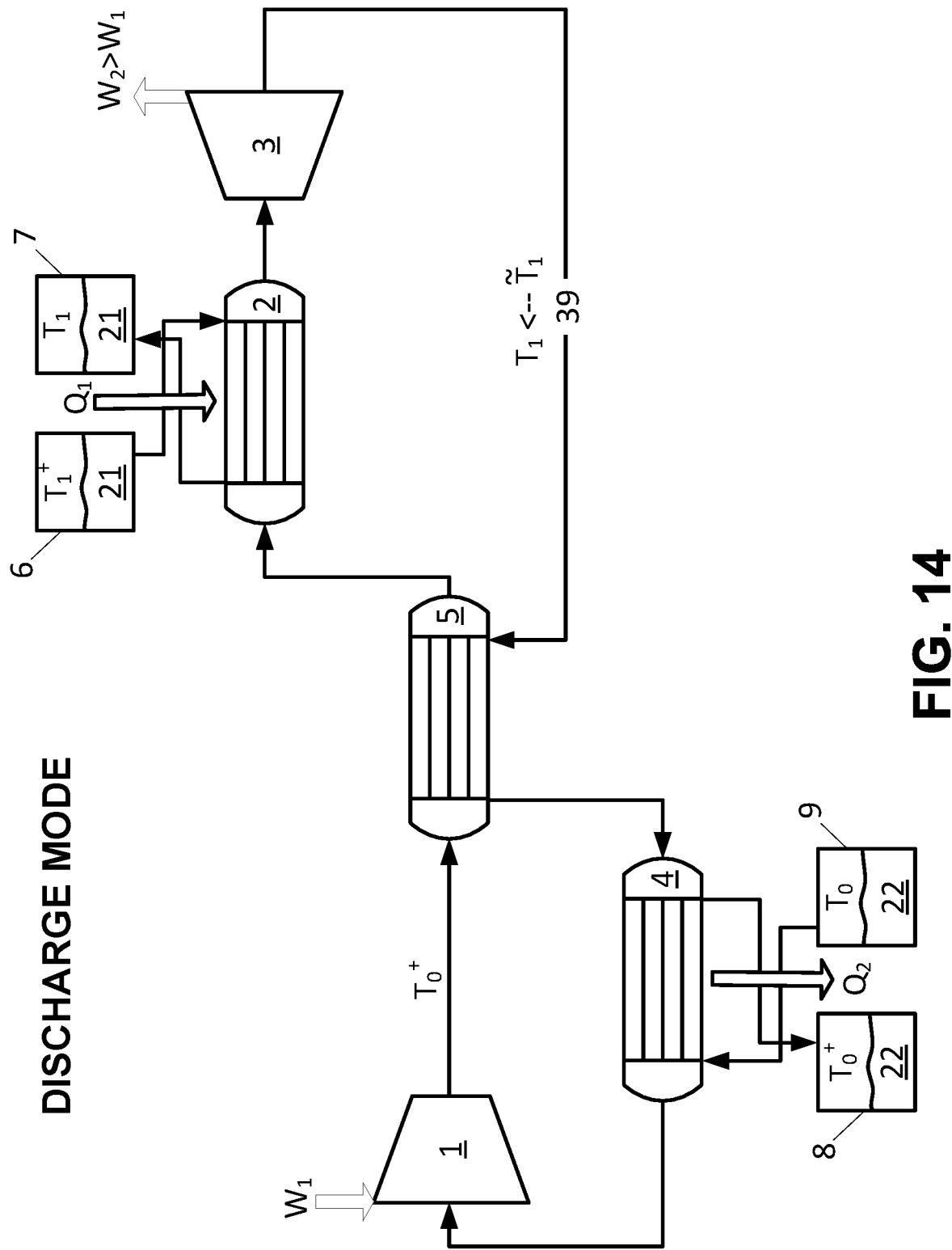
FIG. 14 is a schematic flow diagram of working fluid and heat storage media of a pumped thermal system with a gas-gas heat exchanger for the working fluid in a discharge/heat engine mode.

FIG. 14 is a schematic flow diagram of working fluid and heat storage media of the pumped thermal system in FIG. 13 in a discharge/heat engine mode. Again, the use of the gas-gas heat exchanger can enable use of colder heat storage fluid (CTS) and/or colder working fluid on the cold side of the system.

Figure 18:
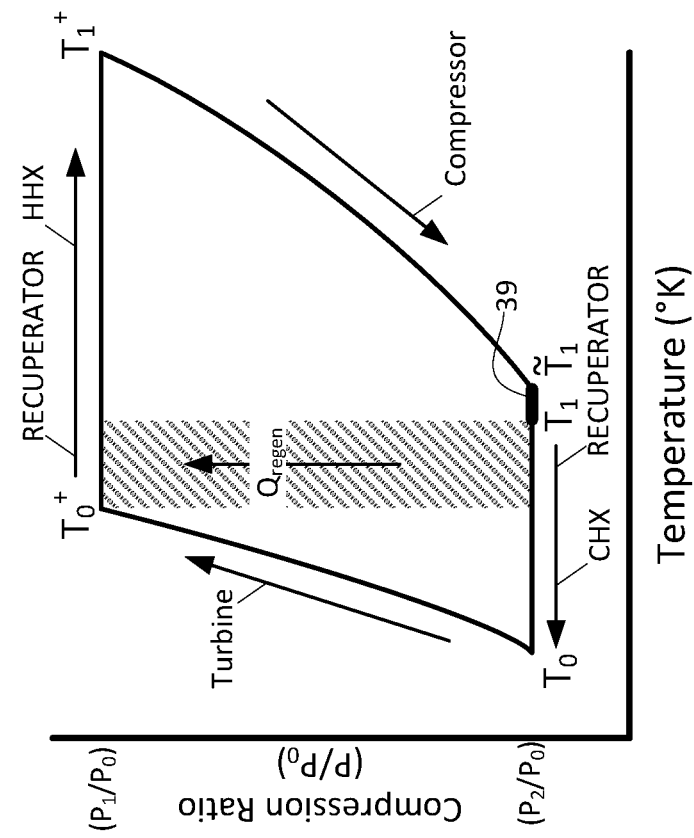
FIG. 18 shows a heat storage discharge cycle for a storage system with a gas-gas heat exchanger, a cold side storage medium capable of going down to temperatures significantly below ambient temperature and $\eta_c$=0.9 and $\eta_t$=0.95.

FIG. 18 shows a heat storage discharge cycle for the storage system for the storage system in FIG. 14 with a cold side storage medium (e.g., liquid hexane) capable of going down to 179 K (−94° C.) and a molten salt as the hot side storage, and $\eta_c$=0.9 and $\eta_t$=0.95. Again, the CTS medium can be hexane or heptane and the HTS medium can be molten salt, and the system may include 4 heat storage tanks.

During discharge in FIGS. 14 and 18, the working fluid enters the compressor at $T_0$ and $P_2$, exits the compressor at $T_0^+$ and $P_1$, absorbs heat $Q_{recup}$ from the cold (low pressure) side working fluid in the heat exchanger or recuperator 5, exits the recuperator 5 at $T_1$ and $P_1$, absorbs heat $Q_1$ from the HTS medium 21 in the hot side CFX 2, exiting the hot side CFX 2 at $T_1^+$ and $P_1$, enters the turbine 3 at $T_1^+$ and $P_1$, exits the turbine at $\tilde{T}_1$ and $P_2$, rejects heat to the environment (or other heat sink) in section 39 (e.g., a radiator), rejects heat $Q_{recup}$ to the hot (high pressure) side working fluid in the heat exchanger or recuperator 5, enters the cold side CFX 4 at $T_0^+$ and $P_2$, rejects heat $Q_2$ to the CTS medium 22 in the cold side CFX 4, and finally exits the cold side CFX 4 at $T_0$ and $P_2$, returning to its initial state before entering the compressor.

Figure 15:
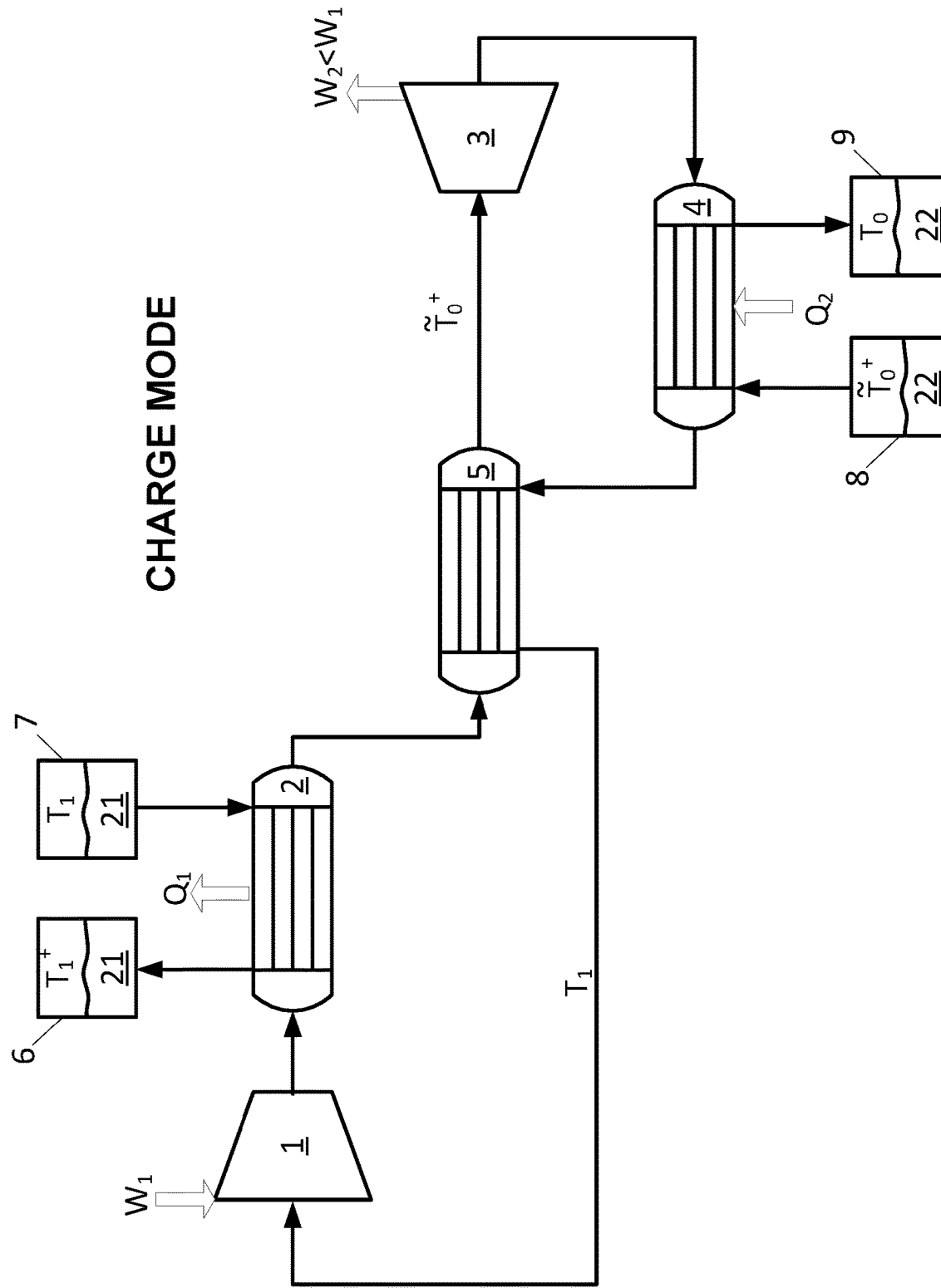
FIG. 15 is a schematic flow diagram of working fluid and heat storage media of a pumped thermal system with a gas-gas heat exchanger for the working fluid in a charge/heat pump mode with indirect heat rejection to the environment.

In another implementation, shown in FIG. 15, the charge cycle remains the same as in FIGS. 13 and 17, except that the working fluid exits the recuperator 5 at $\tilde{T}_0^+$ and $P_1$ (instead of at $T_0^+$ and $P_1$ as in FIGS. 13 and 17), enters the turbine 3 at $\tilde{T}_0^+$ and $P_1$, exits the turbine at $T_0$ and $P_2$, absorbs heat $Q_2$ from the CTS medium 22 having a temperature $\tilde{T}_0^+$ (instead of at $T_0^+$ as in FIGS. 13 and 17) in the cold side CFX 4, and exits the cold side CFX 4 at $\tilde{T}_0^+$ and $P_2$ (instead of at $T_0^+$ and $P_2$ as in FIG. 13) before reentering the recuperator 5. The heat between temperatures $T_0^+$ and $\tilde{T}_0^+$ is no longer rejected from the working fluid to the environment directly (as in section 38 in FIGS. 13 and 17).

Figure 16:
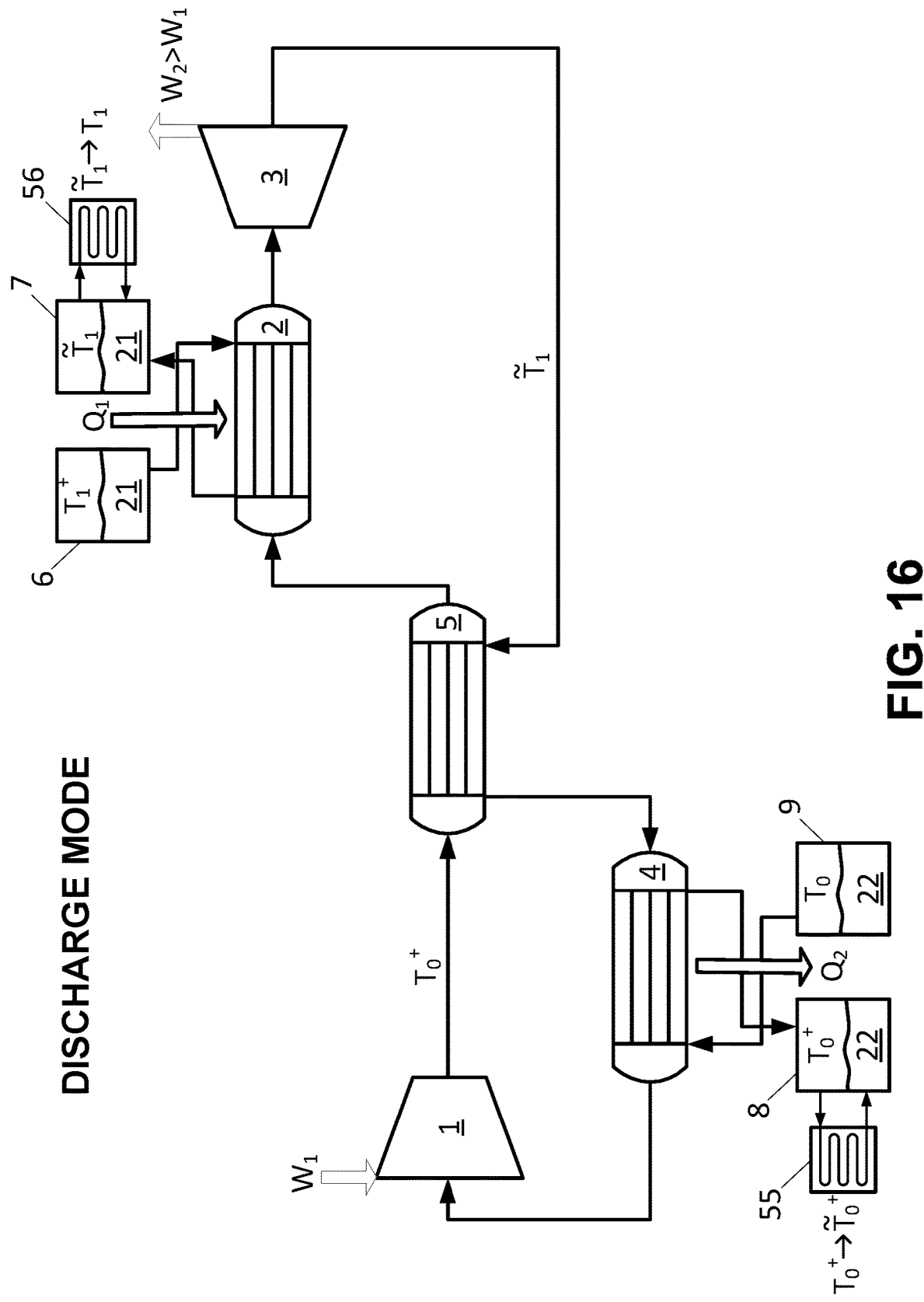
FIG. 16 is a schematic flow diagram of working fluid and heat storage media of a pumped thermal system with a gas-gas heat exchanger for the working fluid in a discharge/heat engine mode with indirect heat rejection to the environment.

During discharge in FIG. 16, the discharge cycle remains the same as in FIGS. 14 and 8B, except that the temperature of the HTS medium being deposited in tank 7 is changed. The working fluid exits the recuperator 5 at $\tilde{T}_1$ and $P_1$ (instead of at $T_1$ and $P_1$ as in FIGS. 14 and 8B) and absorbs heat $Q_1$ from the HTS medium 21 in the hot side CFX 2. The HTS medium exits the hot side CFX 2 having a temperature $\tilde{T}_1$ (instead of at $T_1$ as in FIGS. 14 and 18). The working fluid then exits the hot side CFX 2 at $T_1^+$ and $P_1$, enters the turbine 3 at $T_1^+$ and $P_1$, and exits the turbine at $\tilde{T}_1$ and $P_2$ before reentering the recuperator 5. The heat between temperatures $\tilde{T}_1$ and $T_1$ is no longer rejected from the working fluid to the environment directly (as in section 39 in FIGS. 14 and 18). As in FIG. 14, the CTS medium enters the tank 8 at temperature $T_0^+$.

After the discharge in FIG. 16, in preparation for the charge in FIG. 15, heat exchange with ambient may be used to cool the HTS medium 21 from the temperature $\tilde{T}_1$ used in the discharge cycle to the temperature $T_1$ used in the charge cycle. Similarly, heat exchange with ambient may be used to cool the CTS medium 22 from the temperature $T_0^+$ used in the discharge cycle to the temperature $\tilde{T}_0^+$ used in the charge cycle. Unlike in the configuration in FIGS. 13 and 14, where the working fluid may need to reject a substantial amount of heat (in sections 38 and 39, respectively) at a fast rate, in this configuration, the hot side and cold side storage media may be cooled at an arbitrarily slow rate (e.g., by radiating away or by other means of giving off the heat to the environment).

As shown in FIG. 16, in some implementations, heat can be rejected from the CTS medium to the environment by circulating the CTS medium in the tank 8 in a heat rejection device 55 that can absorb heat from the CTS medium and reject heat to the environment until the CTS medium cools from the temperature $T_0^+$ to the temperature $\tilde{T}_0^+$. In some examples, the heat rejection device 55 can be, for example, a radiator, a thermal bath containing a substance such as water or salt water, or a device immersed in a natural body of water such as a lake, river or ocean. In some examples, the heat rejection device 55 can also be an air cooling apparatus, or a series of pipes which are thermally connected to a solid reservoir (e.g., pipes embedded in the ground).

Similarly, in some implementations, heat can be rejected from the HTS medium to the environment by circulating the HTS in the tank 7 in a heat rejection device 56 that can absorb heat from the HTS medium and reject heat to the environment until the HTS medium cools from the temperature $\tilde{T}_1$ to the temperature $T_1$. In some examples, the heat rejection device 56 can be, for example, a radiator, a thermal bath containing a substance such as water or salt water, or a device immersed in a natural body of water such as a lake, river or ocean. In some examples, the heat rejection device 56 can also be an air cooling apparatus or a series of pipes which are thermally connected to a solid reservoir (e.g., pipes embedded in the ground).

In some implementations, rejecting heat to ambient through the use of the thermal storage media may be used in conjunction with the variable compression ratio charge and/or discharge cycles described, for example, in FIG. 10. In this system, only the CTS medium may exchange heat with ambient. Such a system can also be implemented with a recuperator to extend the temperature ranges of the HTS and CTS media in the cycles.

In some implementations, three separate cold side storage tanks at respective temperatures $T_0$, $\tilde{T}_0^+$ and $T_0^+$ may be used (e.g., an extra tank may be used in addition to the tanks 8 and 9). During heat exchange in the cold side CFX 4 in the discharge cycle, heat from the working fluid exiting the recuperator 5 may be transferred to the CTS medium in the $\tilde{T}_0^+$-tank. The CTS medium may be cooled in/by, for example, the heat rejection device 55 prior to entering the $\tilde{T}_0^+$-tank. In some implementations, three separate hot side storage tanks at respective temperatures $T_1$, $\tilde{T}_1$ and $T_1^+$ may be used (e.g., an extra tank may be used in addition to the tanks 6 and 7). During heat exchange in the hot side CFX 2 in the discharge cycle, heat from the working fluid exiting the recuperator 5 may be transferred to the HTS medium in the $\tilde{T}_1$-tank. The HTS medium may be cooled in/by, for example, the heat rejection device 56 prior to entering the $T_1$-tank. Heat rejection to the environment in such a manner may present several advantages. In a first example, it may eliminate the need for a potentially expensive working fluid to ambient heat exchanger that is capable of absorbing heat from the working fluid at a rate proportional to the power input/output of the system. The HTS and CTS media may instead reject heat over extended time periods, thus reducing the cost of the cooling infrastructure. In a second example, it may allow the decision regarding when heat is rejected to the environment to be delayed such that heat exchange to ambient may be performed when temperature (e.g., the ambient temperature) is most favorable.

In the charge and discharge cycles of FIGS. 13 and 17, and FIGS. 14 and 18, respectively, the same compression ratios and temperature values are used for both charge and discharge. In this configuration, the roundtrip efficiency can be about $\eta_{store}=74\%$, as given by $T_0=194$ K ($-79°$ C.), $T_1=494$ K ($221°$ C.). $\eta_f=0.95$, $\eta_c=0.9$ and $r=3.3$.

Thus, in some examples involving working fluid to working fluid recuperation, heat rejection on the hot side (high pressure) side of the closed charge cycle can take place in three operations (heat exchange with the HTS medium, followed by recuperation, followed by heat rejection to the environment), and heat rejection on the cold side (low pressure) side of the closed discharge cycle can take place in three operations (heat rejection to the environment, followed by recuperation, followed by heat exchange with the CTS medium). As a result of recuperation, the higher temperature HTS tank(s) 6 can remain at $T_1^+$ while the lower temperature HTS tank(s) 7 can now be at the temperature $T_1 > T_0^+$, and the lower temperature CTS tank(s) 9 can remain at $T_0$ while the higher temperature CTS tank(s) 8 can now be at the temperature $T_0^+ < T_1$.

In some cases, recuperation may be implemented using the heat exchanger 5 for direct transfer of heat between the working fluid on the high pressure side and the working fluid on the low pressure side. In an alternative configuration, an additional pair (or plurality) of heat exchangers together with an additional heat transfer medium or fluid (e.g., a dedicated thermal heat transfer fluid that is liquid in an appropriate temperature range, such as, for example, Therminol®) may be used to achieve recuperation. For example, an additional heat exchanger may be added in series with the cold side heat exchanger and an additional heat exchanger may be added in series with the hot side heat exchanger. The additional heat transfer medium may circulate between the two additional heat exchangers in a closed loop. In other examples, one or more additional heat exchangers may be placed elsewhere in the system to facilitate recuperation. Further, one or more additional heat transfer media or mixtures thereof may be used. The one or more additional heat transfer media fluids may be in fluid or thermal communication with one or more other components, such as, for example, a cooling tower or a radiator.

In one example, hexane or heptane can be used as a CTS medium, and nitrate salt can be used as an HTS medium. On the low pressure side of the cycle, the operating temperatures of the pumped thermal storage cycles may be limited by the melting point of hexane (178 K or $-95°$ C.) at $T_0$ and by the melting point of the nitrate (494 K or $221°$ C.) at $T_1$. On the high pressure side of the cycle, the operating temperatures may be limited by the boiling point of hexane (341 K or $68°$ C.) at $T_0^+$ and by the decomposition of nitrate (873 K or $600°$ C.) at $T_1^+$. At these conditions, the high pressure and low pressure temperature ranges can overlap such that recuperation can be implemented. The actual temperatures $T_0$, $T_1$, $T_0^+$ and $T_1^+$ and pressure ratios implemented in hexane/nitrate systems may differ from the limits above.

In some examples, recuperation may enable the compression ratio to be reduced. In some cases, reducing the compression ratio may result in reduced compressor and turbine losses. In some cases, the compression ratio may be at least about 1.2, at least about 1.5, at least about 2, at least about 2.5, at least about 3, at least about 3.5, at least about 4, at least about 4.5, at least about 5, at least about 6, at least about 8, at least about 10, at least about 15, at least about 20, at least about 30, or more.

In some cases, $T_0$ may be at least about 30 K, at least about 50 K, at least about 80 K, at least about 100 K, at least about 120 K, at least about 140 K, at least about 160 K, at least about 180 K, at least about 200 K, at least about 220 K, at least about 240 K, at least about 260 K, or at least about 280 K. In some cases, $T_0^+$ may be at least about 220 K, at least about 240 K, at least about 260 K, at least about 280 K, at least about 300 K, at least about 320 K, at least about 340 K, at least about 360 K, at least about 380 K, at least about 400 K, or more. In some cases, the temperatures $T_0$ and $T_0^+$ can be constrained by the ability to reject excess heat to the environment at ambient temperature. In some cases the temperatures $T_0$ and $T_0^+$ can be constrained by the operating temperatures of the CTS (e.g., a phase transition temperature). In some cases, the temperatures $T_0$ and $T_0^+$ can be constrained by the compression ratio being used. Any description of the temperatures $T_0$ and/or $T_0^+$ herein may apply to any system or method of the disclosure.

In some cases, $T_1$ may be at least about 350K, at least about 400 K, at least about 440 K, at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, or more. In some cases, $T_1^+$ may be at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, at least about 1500 K, at least about 1600 K, at least about 1700 K, or more. In some cases the temperatures $T_1$ and $T_1^+$ can be constrained by the operating temperatures of the HTS. In some cases the temperatures $T_1$ and $T_1^+$ can be constrained by the thermal limits of the metals and materials being used in the system. For example, a conventional solar salt can have a recommended temperature range of approximately 560-840 K. Various system improvements, such as, for example, increased roundtrip efficiency, increased power and increased storage capacity may be realized as available materials, metallurgy and storage materials improve over time and enable different temperature ranges to be achieved. Any description of the temperatures $T_1$ and/or $T_1^+$ herein may apply to any system or method of the disclosure.

In some cases, the roundtrip efficiency $\eta_{store}$ (e.g., electricity storage efficiency) with and/or without recuperation can be at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some implementations, at least a portion of heat transfer in the system (e.g., heat transfer to and from the working fluid) during a charge and/or discharge cycle includes heat transfer with the environment (e.g., heat transfer in sections 38 and 39). The remainder of the heat transfer in the system can occur through thermal communication with thermal storage media (e.g., thermal storage media 21 and 22), through heat transfer in the recuperator 5 and/or through various heat transfer processes within system boundaries (i.e., not with the surrounding environment). In some examples, the environment may refer to gaseous or liquid reservoirs surrounding the system (e.g., air, water), any system or medium capable of exchanging thermal energy with the system (e.g., another thermodynamic cycle or system, heating/cooling systems, etc.), or any combination thereof. In some examples, heat transferred through thermal communication with the heat storage media can be at least about 25%, at least about 50%, at least about 60%, at least about 70%, at least about 80%, or at least about 90% of all heat transferred in the system. In some examples, heat transferred through heat transfer in the recuperator can be at least about 5%, at least about 10%, at least about 15%, at least about 20%, at least about 25%, at least about 50%, or at least about 75% of all heat transferred in the system. In some examples, heat transferred through thermal communication with the heat storage media and through heat transfer in the recuperator can be at least about 25%, at least about 50%, at least about 60%, at least about 70%, at least about 80%, at least about 90%, or even about 100% of all heat transferred in the system. In some examples, heat transferred through heat transfer with the environment can be less than about 5%, less than about 10%, less than about 15%, less than about 20%, less than about 30%, less than about 40%, less than about 50%, less than about 60%, less than about 70%, less than about 80%, less than about 90%, less than about 100%, or even 100% of all heat transferred in the system. In some implementations, all heat transfer in the system may be with the thermal storage media (e.g., the CTS and HTS media), and only the thermal storage media may conduct heat transfer with the environment.

Pumped thermal cycles of the disclosure (e.g., the cycles in FIGS. 13 and 14) may be implemented through various configurations of pipes and valves for transporting the working fluid between the turbomachinery and the heat exchangers. In some implementations, a valving system may be used such that the different cycles of the system can be interchanged while maintaining the same or nearly the same temperature profile across at least one, across a subset or across all of counter-flow heat exchangers in the system. For example, the valving may be configured such that the working fluid can pass through the heat exchangers in opposite flow directions on charge and discharge and flow directions of the HTS and CTS media are reversed by reversing the direction of the pumps.

In some implementations, the system with a recuperator may have a different compression and/or expansion ratio on charge and discharge. This may then involve heat rejection at only one or both of the heat rejection locations 38 and 39 as shown in FIG. 5C along the lines described above.

FIG. 19 is a schematic flow diagram of hot side recharging in a pumped heat cycle in solar mode with heating of a solar salt solely by solar power. The system can comprise a solar heater for heating the hot side heat storage. The HTS medium 21 in the second hot thermal storage tank 7 of a discharge cycle, such as, for example, the HTS medium of the discharge cycle in FIG. 14, can be recharged within element 17 using heating provided by solar radiation. The HTS medium (e.g., molten salt) can be heated by solar heating from the temperature $T_1$ in the second hot thermal storage tank 7 to the temperature $T_1^+$ in the first hot thermal storage tank 6.

In some implementations, such as, for example, for the systems in FIG. 19 solar heat for heating the HTS medium (e.g., from $T_1$=493 K (220° C.) to $T_1^+$=873 K (600° C.)) may be provided by a concentrating solar facility. In some examples, a small scale concentrating facility may be utilized for providing heat. In some cases, the concentrating solar facility may include one or more components for achieving high solar concentrating efficiency, including, for example, high-performance actuators (e.g., adaptive fluidic actuators manufactured from polymers), mutiplexing control system, dense heliostat layout etc. In some examples, the heat provided for heating the HTS medium (e.g., in the element 17) may be a waste heat stream from the concentrating solar facility.

Figure 20:
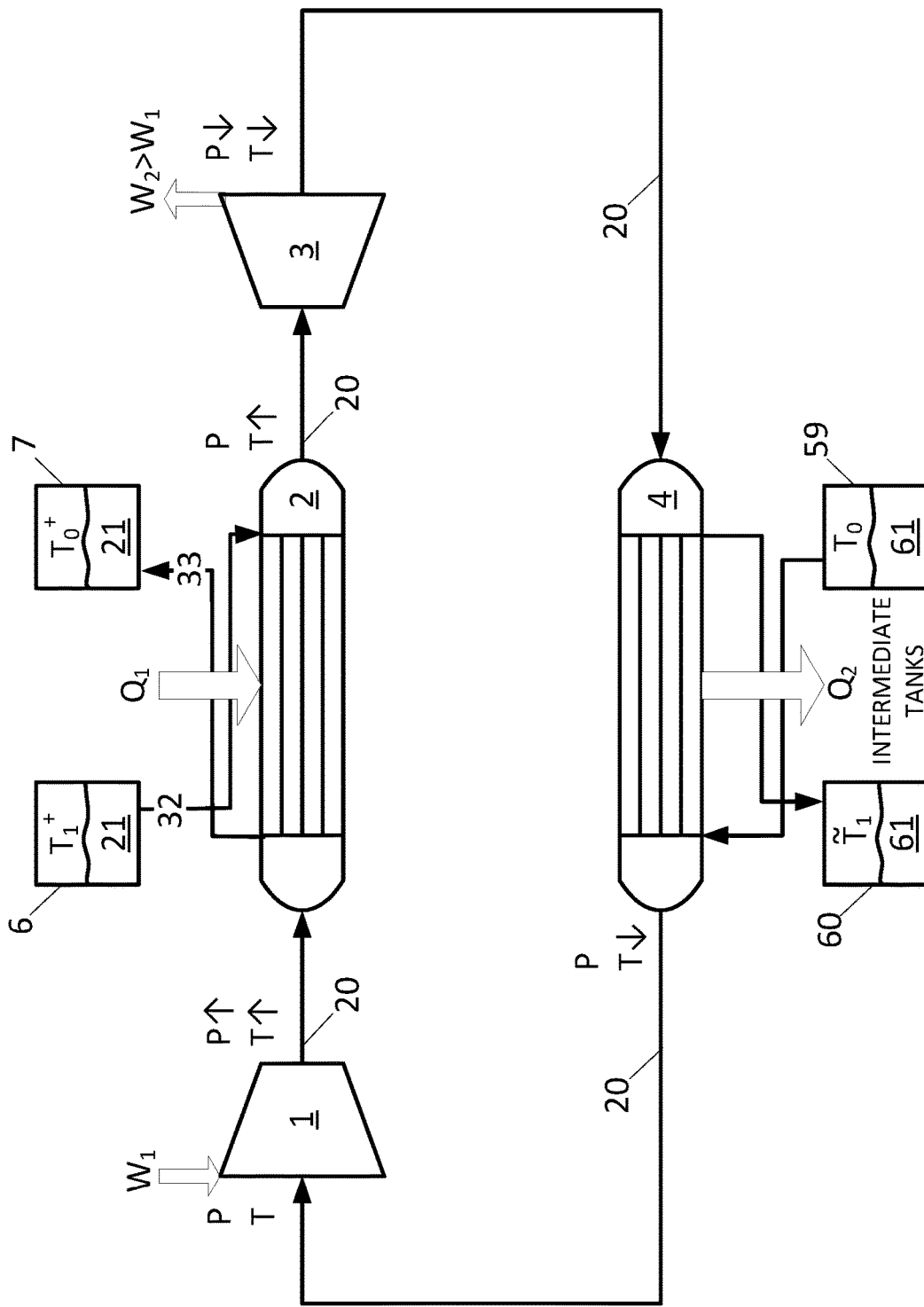
FIG. 20 is a schematic flow diagram of a pumped thermal system discharge cycle with heat rejection to ambient.

FIG. 20 is a schematic flow diagram of a pumped thermal system discharge cycle that can be coupled with external heat input (e.g., solar, combustion) with heat rejection to ambient. Such a discharge cycle may be used, for example, in situations where the capacity for hot side recharging (e.g., using solar heating, waste heat or combustion) is greater than the capacity for cold side recharging. Solar heat may be used to charge the HTS medium 21 in the hot side storage tanks from $T_1$ to $T_1^+$, as described elsewhere herein. The discharge cycle can operate similarly to the discharge cycle in FIG. 3, but after exiting the turbine 3, the working fluid 20 can proceed to the cold side CFX 4 heat exchanger 4 where it exchanges heat with an intermediate thermal storage (ITS) medium 61 having a lower temperature $T_0$ at or near ambient temperature. The ITS medium 61 enters the cold side CFX 4 from a second intermediate thermal storage tank 59 at the temperature $T_0$ (e.g., ambient temperature) and exits the cold side CFX 4 into a first intermediate thermal storage tank 60 at the temperature $\tilde{T}_1$, while the working fluid 20 enters the cold side CFX 4 at the temperature $\tilde{T}_1$ and exits the cold side CFX 4 at the temperature $T_0$. The working fluid enters the compressor 1 at $T_0$ and $P_2$, exits the compressor at $T_0^+$ and $P_1$, absorbs heat $Q_1$ from the HTS medium 21 in the hot side CFX 2, exits the hot side CFX 2 at $T_1^+$ and $P_1$, enters the turbine 3 at $T_1^+$ and $P_1$, exits the turbine at $\tilde{T}_1$ and $P_2$, rejects heat $Q_2$ from the ITS medium 61 in the cold side CFX 4, and exits the cold side CFX 4 at $T_0$ and $P_2$, returning to its initial state before entering the compressor.

In some implementations, the ITS medium 61 may be a liquid over the entire range from $T_0$ to $\tilde{T}_1$. In other implementations, the ITS medium 61 may not be a liquid over the entire range from $T_0$ to $\tilde{T}_1$, but may be provided to the counter-flow heat exchanger 4 at a higher flow rate in order to achieve a lower temperature rise across the counter-flow heat exchanger (e.g., such that the temperature of the ITS medium at the exit of the counter-flow heat exchanger 4 is lower than $\tilde{T}_1$) while still cooling the working fluid from $\tilde{T}_1$ to $T_0$. In this instance, the temperature of the ITS medium in the tank 60 can be lower than $\tilde{T}_1$. The ITS medium in the tank 60 can exchange heat with ambient (e.g., through a radiator or other implementations described herein) in order to cool back to the temperature $T_0$. In some cases, the ITS medium can then be returned to the tank 59. In some cases, the heat deposited in the ITS medium may be used for various useful purposes such as, for example, residential or commercial heating, thermal desalination or other uses described elsewhere herein.

Figure 21:
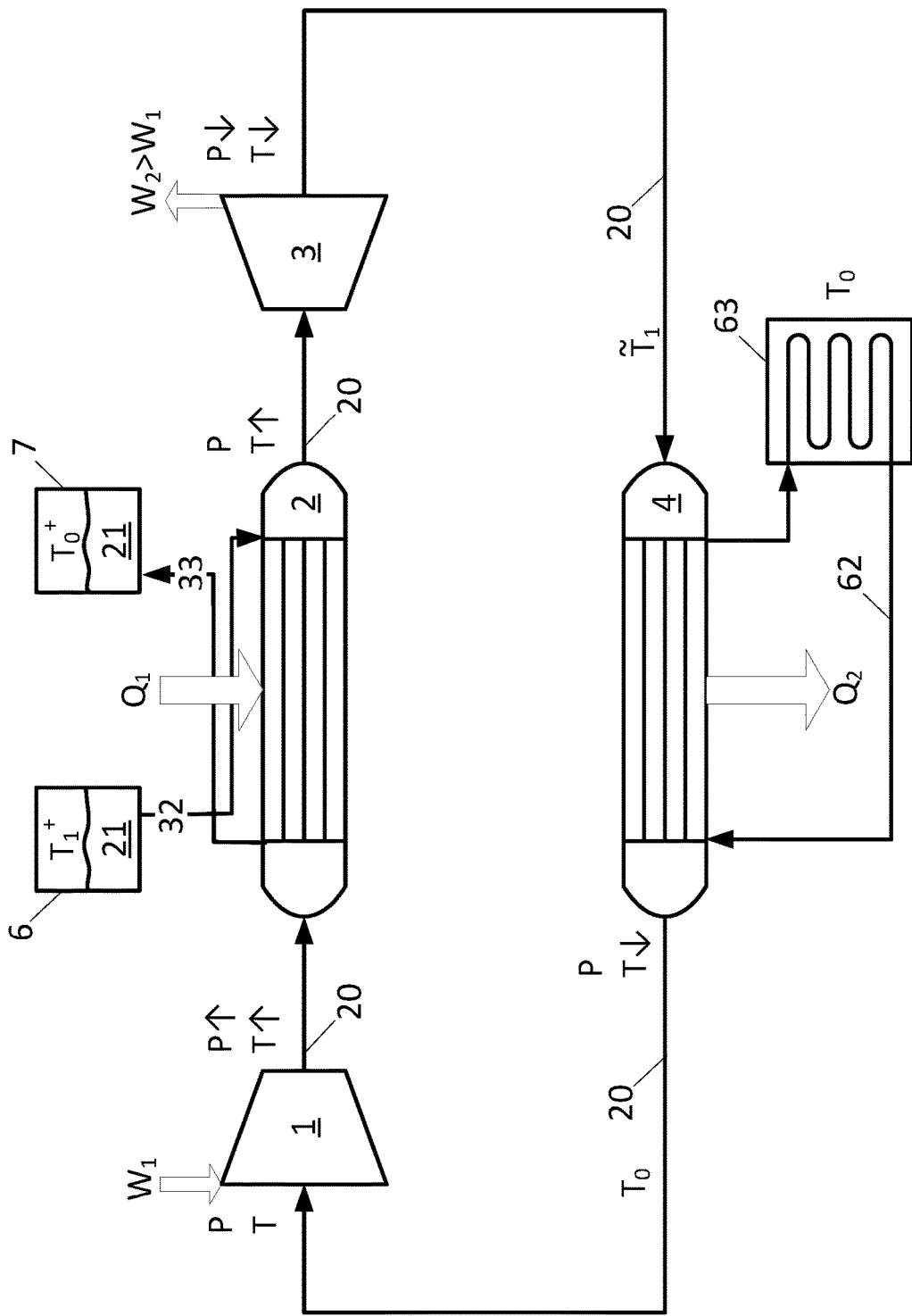
FIG. 21 is a schematic flow diagram of a pumped thermal system discharge cycle with heat rejection to an intermediate fluid circulated in a thermal bath at ambient temperature.

FIG. 21 is a schematic flow diagram of a pumped thermal system discharge cycle in solar mode or combustion heated mode with heat rejection to an intermediate fluid circulated in a thermal bath at ambient temperature. The discharge cycle can operate similarly to the discharge cycle in FIG. 20, but after exiting the turbine 3, the working fluid 20 can proceed to the cold side CFX 4 where it exchanges heat with an intermediate medium or fluid 62 circulating through a thermal bath 63 at the temperature $T_0$ at or near ambient temperature. The intermediate medium or fluid 62 (e.g., Therminol®, or a heat transfer oil) may be used for exchanging heat between the working fluid 20 and a thermal bath 63 in the cold side CFX 4. The use of the intermediate fluid 62 may provide an advantage over contacting an inexpensive thermal sink or medium (e.g., water) directly with the working fluid. For example, directly contacting such a thermal medium with the working fluid in the cold side CFX 4 may cause problems, such as, for example, evaporation or over-pressurization (e.g., explosion) of the thermal medium. The intermediate fluid 62 can remain in liquid phase throughout all, at least a portion of, or a significant portion of the operation in the cold side CFX 4. As the intermediate fluid 62 passes through the thermal bath 58, it can be sufficiently cooled to circulate back into the cold side CFX 4 for cooling the working fluid from $\tilde{T}_1$ to $T_0$. The thermal bath 63 may contain a large amount of inexpensive heat sink material or medium, such as, for example, water. In some cases, the heat deposited in the heat sink material may be used for various useful purposes such as, for example, residential or commercial heating, thermal desalination or other uses described elsewhere herein. In some cases, the heat sink material may be re-equilibrated with ambient temperature (e.g., through a radiator or other implementations described herein).

In some implementations, the discharge cycles in FIG. 20 and/or 21 may include a recuperator, as described in greater detail in examples throughout the disclosure. Such systems may be implemented using the temperatures $T_1^+$, $T_1$, $T_0^+$ and $T_0$ described in greater detail elsewhere herein.

D. Solar Assisted Pumped Thermal Storage Cycles with Intercooling

In some instances, the pumped thermal system may provide heat sources and/or cold sources to other facilities or systems such as, for example, through co-location with a gas to liquids (GTL) facility or a desalination facility. In one example, the GTL facilities may make use of one or more of the cold reservoirs in the system (e.g., the CTS medium in the tank 9 for use in oxygen separation in the GTL facility) and/or one or more hot reservoirs in the system (e.g., the HTS medium in the tank 6 for use in a Fischer-Tropsch process in the GTL facility). In another example, one or more hot reservoirs or one or more cold reservoirs in the pumped thermal system may be used for the operation of thermal desalination methods. Further examples of possible heat and cold uses include co-location or heat exchange with building/area heating and cooling systems.

Conversely, in some cases, the pumped thermal system may make use of waste heat sources and/or waste cold sources from other facilities or systems such as, for example, through co-location with a liquefied natural gas import or export terminal. For example, a waste cold source may be used for cooling the cold side thermal storage media 22. In some implementations, recharging of the cold side using waste cold may be combined with recharging of the hot side thermal storage media 21 by external heat input (e.g., solar, combustion, waste heat, etc.). In some cases, the recharged storage media can then be used in a discharge cycle such as, for example, the discharge cycles in FIG. 14 or 16. In some cases, the pumped thermal system may be used as a heat engine with a waste heat source serving as the hot side heat input and a waste cold source serving as the cold side heat sink. In another implementation, the hot side storage media may be recharged using a modified version of the cycle shown in FIG. 15, where the temperature $T_0$ is about the ambient temperature and $\tilde{T}_0^+$ corresponds to a temperature above the ambient temperature. In some examples, a waste heat source can be used to provide the heat needed at a temperature of at least $\tilde{T}_0^+$ for heating the working fluid and/or the CTS medium to $\tilde{T}_0^+$. In another implementation, an intermediate fluid (e.g., Therminol®) which can remain liquid between the temperatures $\tilde{T}_0^+$ and $T_0$ may be used to transfer the heat from the waste heat source to the working fluid.

E. Pumped Thermal Systems with Dedicated Compressor/Turbine Pairs

In a further aspect of the disclosure, pumped thermal systems comprising multiple working fluid systems, or working fluid flow paths are provided. In some cases, pumped thermal system components in the charge and discharge modes may be the same. For example, the same compressor/turbine pair may be used in charge and discharge cycles. Alternatively, one or more system components may differ between charge and discharge modes. For example, separate compressor/turbine pairs may be used in charge and discharge cycles. In one implementation, the system has one set of heat exchangers, and a common set of HTS and CTS tanks which are charged or discharged by two pairs or sets of compressors and turbines. In another implementation, the system has a common set of HTS and CTS tanks, but separate sets of heat exchangers and separate sets of compressors and turbines.

Pumped thermal systems with recuperation, utilization of external sources of heat, cold and/or waste heat/cold may benefit from having separate compressor/turbine pairs as a result of operation of turbomachinery over large and/or different temperature ranges in charge and discharge modes. For example, temperature changes between charge and discharge cycles may lead to a thermal adjustment period or other difficulties during transition between the cycles (e.g., issues or factor related to metallurgy, thermal expansion, Reynolds number, temperature dependent compression ratios, tip clearance and/or bearing friction etc.). In another example, turbomachinery (e.g., turbomachinery used in systems with recuperation) may operate over a relatively low pressure ratio (e.g., with relatively few compression stages) but over relatively large temperature during both compression and expansion. The temperature ranges may change (e.g., switch as in FIGS. 17 and 18) between charge and discharge modes. In some cases, the operation over large temperature ranges during compression and/or expansion may complicate design of a combined compressor/turbine for both charge and discharge. Furthermore, recuperation, waste heat/cold incorporation and/or other pumped thermal system features may reduce the compression ratio of the compressor/turbine in the charge cycle and/or the discharge cycle, thereby reducing the cost associated with duplicating compressor/turbine sets.

Figure 22:
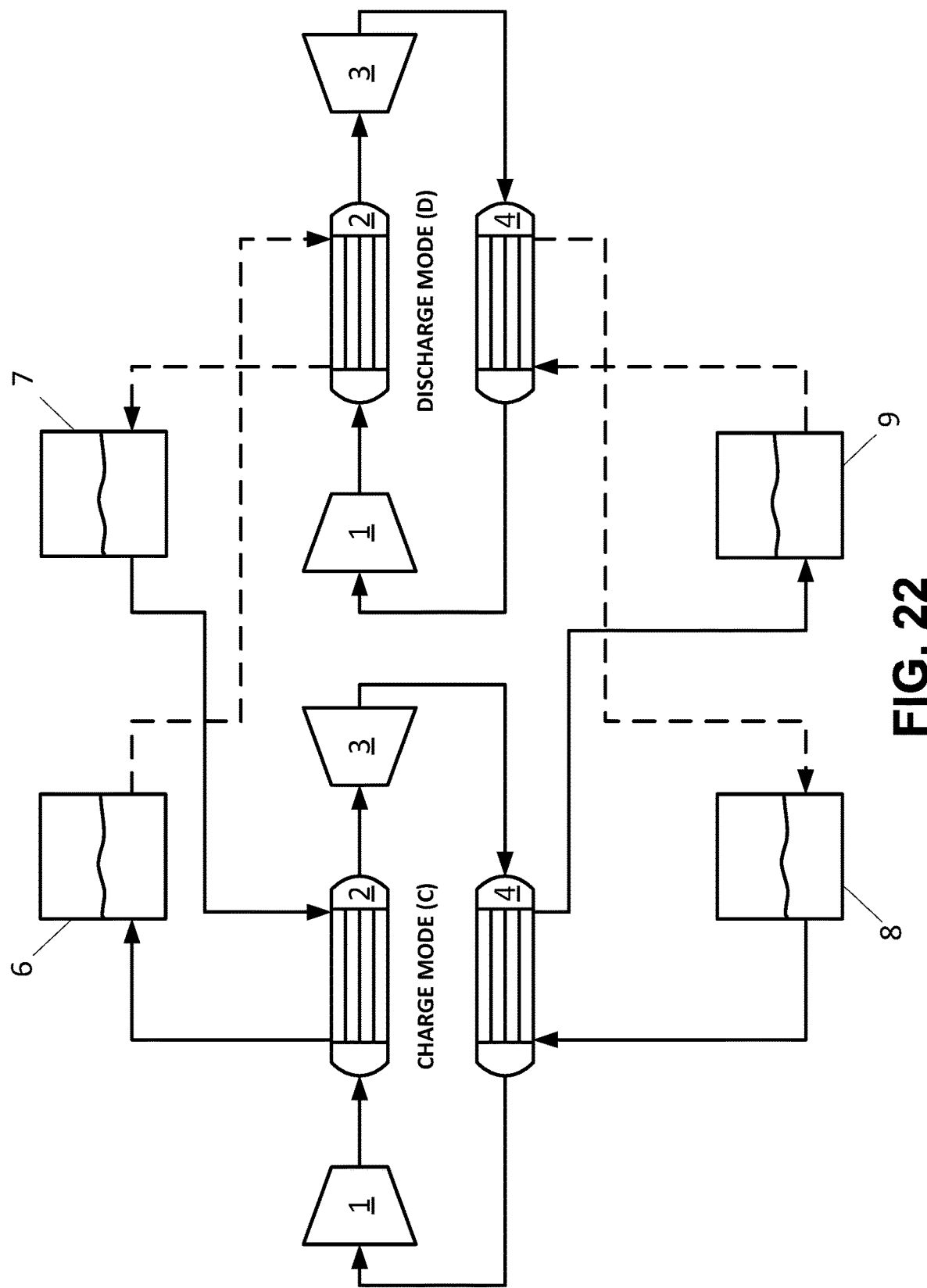
FIGS. 22 and 23 are pumped thermal systems with separate compressor/turbine pairs for charge and discharge modes.
Figure 23:
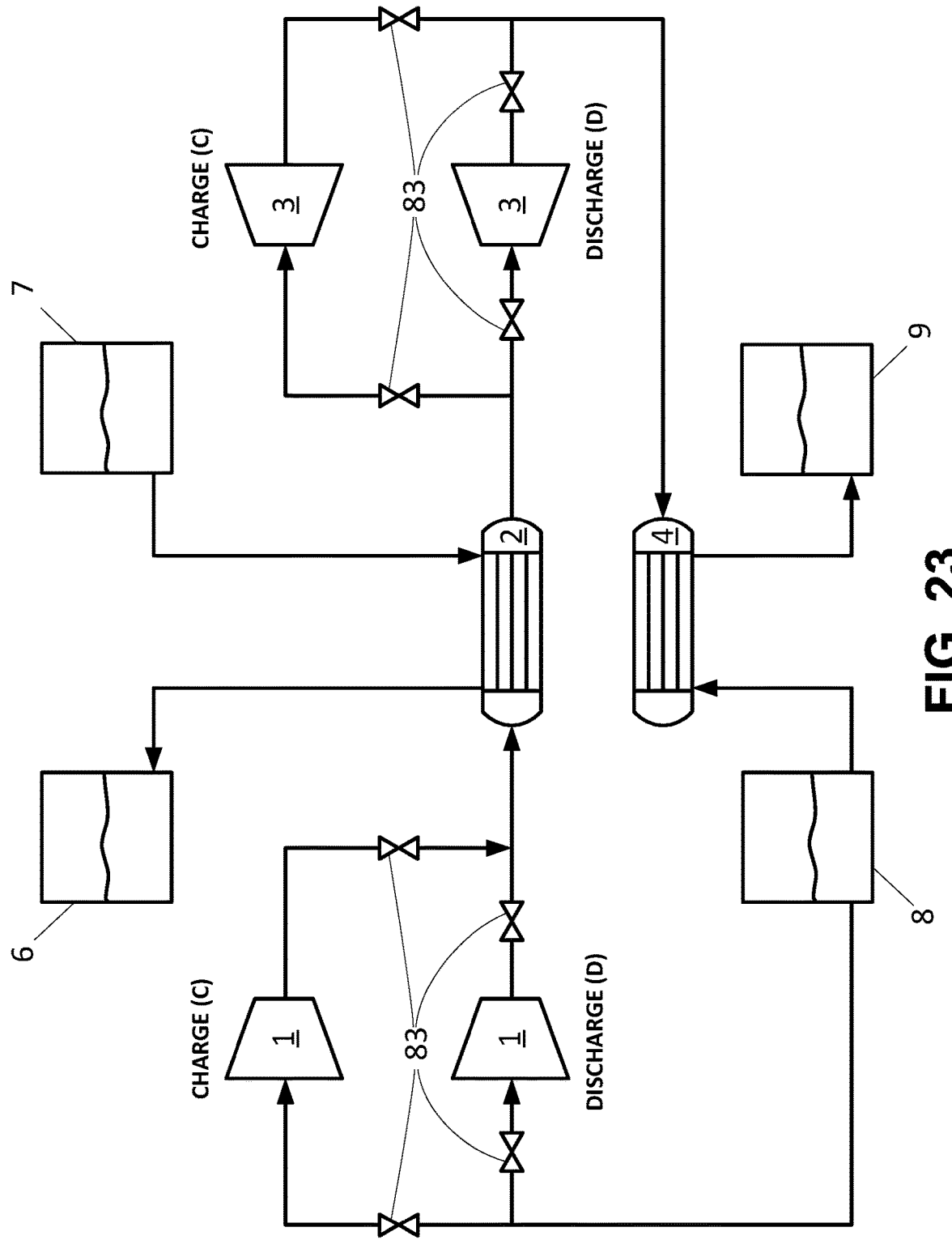

FIGS. 22 and 23 show pumped thermal systems with separate compressor 1/turbine 3 pairs for charge mode C and discharge mode D. The separate compressor/turbine pairs may or may not be ganged on a common mechanical shaft. In this example, the compressor/turbine pairs C and D can have separate shafts 10. The shafts 10 may rotate at the same speed or at different speeds. The separate compressor/turbine pairs or working fluid systems may or may not share heat exchangers (e.g., the heat exchangers 2 and 4).

In the example in FIG. 22, the system has a common set of HTS tanks 6 and 7 and CTS tanks 8 and 9. The system has separate pairs of heat exchangers 2 and 4 and separate compressor 1/turbine 3 pairs for the charge mode C and the discharge mode D. The HTS and CTS storage media flow paths for the charging cycle are shown as solid black lines. The HTS and CTS storage media flow paths for the discharge cycle are shown as the dashed grey lines.

In the example in FIG. 23, the system, shown in a charge configuration, has one set of heat exchangers 2 and 4, and a common set of HTS tanks 6 and 7 and CTS tanks 8 and 9. The HTS and CTS tanks can be charged by a compressor/turbine set C, or discharged by a compressor/turbine set D, each set comprising a compressor 1 and a turbine 3. The system may switch between the sets C and D using valves 83. In the example in FIG. 22, the system, again shown in a charge configuration, has a common set of HTS tanks 6 and 7 and CTS tanks 8 and 9. The HTS and CTS tanks can be charged by the charge set C that includes a first set of the heat exchangers 2 and 4, the compressor 1 and the turbine 3. The HTS and CTS tanks can be discharged by switching to a separate discharge set C that includes a second set of the heat exchangers 2 and 4, the compressor 1 and the turbine 3.

In one example, if the charge and discharge sets of compressors and turbines in FIGS. 22 and 23 are not operated at the same time, the charge and discharge sets may share a common set of heat exchangers that are switched between the turbomachinery pairs using the valves 83. In another example, if the charge and discharge turbomachinery sets or pairs in FIGS. 22 and 23 are operated at the same time (e.g., in order for one set to charge, following intermittent generation, and the other set to discharge at the same time, following load), then each set of turbomachinery may have a dedicated set of heat exchangers. In this instance, the charge and discharge sets may or may not share a set of HTS and CTS tanks.

In some implementations, separate compressor/turbine sets or pairs may advantageously be used in pumped thermal systems used with intermittent and/or variable electric power inputs. For example, a first compressor/turbine set can be used in a charge cycle that follows wind and/or solar power (e.g., electric power input from wind and/or solar power systems) while a second compressor/turbine set can be used in a discharge cycle that follows load (e.g., electric power output to a power grid). In this configuration, pumped thermal systems placed between a power generation system and a load may aid in smoothing variations/fluctuations in input and/or output power requirements.

F. Hybrid Pumped Thermal Systems

In accordance with another aspect of the disclosure, pumped thermal systems can be augmented by additional energy conversion processes and/or be directly utilized as energy conversion systems without energy storage (i.e., as power generation systems). In some examples, pumped thermal systems herein can be modified to allow for direct power generation using natural gas, Diesel fuel, petroleum gas (e.g., propane/butane), dimethyl ether, fuel oil, wood chips, landfill gas, hexane, hydrocarbons or any other combustible substance (e.g., fossil fuel or biomass) for adding heat to the working fluid on a hot side of a working fluid cycle, and a cold side heat sink (e.g., water) for removing heat from the working fluid on a cold side of the working fluid cycle.

Figure 24:
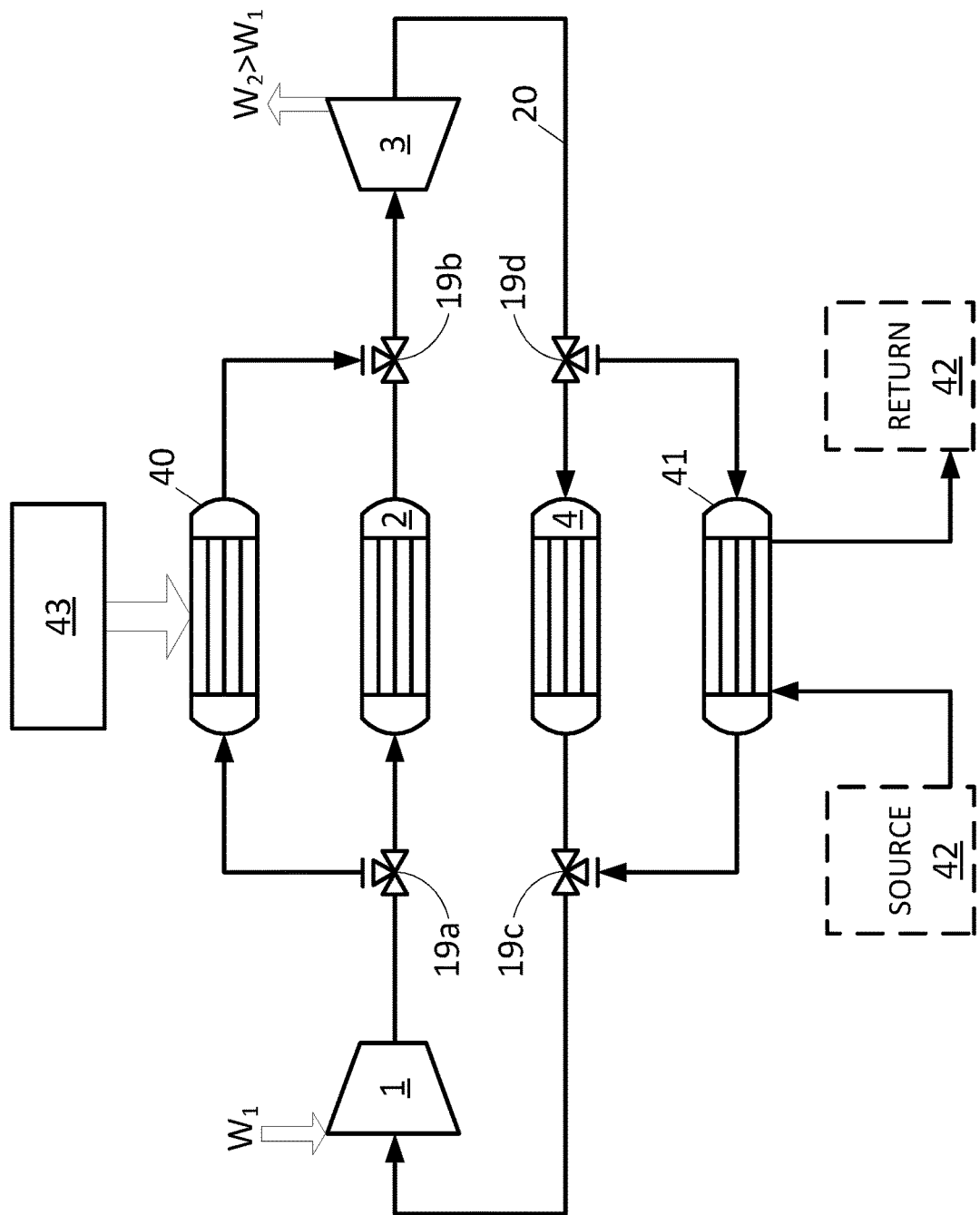
FIGS. 24 and 25 show pumped thermal systems configured in a combustion heat input generation mode.
Figure 25:
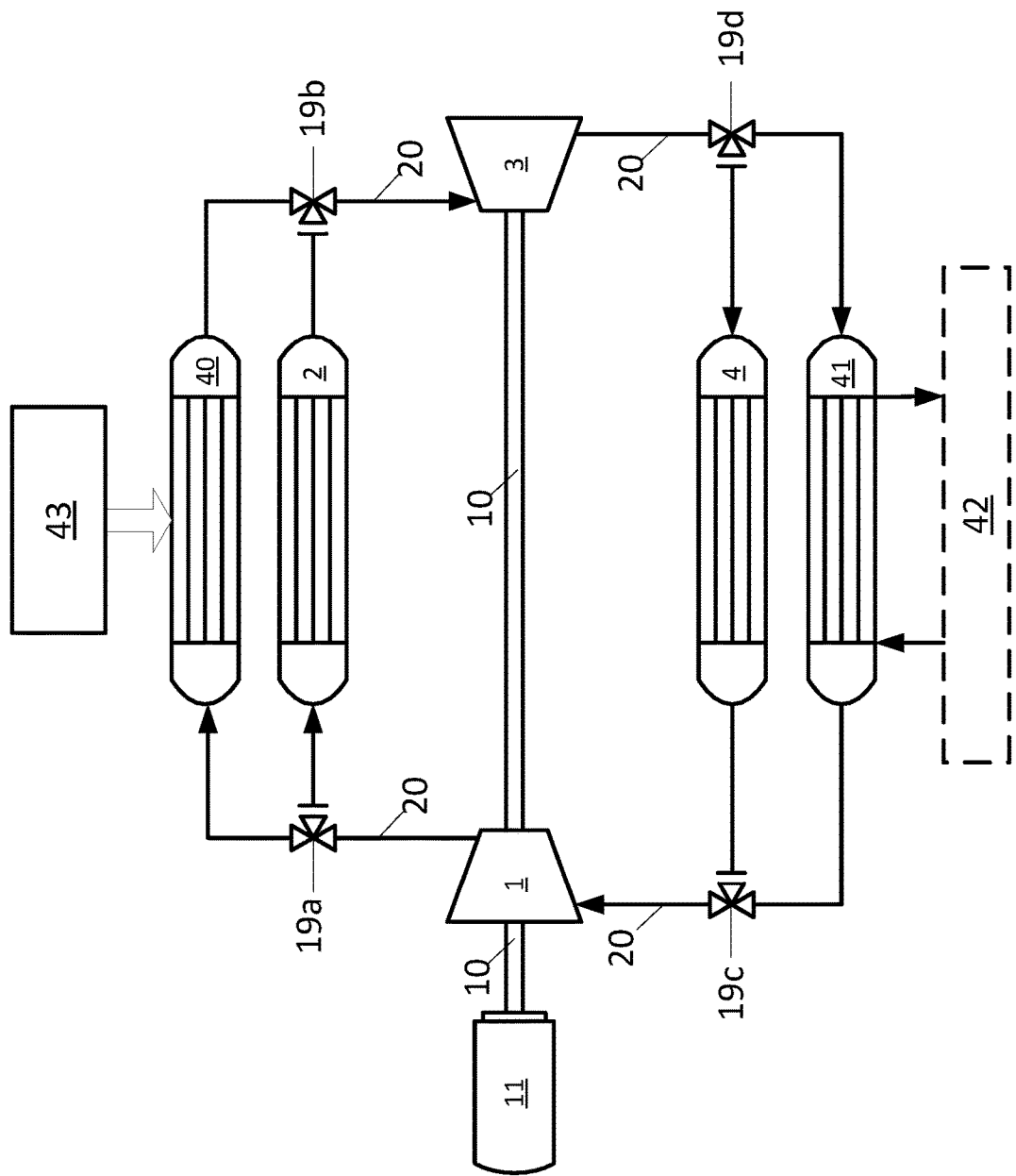

FIGS. 24 and 25 show pumped thermal systems configured in generation mode. In some examples, pumped thermal systems herein can be modified by adding two additional heat exchangers 40 and 41, four additional valves 19a, 19b, 19c and 19d, a heat sink (e.g., a water cooling system; water from a fresh water reservoir such as a river, a lake or a reservoir; salt water from a salt water reservoir such as a sea or an ocean; air cooling using radiators, fans/blowers, convection; or an environmental heat sink such as ground/soil, cold air etc.) 42, and a heat source (e.g., a combustion chamber with a fuel-oxidant mixture) 43. The heat source 43 can exchange heat with a first of the two additional heat exchangers 40, and the heat sink 42 can exchange heat with a second of the two additional heat exchangers 41. The heat source 43 may be used to for exchanging heat with the working fluid 20.

The heat source 43 may be a combustion heat source. In some examples, the combustion heat source can comprise a combustion chamber for combusting a combustible substance (e.g., a fossil fuel, a synthetic fuel, municipal solid waste (MSW) or biomass). In some cases, the combustion chamber may be separate from the heat exchanger 40. In some cases, the heat exchanger 40 may comprise the combustion chamber. The heat source 43 may be a waste heat source, such as, for example waste heat from a power plant, an industrial process (e.g., furnace exhaust).

In some examples, a solar heater, a combustion heat source, a waste heat source, or any combination thereof may be used for heating the hot side heat storage fluid and/or the working fluid. In an example, the working fluid can be heated directly using any of these heat sources. In another example, the hot side heat storage fluid (or HTS medium) can be heated using any of these heat sources. In another example, the hot side heat storage fluid (or HTS medium) can be heated in parallel with the working fluid using any of these heat sources.

The pumped thermal systems in FIGS. 24 and 25 may be operated as hybrid systems. For example, the valves 19a, 19b, 19c and 19d can be used to switch between two modes. When the valves are in a first position, the system can operate as a pumped thermal storage system (e.g., closed system in charge/discharge mode). In this configuration, the working fluid 20 (e.g., argon or air) can exchange heat with an HTS medium (e.g., molten salt) in the hot side heat exchanger 2 and with a CTS medium (e.g., hexane) in the cold side heat exchanger 4. When the valves are in a second position, the system can operate as a power generation system (e.g., open system in generation mode). In this configuration, the heat exchangers 2 and 4 may be bypassed, and the working fluid 20 can exchange heat with the combustion chamber 43 in the hot side heat exchanger 40 and with the heat sink 42 in the cold side heat exchanger 41. Any description of configuration and/or design of heat transfer processes (e.g., heat transfer in heat exchangers) described herein in relation to pumped thermal systems may also be applied to hybrid pumped thermal systems, and vice versa. For example, the heat sink 42, the heat source 43, the heat exchangers 40 and 41, and/or the quantity of heat transferred on the cold side and/or the hot side may be configured to decrease or minimize entropy generation associated with heat transfer processes and/or to maximize system efficiency.

In some implementations, the hybrid systems may operate in storage and generation modes simultaneously. For example, the valves 19a, 19b, 19c and 19d can be configured to allow a given split between a working fluid flow rate to the heat exchangers 40 and 41 and a working fluid flow rate to the heat exchangers 2 and 4. Alternatively, the hybrid systems may operate exclusively in storage mode, or exclusively in generation mode (e.g., as a natural gas peaking plant). In some cases, the split between modes may be selected based on system efficiency, available electric power input (e.g., based on availability), desired electric power output (e.g., based on load demand) etc. For example, thermal efficiency of an ideal system (i.e., assuming isentropic compression and expansion processes, ideal heat transfer processes) operating exclusively in generation mode can be the thermal efficiency of a working fluid undergoing an ideal Brayton cycle. In some examples, thermal efficiencies in hybrid systems of the disclosure (e.g., exclusive and/or split mode operation) can be at least about 10%, at least about 20%, at least about 30%, at least about 40%, at least about 50%, at least about 60%, or more.

The heat source 43 may be used for exchanging heat with an HTS medium (e.g., a molten salt). For example, the combustion heat source 43 may be used for heating the HTS medium 21. In some instances, rather than using the combustion heat source 43 for exchanging heat in the heat exchanger 40 or for directly exchanging heat between flue gases from the combustion heat source and the working fluid, the combustion heat source 43 may be used to heat up the HTS medium 21 between the two HTS tanks 7 and 6.

Figure 26:
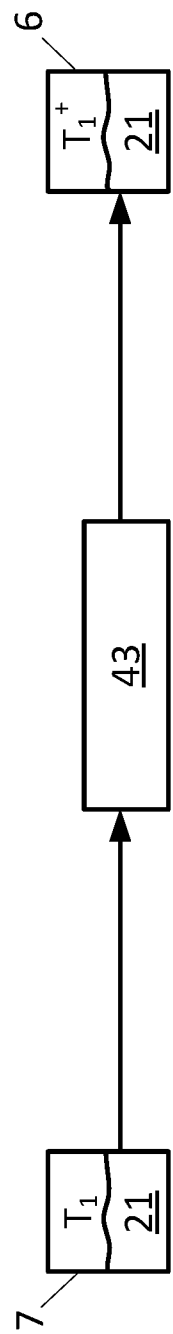
FIG. 26 is a schematic flow diagram of hot side recharging in a pumped heat cycle through heating by a combustion heat source or a waste heat source.

FIG. 26 is a schematic flow diagram of hot side recharging in a pumped heat cycle through heating by the heat source 43 (e.g., combustion heat source, waste heat source). In an example, the heat source 43 is a waste heat source, such as a waste heat source from a refinery or other processing plant. In an example, the heat source 43 is obtained from combusting natural gas in order to ensure the delivery of electricity even if the pumped thermal system runs out of charged storage media. For example, recharging of the hot side storage media using the heat source 43 may provide an advantage over recharging using electricity or other means (e.g., the price of electricity at the time may be too high). The heat source 43 can be used to heat up the HTS medium 21 from the temperature $T_1$ in the tank 7 to the temperature $T_1^+$ in the tank 6. The HTS medium can then be used in the CFX 2 for exchanging heat with the working fluid to in a discharge cycle, such as, for example, the discharge cycles in FIGS. 20 and 21.

In some examples, such as, for example, when the CTS medium is a combustible substance such as a fossil fuel (e.g., hexane or heptanes), burning of the CTS medium stored in the CTS tanks (e.g., the tanks 8 and 9) may be used for providing thermal energy for heating the HTS medium as shown, for example, in FIG. 26 or for operation of the cycles in the configurations shown, for example, in FIGS. 24 and 25.

The systems of the disclosure may be capable of operating both in an electricity only storage cycle (comprising heat transfer with an HTS medium and a CTS medium below ambient temperature) and in a heat engine to ambient cycle, where, in a discharge mode, heat is input from the HTS medium to the working fluid and rejected to the ambient environment rather than to the CTS medium. This capability may enable the use of heating of the HTS with combustible substances (e.g., as shown in FIG. 26) or the use of solar heating of the HTS (e.g., as shown in FIG. 19). Heat rejection to ambient may be implemented using, for example, the discharge cycles in FIGS. 20 and 21. In some cases, heat may be rejected to the environment with the aid of the ITS medium 61 or the intermediate medium 62.

Aspects of the disclosure may be synergistically combined. For example, the systems capable of operating both in an electricity only storage cycle and in a heat engine to ambient cycle may comprise a recuperator. Any description in relation to such hybrid systems without a recuperator may readily be applied to hybrid systems with a recuperator at least in some configurations. In some instances, the hybrid systems may be implemented using, for example, the parallel, valved configuration in FIG. 24. For example, the counter-flow heat exchangers 4 in FIGS. 20 and 21 may be implemented as separate counter-flow heat exchangers 67 for exchanging heat with the ambient environment, and may be used in combination with cold side counter-flow heat exchangers 4 of the disclosure.

In some implementations, the systems herein may be configured to enable switching between different cycles of the disclosure using a shared set of valves and pipes. For example, the system may be configured to switch between the electricity only charge cycle (such as shown in, for example, FIG. 15), the electricity only discharge cycle (such as shown in, for example, FIG. 16), and the heat engine to ambient cycle (such as shown in FIG. 21).

G. Pumped Thermal Systems with Pressure Regulation Power Control

In an aspect of the disclosure, the pressure of working fluids in pumped thermal systems can be controlled to achieve power control. In an example, the power provided to a closed system in charge mode and/or the power extracted from the closed system in discharge and/or generation mode (e.g., work input/output using the shaft 10) is proportional to the molar or mass flow rate of the circulating working fluid. The mass flow rate is proportional to density, area, and flow velocity. The flow velocity can be kept fixed in order to achieve a fixed shaft speed (e.g., 3600 rpm or 3000 rpm in accordance with power grid requirements of 60 and 50 Hz respectively). Thus, as the pressure of the working fluid changes, the mass flow rate and the power can change. In an example, as the mass flow rate increases in a discharge and/or generation mode, more load should be added to the system to maintain a constant speed of the rotating shaft, and vice versa. In another example, if load is reduced during operation in a discharge and/or generation mode, the reduced load can cause the shaft speed to increase, thus increasing the mass flow rate. For some period of time, before the heat stored in the thermal capacity of the heat exchangers themselves is dissipated, this increased mass flow rate can lead to an increase in the power delivered, in turn increasing the shaft speed. The shaft speed and the power can continue to increase uncontrollably, resulting in a runaway of the rotating shaft. In some examples, pressure regulation may enable control, and thus stabilization of runaway, through adjustment of the amount (e.g., density) of circulating working fluid in accordance with system requirements. In an example where shaft speed (and turbomachinery, such as a turbine, attached to the shaft) begins to run away, a controller can reduce the mass of circulating working fluid (e.g., mass flow rate) in order to decrease the power delivered, in turn decreasing the shaft speed. Pressure regulation may also allow for an increase in mass flow rate in response to an increase in load. In each of these instances, the flow rates of the HTS and CTS media through the heat exchangers can be matched to the heat capacity of the working fluid passing through the heat exchangers.

In some examples, the working fluid pressure in the closed system can be varied by using an auxiliary working fluid tank in fluid communication with the closed system. In this configuration, power input/output can be decreased by transferring the working fluid from the closed cycle loop to the tank, and power input/output can be increased by transferring the working fluid from the tank to the closed cycle loop. In an example, when the pressure of the working fluid is decreased, less heat can be transferred between the thermal storage tanks on the hot and cold sides of the system as a result of the decreased mass flow rate and less power can be input to/output by the system.

As the pressure of the working fluid is varied, the compression ratios of turbomachinery components may remain substantially unchanged. In some cases, one or more operating parameters and/or configuration (e.g., variable stators, shaft speed) of turbomachinery components can be adjusted in response to a change in working fluid pressure (e.g., to achieve a desired performance of the system). Alternatively, one or more pressure ratios may change in response to a change in working fluid pressure.

In some cases, reduced cost and/or reduced parasitic energy consumption may be achieved using the power control configuration relative to other configurations (e.g., using a choke valve for controlling the flow of the working fluid). In some examples, variation of working fluid pressure while keeping the temperature and flow velocity constant (or near-constant) may lead to negligible entropy generation. In some examples, an increase or decrease in system pressure may lead to changes in, for example, turbomachinery efficiencies.

Figure 27:
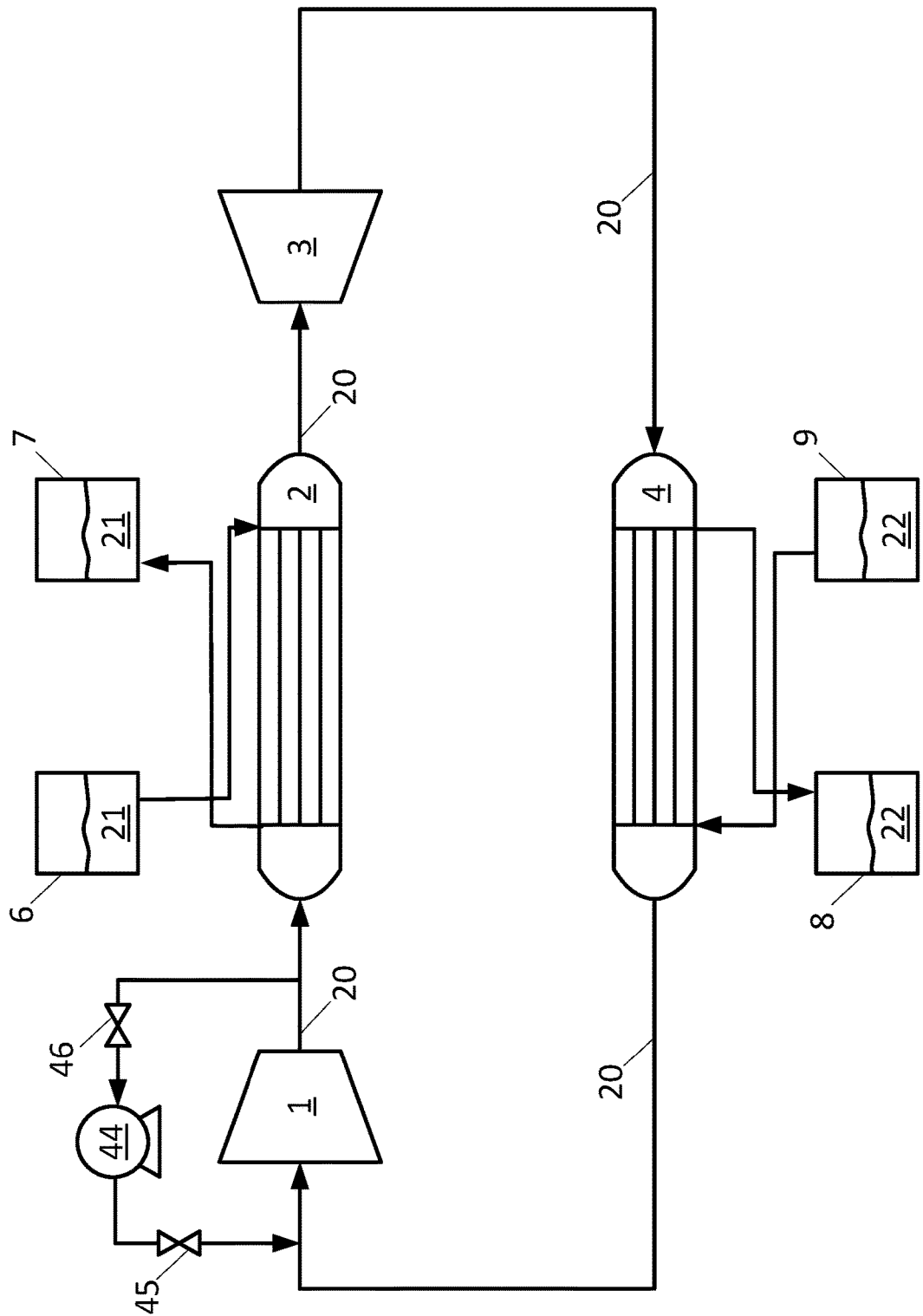
FIG. 27 shows an example of a pumped thermal system with pressure regulated power control.

FIG. 27 shows an example of a pumped thermal system with power control. The temperature of the working fluid on the hot and cold sides of the system may remain constant or near-constant for a given period of time regardless of working fluid mass flow rate due to large heat capacities of the heat exchangers 2 and 4 and/or the hot and cold side thermal storage media in the tanks 6, 7, 8 and 9. In some examples, the flow rates of the HTS and CTS media through the heat exchangers 2 and 4 are varied in concert with a change in the pressure of the working fluid in order to keep the temperatures in the heat exchangers and working fluid optimized over longer time periods. Thus, pressure can be used to vary the mass flow rate in the system. One or more auxiliary tanks 44 filled with the working fluid 20 (e.g., air, argon or argon-helium mix) can be in fluid communication with a hot (e.g., high pressure) side of the pumped thermal system and/or a cold (e.g., low pressure) side of the pumped thermal system. In some examples, the auxiliary tank can be in fluid communication with the working fluid adjacent to an inlet of the compressor 1 and/or adjacent to an outlet of the compressor 1. In some examples, the auxiliary tank can be in fluid communication with the working fluid adjacent to an inlet of the turbine 3 and/or adjacent to an outlet of the turbine 3. In further examples, the auxiliary tank can be in fluid communication with the working fluid in one or more locations system (e.g., one or more locations on the high pressure side of the system, on the low pressure side of the system, or any combination thereof). For example, the auxiliary tank can be in fluid communication with the working fluid on a high pressure side and a low pressure side of the closed cycle. In some cases, the fluid communication on the high pressure side can be provided after the compressor and before the turbine. In some cases, the fluid communication on the low pressure side can be provided after the turbine and before the compressor. In some instances, the auxiliary tank can contain working fluid at a pressure intermediate to the high and low pressures of the system. The working fluid in the auxiliary tank can be used to increase or decrease the amount of working fluid 20 circulating in the closed cycle of the pumped thermal system. The amount of working fluid circulating in the closed cycle loop can be decreased by bleeding the working fluid from the high pressure side of the closed cycle loop into the tank through a fluid path containing a valve or mass flow controller 46, thereby charging the tank 44. The amount of working fluid circulating in the closed cycle loop can be increased by bleeding the working fluid from the tank into the low pressure side of the closed cycle loop through a fluid path containing a valve or mass flow controller 45, thereby discharging the tank 44.

Power control over longer timescales may be implemented by changing the pressure of the working fluid and by adjusting the flow rates of the hot side 21 and cold side 22 thermal storage fluids through the heat exchangers 2 and 4, respectively.

In some examples, flow rates of the thermal storage media 21 and/or 22 may be controlled (e.g., by a controller) to maintain given heat exchanger inlet and outlet temperatures. In some examples, a first controller(s) may be provided for controlling the flow rates (e.g., mass flow rates) of thermal storage media, and a second controller may be provided for controlling the mass flow rate (e.g., by controlling mass, mass flow rate, pressure etc.) of the working fluid.

H. Pumped Thermal Systems with Pressure-Encased Motor/Generator

In another aspect of the disclosure, pumped thermal systems with a pressure-encased motor/generator are provided. The pressure-encased motor/generator may be provided as an alternative to configurations where a shaft (also "crankshaft" herein) penetrates through a working fluid containment wall (where it can be exposed to one or more relatively high pressure differentials) in order to connect to a motor/generator outside the working fluid containment wall. In some cases, the shaft may be exposed to pressures and temperatures of the working fluid in the low pressure portion of the working fluid cycle, in the high pressure portion of the working fluid cycle, or both. In some cases, crankshaft seal(s) capable of holding back the pressures which the crankshaft is exposed to inside the working fluid containment wall can be difficult to manufacture and/or difficult to maintain. In some cases, a rotating seal between high and low pressure environments may be difficult to achieve. Thus, coupling of the compressor and turbine to the motor/generator can be challenging. In some implementations, the motor/generator can therefore be placed entirely within the low pressure portion of the working fluid cycle, such that the exterior pressure vessel or working fluid containment wall may not need to be penetrated.

Figure 28:
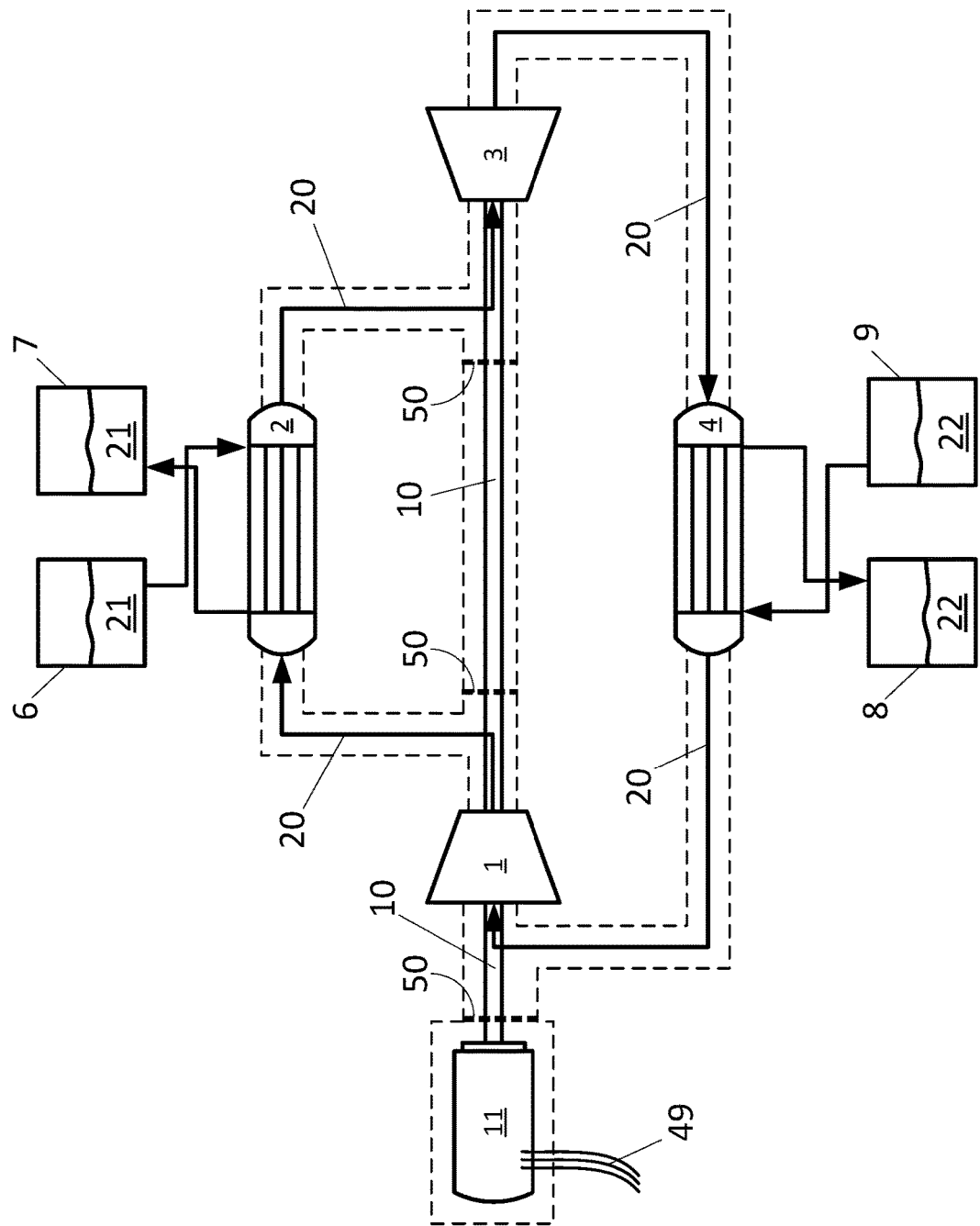
FIG. 28 shows an example of a pumped thermal system with a pressure encased generator.

FIG. 28 shows an example of a pumped thermal system with a pressure encased generator 11. The motor/generator is encased within the pressure vessel or working fluid containment wall (shown as dashed lines) and only feed-through electric leads 49 penetrate through the pressure vessel. A thermal insulation wall 48 is added between the motor/generator 11 and the working fluid in the low pressure portion of the cycle. The technical requirements for achieving an adequate seal through the thermal insulation wall can be less stringent due to the pressure being the same on both sides of the thermal insulation wall (e.g., both sides of the thermal insulation wall can be located in the low pressure portion of the cycle). In an example, the low pressure value can be about 10 atm. In some cases, the motor/generator may be adapted for operation at elevated surrounding pressures. An additional thermal insulation wall 50 can be used to create a seal between the outlet of the compressor 1 and the inlet of the turbine 3 in the high pressure portion of the cycle. In some examples, placing the motor/generator on the cold side of the pumped thermal systems may be beneficial to the operation of the motor/generator (e.g., cooling of a superconducting generator).

I. Pumped Thermal Systems with Variable Stator Pressure Ratio Control

A further aspect of the disclosure relates to control of pressure in working fluid cycles of pumped thermal systems by using variable stators. In some examples, use of variable stators in turbomachinery components can allow pressure ratios in working fluid cycles to be varied. The variable compression ratio can be accomplished by having movable stators in the turbomachinery.

In some cases, pumped thermal systems (e.g., the systems in FIGS. 17 and 18) can operate at the same compression ratio in both the charge and the discharge cycles. In this configuration, heat can be rejected (e.g., to the environment) in section 38 in the charge cycle and in section 39 in the discharge cycle, wherein the heat in section 38 can be transferred at a lower temperature than the heat in section 39. In alternative configurations, the compression ratio can be varied when switching between the charge cycle and the discharge cycle. In an example, variable stators can be added to both the compressor and the turbine, thus allowing the compression ratio to be tuned. The ability to vary compression ratio between charge and discharge modes may enable heat to be rejected at the lower temperature only (e.g., heat may be rejected in section 38 in the charge cycle but not in section 39 in the discharge cycle). In some examples, a greater portion (or all) of the heat rejected to the environment is transferred at a lower temperature, which may increase the roundtrip efficiency of the system.

Figure 29:
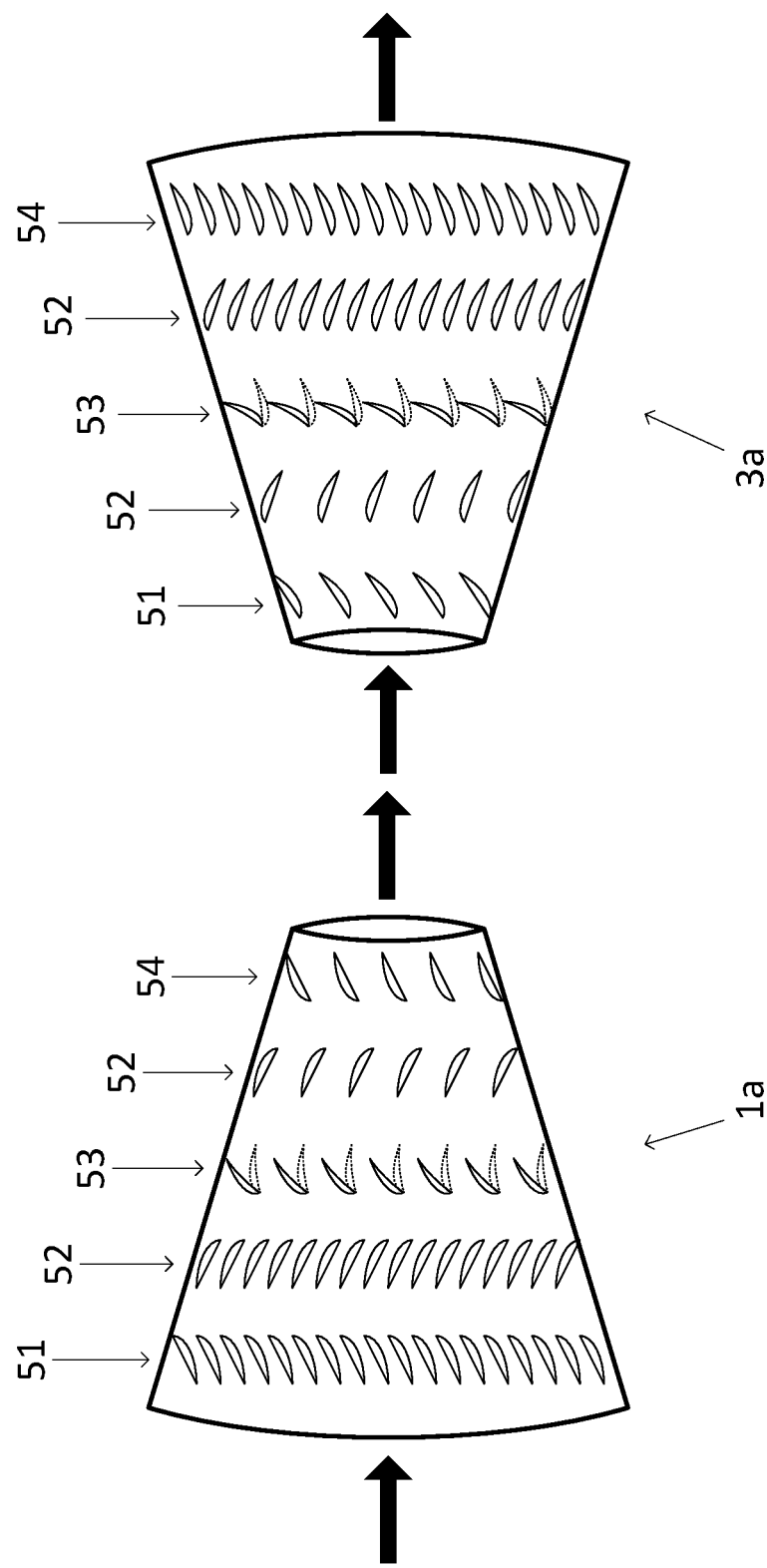
FIG. 29 is an example of variable stators in a compressor/turbine pair.

FIG. 29 is an example of variable stators in a compressor/turbine pair. The compressor 1 and the turbine 3 can both have variable stators, so that the compression ratio for each can be tuned. Such tuning may increase roundtrip efficiency.

The compressor and/or the turbine can (each) include one or more compression stages. For example, the compressor and/or the turbine can have multiple rows of repeating features distributed along its circumference. Each compression stage can comprise one or more rows of features. The rows may be arranged in a given order. In one example, the compressor 1 and the turbine 3 each comprise a sequence of a plurality of inlet guide vanes 51, a first plurality of rotors 52, a plurality of stators 53, a second plurality of rotors 52 and a plurality of outlet guide vanes 54. Each plurality of features can be arranged in a row along the circumference of the compressor/turbine. The configuration (e.g., direction or angle) of the stators 53 can be varied, as indicated in FIG. 29.

The compressor/turbine pair can be matched. In some cases, an outlet pressure of the compressor can be about the same as an inlet pressure of the turbine, and an inlet pressure of the compressor can be about the same as the outlet pressure of the turbine; thus, the pressure ratio across the turbine can be the same as the pressure ratio across the compressor. In some cases, the inlet/outlet pressures and/or the pressure ratios may differ by a given amount (e.g., to account for pressure drop in the system). The use of variable stators on both the compressor and the turbine can allow the compressor and the turbine to remain matched as the compression ratio is varied. For example, using the variable stators, operation of the compressor and the turbine can remain within suitable operating conditions (e.g. within a given range or at a given point on their respective operating maps) as the compression ratio is varied. Operation within given ranges or at given points on turbomachinery operating maps may allow turbomachinery efficiencies (e.g., isentropic efficiencies) and resulting roundtrip storage efficiency to be maintained within a desired range. In some implementations, the use of variable stators can be combined with other methods for varying the compression ratios (e.g. variable shaft rotation speed, bypassing of turbomachinery stages, gears, power electronics, etc.).

J. Pumped Thermal System Units Comprising Pumped Thermal System Subunits

A further aspect of the disclosure relates to control of charging and discharging rate over a full range from maximum charging/power input to maximum discharging/power output by building composite pumped thermal system units comprised of pumped thermal system subunits. In some examples, pumped thermal systems may have a minimum power input and/or output (e.g., minimum power input and/or minimum power output) above 0% of maximum power input and/or output (e.g., maximum power input and/or maximum power output), respectively. In such cases, a single unit by itself may be able to continuously ramp from the minimum power input to the maximum power input and from the minimum power output to the maximum power output, but may not be able to continuously ramp from the minimum power input to the minimum power output (i.e., from the minimum power input to zero power input/output, and from zero power input/output to the minimum power output). An ability to continuously ramp from the minimum power input to the minimum power output may enable the system to continuously ramp from the maximum power input to the maximum power output. For example, if both the output power and the input power may be turned down all the way to zero during operation, the system may be able to continuously vary the power consumed or supplied across a range from the maximum input (e.g., acting as a load on the grid) to the maximum output (e.g., acting as a generator on the grid). Such functionality may increase (e.g., more than double) the continuously rampable range of the pumped thermal system, increasing the continuously rampable range of the pumped thermal system may be advantageous, for example, when continuously rampable power range is used as a metric for determining the value of grid assets. Further, such functionality may enable the systems of the disclosure to follow variable load, variable generation, intermittent generation, or any combination thereof.

In some implementations, composite pumped thermal system units comprised of multiple pumped thermal system subunits may be used. In some cases, each subunit may have a minimum power input and/or output above 0%. The continuous ramping of the power from the maximum power input to the maximum power output may include combining a given quantity of the subunits. For example, a suitable (e.g., sufficiently large) number of subunits may be needed to achieve continuous ramping. In some examples, the number of subunits can be at least about 2, 5, 10, 20, 30, 40, 50, 100, 200, 500, 750, 1000, and the like. In some examples, the number of subunits is 2, 5, 10, 20, 30, 40, 50, 100, 150, 200, 250, 300, 350, 400, 450, 500, 550, 600, 650, 700, 750, 800, 850, 900, 950, 1000 or more. Each subunit may have a given power capacity. For example, each subunit can have a power capacity that is less than about 0.1%, less than about 0.5%, less than about 1%, less than about 5%, less than about 10%, less than about 25%, less than about 50%, or less than about 90% of the total power capacity of the composite pumped thermal system. In some cases, different subunits may have different power capacities. In some examples, a subunit has a power capacity of about 10 kW, 100 kW, 500 kW, 1 MW, 2 MW, 5 MW, 10 MW, 20 MW, 50 MW, 100 MW, or more. The continuous ramping of the power from the maximum power input to the maximum power output may include controlling each subunit's power input and/or output (e.g., power input and/or power output) separately. In some cases, the subunits may be operated in opposing directions (e.g., one or more subunits may operate in power input mode while one or more subunits may operate in power output mode). In one example, if each pumped thermal system subunit can be continuously ramped between a maximum power input and/or output down to about 50% of the maximum power input and/or output, respectively, three or more such pumped thermal system subunits may be combined into a composite pumped thermal system unit that can be continuously ramped from the maximum input power to the maximum output power. In some implementations, the composite pumped thermal system may not have a fully continuous range between the maximum input power and the maximum output power, but may have an increased number of operating points in this range compared to a non-composite system.

K. Energy Storage System Units Comprising Energy Storage System Subunits

A further aspect of the disclosure relates to control of charging and discharging rate over a full range from maximum charging/power input to maximum discharging/power output by building composite energy storage system units comprised of energy storage system subunits. In some examples, energy storage systems may have a minimum power input and/or output (e.g., minimum power input and/or minimum power output) above 0% of maximum power input and/or output (e.g., maximum power input and/or maximum power output), respectively. In such cases, a single unit by itself may be able to continuously ramp from the minimum power input to the maximum power input and from the minimum power output to the maximum power output, but may not be able to continuously ramp from the minimum power input to the minimum power output (i.e., from the minimum power input to zero power input/output, and from zero power input/output to the minimum power output). An ability to continuously ramp from the minimum power input to the minimum power output may enable the system to continuously ramp from the maximum power input to the maximum power output. For example, if both the output power and the input power may be turned down all the way to zero during operation, the system may be able to continuously vary the power consumed or supplied across a range from the maximum input (e.g., acting as a load on the grid) to the maximum output (e.g., acting as a generator on the grid). Such functionality may increase (e.g., more than double) the continuously rampable range of the energy storage system. Increasing the continuously rampable range of the energy storage system may be advantageous, for example, when continuously rampable power range is used as a metric for determining the value of grid assets. Further, such functionality may enable the systems of the disclosure to follow variable load, variable generation, intermittent generation, or any combination thereof.

In some implementations, composite energy storage system units comprised of multiple energy storage system subunits may be used. In some examples, any energy storage system having power input/output characteristics that may benefit from a composite configuration may be used. In some examples, systems having power input and/or power output characteristics that may benefit from a composite configuration may include various power storage and/or generation systems such as, for example, natural gas or combined cycle power plants, fuel cell systems, battery systems, compressed air energy storage systems, pumped hydroelectric systems, etc. In some cases, each subunit may have a minimum power input and/or output above 0%. The continuous ramping of the power from the maximum power input to the maximum power output may include combining a given quantity of the subunits. For example, a suitable (e.g., sufficiently large) number of subunits may be needed to achieve continuous ramping. In some examples, the number of subunits can be at least about 2, 5, 10, 20, 30, 40, 50, 100, 200, 500, 750, 1000, and the like. In some examples, the number of subunits is 2, 5, 10, 20, 30, 40, 50, 100, 150, 200, 250, 300, 350, 400, 450, 500, 550, 600, 650, 700, 750, 800, 850, 900, 950, 1000 or more. Each subunit may have a given power capacity. For example, each subunit can have a power capacity that is less than about 0.1%, less than about 0.5%, less than about 1%, less than about 5%, less than about 10%, less than about 25%, less than about 50%, or less than about 90% of the total power capacity of the composite energy storage system. In some cases, different subunits may have different power capacities. In some examples, a subunit has a power capacity of about 10 kW, 100 kW, 500 kW, 1 MW, 2 MW, 5 MW, 10 MW, 20 MW, 50 MW, 100 MW, or more. The continuous ramping of the power from the maximum power input to the maximum power output may include controlling each subunit's power input and/or output (e.g., power input and/or power output) separately. In some cases, the subunits may be operated in opposing directions (e.g., one or more subunits may operate in power input mode while one or more subunits may operate in power output mode). In one example, if each energy storage system subunit can be continuously ramped between a maximum power input and/or output down to about 50% of the maximum power input and/or output, respectively, three or more such energy storage system subunits may be combined into a composite energy storage system unit that can be continuously ramped from the maximum input power to the maximum output power. In some implementations, the composite energy storage system may not have a fully continuous range between the maximum input power and the maximum output power, but may have an increased number of operating points in this range compared to a non-composite system.

L. Control Systems

Figure 30:
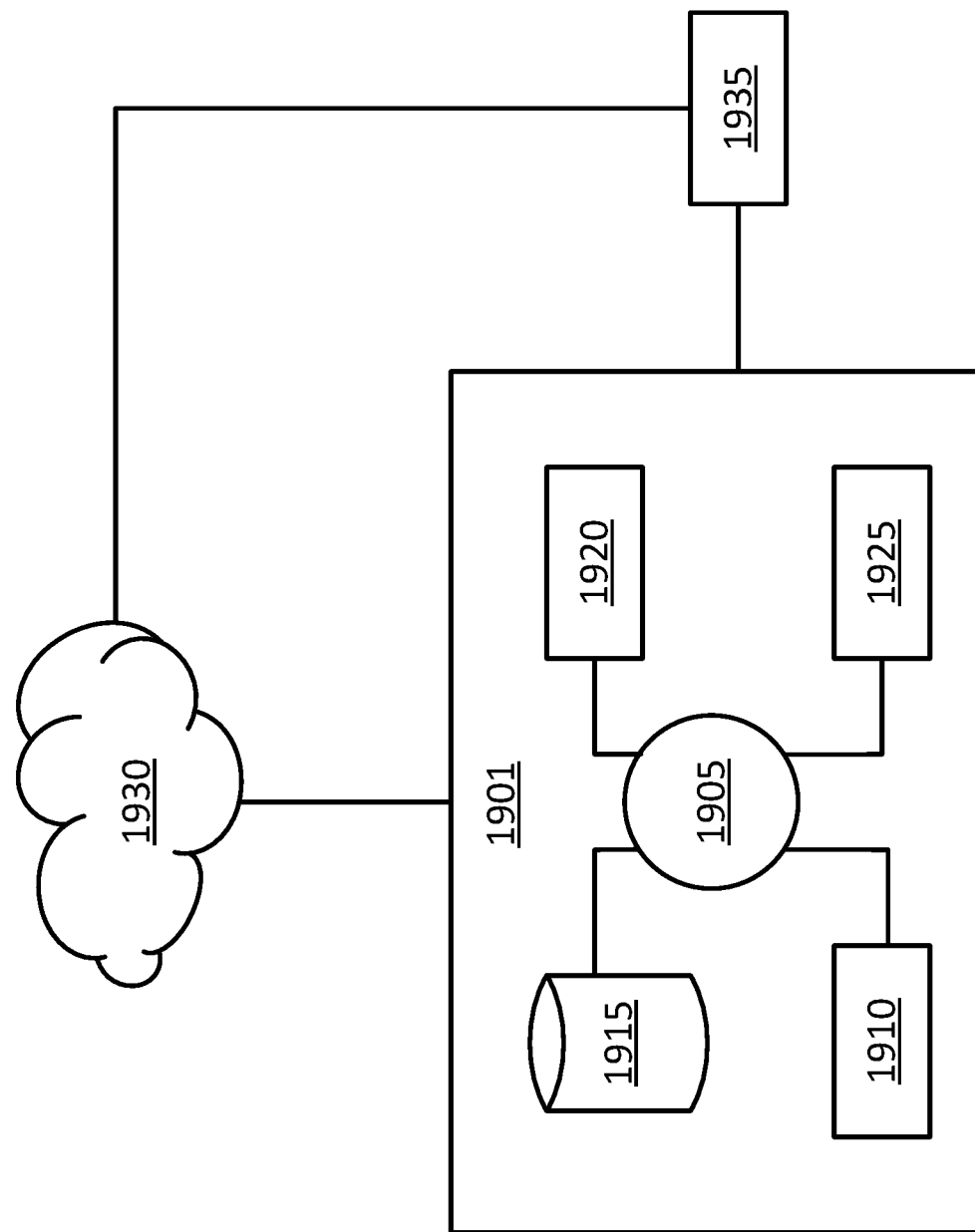
FIG. 30 shows a computer system that is programmed to implement various methods and/or regulate various systems of the present disclosure.

The present disclosure provides computer control systems (or controllers) that are programmed to implement methods of the disclosure. FIG. 30 shows a computer system 1901 (or controller) that is programmed or otherwise configured to regulate various process parameters of energy storage and/or retrieval systems disclosed herein. Such process parameters can include temperatures, flow rates, pressures and entropy changes.

The computer system 1901 includes a central processing unit (CPU, also "processor" and "computer processor" herein) 1905, which can be a single core or multi core processor, or a plurality of processors for parallel processing. The computer system 1901 also includes memory or memory location 1910 (e.g., random-access memory, read-only memory, flash memory), electronic storage unit 1915 (e.g., hard disk), communication interface 1920 (e.g., network adapter) for communicating with one or more other systems, and peripheral devices 1925, such as cache, other memory, data storage and/or electronic display adapters. The memory 1910, storage unit 1915, interface 1920 and peripheral devices 1925 are in communication with the CPU 1905 through a communication bus (solid lines), such as a motherboard. The storage unit 1915 can be a data storage unit (or data repository) for storing data. The computer system 1901 can be operatively coupled to a computer network ("network") 1930 with the aid of the communication interface 1920. The network 1930 can be the Internet, an internet and/or extranet, or an intranet and/or extranet that is in communication with the Internet. The network 1930 in some cases is a telecommunication and/or data network. The network 1930 can include one or more computer servers, which can enable distributed computing, such as cloud computing. The network 1930, in some cases with the aid of the computer system 1901, can implement a peer-to-peer network, which may enable devices coupled to the computer system 1901 to behave as a client or a server.

The computer system 1901 is coupled to an energy storage and/or retrieval system 1935, which can be as described above or elsewhere herein. The computer system 1901 can be coupled to various unit operations of the system 1935, such as flow regulators (e.g., valves), temperature sensors, pressure sensors, compressor(s), turbine(s), electrical switches, and photovoltaic modules. The system 1901 can be directly coupled to, or be a part of, the system 1935, or be in communication with the system 1935 through the network 1930.

The CPU 1905 can execute a sequence of machine-readable instructions, which can be embodied in a program or software. The instructions may be stored in a memory location, such as the memory 1910. Examples of operations performed by the CPU 1905 can include fetch, decode, execute, and writeback.

With continued reference to FIG. 30, the storage unit 1915 can store files, such as drivers, libraries and saved programs. The storage unit 1915 can store programs generated by users and recorded sessions, as well as output(s) associated with the programs. The storage unit 1915 can store user data, e.g., user preferences and user programs. The computer system 1901 in some cases can include one or more additional data storage units that are external to the computer system 1901, such as located on a remote server that is in communication with the computer system 1901 through an intranet or the Internet.

The computer system 1901 can communicate with one or more remote computer systems through the network 1930. For instance, the computer system 1901 can communicate with a remote computer system of a user (e.g., operator). Examples of remote computer systems include personal computers, slate or tablet PC's, telephones, Smart phones, or personal digital assistants. The user can access the computer system 1901 via the network 1930.

Methods as described herein can be implemented by way of machine (e.g., computer processor) executable code stored on an electronic storage location of the computer system 1901, such as, for example, on the memory 1910 or electronic storage unit 1915. The machine executable or machine readable code can be provided in the form of software. During use, the code can be executed by the processor 1905. In some cases, the code can be retrieved from the storage unit 1915 and stored on the memory 1910 for ready access by the processor 1905. In some situations, the electronic storage unit 1915 can be precluded, and machine-executable instructions are stored on memory 1910.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

III. Illustrative Variable Pressure Inventory Control Systems

Figure 31:
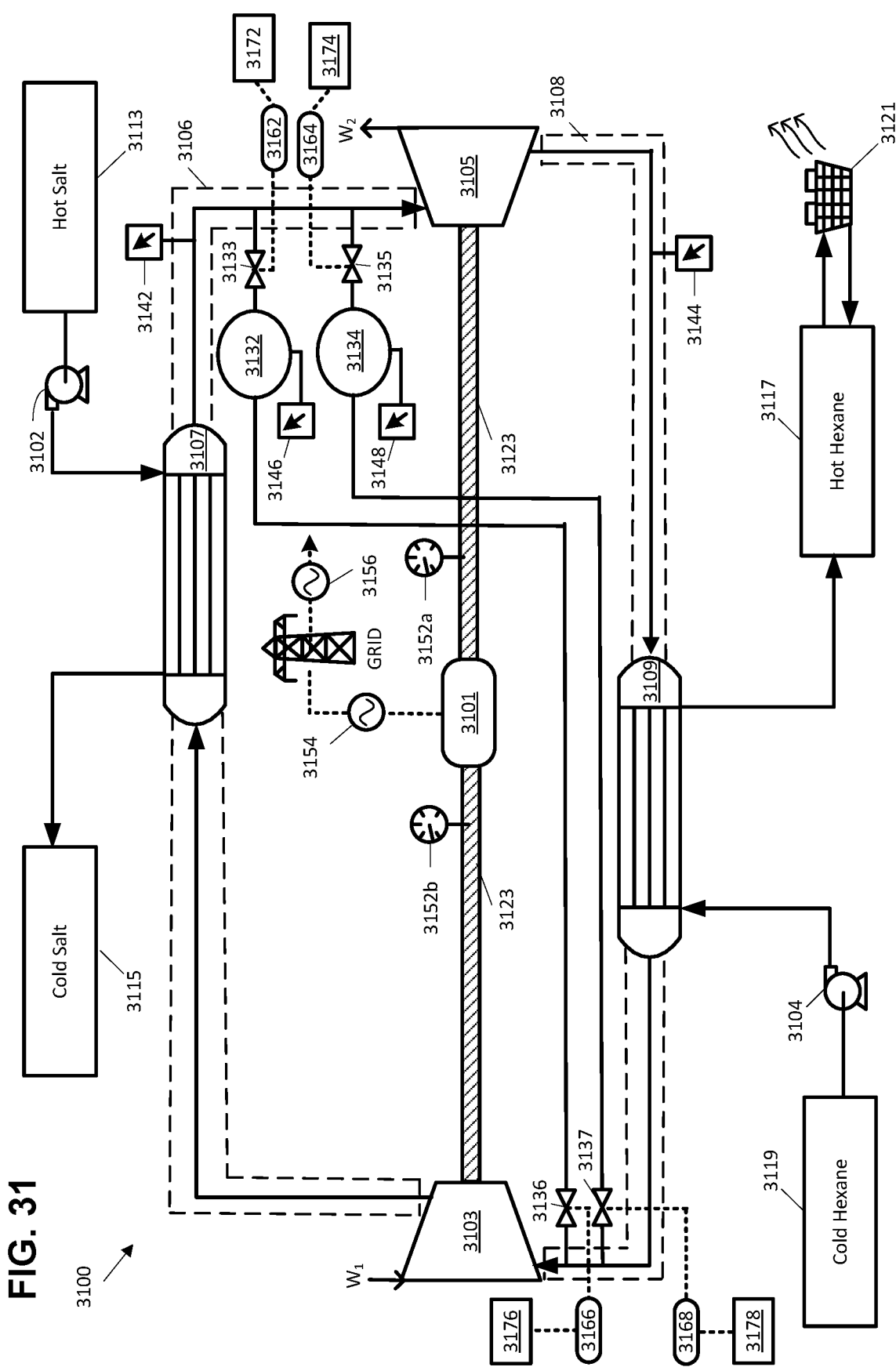
FIG. 31 illustrates a variable pressure inventory control system, according to an example embodiment.
Figure 32:
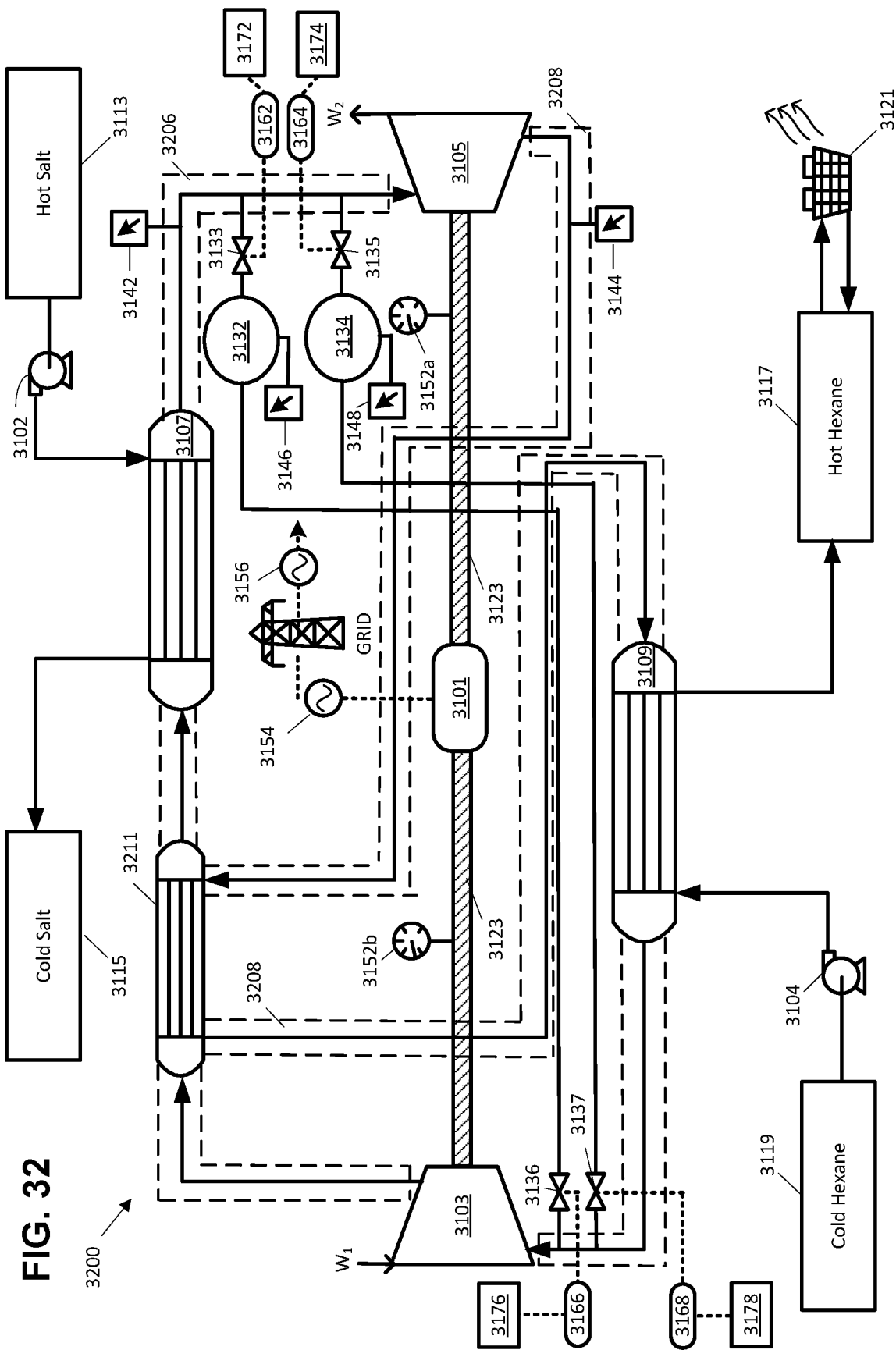
FIG. 32 illustrates a variable pressure inventory control system, according to an example embodiment.

FIGS. 31 and 32 illustrate example closed cycle systems, such as Brayton systems, and include a working fluid flowing through at least a compressor 3103, a hot side heat exchanger 3107, a turbine 3105, and a cold side heat exchanger 3109. A thermal storage medium may flow between hot storage container ("HSC") 3113 and cold storage container ("CSC") 3115 via the hot side heat exchanger 3107. Another thermal storage medium may flow between HSC 3117 and CSC 3119 via the cold side heat exchanger 3109. Fluid paths are as indicated in individual Figures and flow direction of a fluid in a given fluid path are indicated by one or more arrows. Each of the above identified fluids, components, and/or fluid paths may be the same as or similar to previously described closed cycle (e.g., Brayton cycle) elements, such as working fluid 20, compressor 1, hot side heat exchanger 2, turbine 3, cold side heat exchanger 4, HTS medium 21, HTS tank 7, HTS tank 6, CTS medium 22, CTS tank 8, and CTS tank 9. FIGS. 31 and 32 are illustrative only and other fluids, components and/or fluid paths may be present. Some components, such as a hot side or cold side heat exchanger or tanks may be replaced with other components that serve a similar thermal purpose.

FIG. 31 illustrates a variable pressure inventory control system 3100 implemented in a Brayton cycle heat engine. The heat engine may be reversible (i.e., operate as a heat pump) and may take the form of other heat engines and/or reversible heat engines described herein and may include additional components beyond those shown in the illustration. The heat engine may include a generator/motor 3101 that may generate electricity and distribute some or all of the generated electricity to a grid system, including a local, municipal, regional, or national electrical grid. When the heat engine is in a power generation mode (i.e., discharge mode), generator/motor 3101 may also be practically referred to solely as generator, as it may function primarily or entirely as a device for generating electricity. The generator/motor 3101 as illustrated may include an alternator, a high speed alternator, and/or power electronics (e.g., power frequency conversion electronics) for managing, converting, and/or modifying electrical phase, voltage, current, and frequency of generated and/or distributed power. The generator/motor 3101 may be mechanically coupled to the compressor 3103 and the turbine 3105. The compressor 3103 and the turbine 3105 may be coupled to the generator/motor 3101 via one or more shafts 3123. Alternatively, the compressor 3103 and the turbine 3105 may be coupled to the generator/motor 3101 via one or more gearboxes and/or shafts.

The heat engine may include a hot side heat exchanger 3107 coupled downstream from the compressor 3103 and upstream from the turbine 3105. Further, the heat engine may include a cold side heat exchanger 3109 coupled upstream from the compressor 3103 and downstream from the turbine 3105. In the heat engine, a working fluid may circulate through a closed cycle fluid path that includes, in sequence, the compressor 3103, the hot side heat exchanger 3107, the turbine 3105, and the cold side heat exchanger 3109. The closed cycle fluid path may include a high pressure leg 3106 and a low pressure leg 3108. The high pressure leg 3106 may be all or a portion of the closed cycle fluid path downstream from the compressor 3103 and upstream from the turbine 3105. Further, the low pressure leg 3108 may be all or a portion of the closed cycle fluid path upstream from the compressor 3103 and downstream from the turbine 3105. Pressure of working fluid in the high pressure leg 3106 may be greater than pressure of working fluid in the low pressure leg 3108. Non-limiting examples of working fluids include air, argon, carbon dioxide, or gaseous mixtures.

Within the hot side heat exchanger 3107, the working fluid circulating through the closed cycle fluid path may contact a first thermal fluid. Preferably the first thermal fluid may be a molten salt. The hot side heat exchanger 3107 may be a counterflow heat exchanger. The hot HSC 3113 may be coupled to the hot side heat exchanger 3107. Further, the CSC 3115 may be coupled to the hot side heat exchanger

3107. When the heat engine is in the power generation mode, a pump 3102 may pump first thermal fluid from the HSC 3113, through the hot side heat exchanger 3107, and into the CSC 3115. As shown, the pump 3102 is connected between the HSC 3113 and the hot side heat exchanger 3107; however, the pump 3102 may be connected anywhere in the first thermal fluid path, including between the hot side heat exchanger 3107 and the CSC 3115. For example, when the heat engine operates as a heat pump in a power storage mode (i.e., charge mode), a pump, such as pump 3102, may be connected between the hot side heat exchanger 3107 and the CSC 3115 and may pump first thermal fluid from the CSC 3115, through the hot side heat exchanger 3107, and into the HSC 3113. Additionally, the pump 3102 may be a variable speed pump and/or be one or more pumps. Also, as used herein, hot storage and cold storage are used to reflect relative temperatures between storage containers that may share common thermal storage medium and do not necessarily refer to locations within a hot side or a cold side of a heat engine or heat pump.

Within the cold side heat exchanger 3109, the working fluid circulating through the closed cycle fluid path may contact a second thermal fluid, which may be different from the first thermal fluid. Preferably the second thermal fluid may be an alkane, such as hexane. The cold side heat exchanger 3109 may be a counterflow heat exchanger. The CSC 3119 may be coupled to the cold side heat exchanger 3109. Further, the HSC 3117 may be coupled to the cold side heat exchanger 3109. When the heat engine is in the power generation mode, a pump 3104 may pump second thermal fluid from the CSC 3119, through the cold side heat exchanger 3109, and into the HSC 3117. As shown, the pump 3104 is connected between the CSC 3119 and the cold side heat exchanger 3109; however, the pump 3104 may be connected anywhere in the second thermal fluid path, including between the cold side heat exchanger 3109 and the HSC 3117. For example, when the heat engine operates as a heat pump in the power storage mode, a pump, such as pump 3104, may be connected between the cold side heat exchanger 3109 and the HSC 3117 and may pump second thermal fluid from the HSC 3117, through the heat exchanger 3109, and into the CSC 3119. Additionally, the pump 3104 may be a variable speed pump and/or may be one or more pumps. A heat rejection device 3121, for example a cooling tower, may be connected to the HSC 3117 and the second thermal fluid may circulate through the heat rejection device 3121. The heat rejection device 3121 may be used to reject excess heat in the second thermal fluid to another medium, such as atmospheric air. Heat may alternatively or additional be rejected by other means or at other locations within the system, as described herein with reference to other heat engine or reversible heat engine embodiments.

The heat engine may further include at least a high pressure tank 3132 and an intermediate pressure tank 3134. The high pressure leg 3106 may be connected to the high pressure tank 3132 by a hot side valve 3133. Further, the high pressure leg 3106 may be connected to the intermediate pressure tank 3134 by a hot side valve 3135. As shown, the hot side valves 3133 and 3135 are downstream of the hot side heat exchanger 3107 and upstream of the turbine 3105; however, the hot side valves 3133 and 3135 may be connected to the high pressure leg 3106 at other locations, including downstream of the compressor 3103 and upstream of the hot side heat exchanger 3107.

The low pressure leg 3108 may be connected to the high pressure tank 3132 by a cold side valve 3136. Further, the low pressure leg 3108 may be connected to the intermediate pressure tank 3134 by a cold side valve 3137. As shown, the cold side valves 3136 and 3137 are downstream of the cold side heat exchanger 3109 and upstream of the compressor 3103; however, the cold side valves 3133 and 3135 may be connected to the low pressure leg 3108 at other locations, including upstream of the cold side heat exchanger 3109 and downstream of the turbine 3105.

Each of the valves 3133, 3135, 3136, and 3137 may be any suitable valve capable of permitting and blocking flow of working fluid, including a gate valve, globe valve, plug valve, ball valve, butterfly valve, check valve, pinch valve, and diaphragm valve. In some embodiments, the valves 3133, 3135, 3136, and 3137 may each be the same type of valve. However, in other embodiments, at least two of the valves 3133, 3135, 3136, and 3137 may be different types of valves.

Sensors may be located at various locations throughout the heat engine or external to the heat engine. The sensors may be configured to determine and/or report one or more operating conditions within or external to the system. In the example embodiment illustrated in FIG. 31, pressure sensors may be located at or near various inlets and outlets to components within the system. For example, pressure sensor 3142 may determine and report pressure of the working fluid in the high pressure leg 3106, pressure sensor 3144 may determine and report pressure of the working fluid in the low pressure leg 3108, pressure sensor 3146 may determine and report pressure of the working fluid in the high pressure tank 3132, and pressure sensor 3148 may determine and report pressure of the working fluid in the intermediate pressure tank 3134. As illustrative examples, operating conditions may include sensor readings (e.g., pressure of the working in the high pressure leg 3106) and/or a combination of sensor readings, and/or a derived value based on sensor readings (e.g., difference between pressure of the working fluid in the high pressure tank 3132 and pressure of the working fluid in the high pressure leg 3106). In practical application, the illustrated sensors may reflect multiple sensors in a fluid path (e.g., pressure sensor 3142 may be two or more pressure sensors in the high pressure leg 3106).

Alternatively or additionally, other types of sensors that determine and/or report one or more operating conditions of the system may be located throughout the illustrated system. Sensor 3152a may determine and report turbine torque, turbine RPM, generator torque, and/or generator RPM. If shaft 3123 is a common shaft and not a split shaft between turbine 3105 and compressor 3103, then sensor 3152a may also determine and report compressor torque and/or compressor RPM. Alternatively, sensor 3152b may determine and report compressor torque and/or compressor RPM. Sensor 3154 may connect to the generator/motor 3101 and various discrete components included within it, such as alternators and/or power electronics. Sensor 3154 may also connect to an electrical power link between the generator/motor 3101 and the electrical grid to which the generator/motor 3101 is supplying electrical power. Sensor 3154 may determine and report current, voltage, phase, frequency, and/or the quantity of electrical power generated and/or distributed by the generator/motor 3101 and/or its associated discrete components. Sensor 3156 may determine and report the phase of the grid and sensors 3154 and 3156 may together or in combination determine and report a phase difference between the generated electrical power and the grid.

Each of the valves 3133, 3135, 3136, and 3137 may be connected to one or more control devices. For example, the hot side valve 3133 and the cold side valve 3136 may be connected to control devices 3162 and 3166, respectively. The control devices 3162 and 3166 may be configured to operate the valves 3133 and 3136 to control the flow of the working fluid through the high pressure tank 3132. Thus, control device 3162 may be capable of operating the hot side valve 3133 to (i) permit flow of the working fluid from the high pressure leg 3106 to high pressure tank 3132 and (ii) block flow of the working fluid from the high pressure leg 3106 to high pressure tank 3132. Similarly, control device 3166 may be capable of operating the cold side valve 3136 to (i) permit flow of the working fluid from the high pressure tank 3132 to the low pressure leg 3108 and (ii) block flow of the working fluid from the high pressure tank 3132 to the low pressure leg 3108.

Further, the hot side valve 3135 and the cold side valve 3137 may be connected to control devices 3164 and 3168, respectively. The control devices 3164 and 3168 may be configured to operate the valves 3135 and 3137 to control the flow of the working fluid through the intermediate pressure tank 3134. Thus, the control device 3164 may be capable of operating the hot side valve 3135 to (i) permit flow of the working fluid from the high pressure leg 3106 to the intermediate pressure tank 3134 and (ii) block flow of the working fluid from the high pressure leg 3106 to the intermediate pressure tank 3134. Similarly, the control device 3168 may be capable of operating the cold side valve 3137 to (i) permit flow of the working fluid from the intermediate pressure tank 3134 to the low pressure leg 3108 and (ii) block flow of the working fluid from the intermediate pressure tank 3134 to the low pressure leg 3108.

Each of the control devices 3162, 3164, 3166, and 3168 may be in communication with one or more controllers 3172, 3174, 3176, and 3178. Each, some, or all of controllers 3172, 3174, 3176, and 3178 may be separate controllers with independent or coordinated control over the control devices 3162, 3164, 3166, and 3168. Alternatively, each, some, or all controllers 3172, 3174, 3176, and 3178 may be considered a single controller with control over one or more of control devices 3162, 3164, 3166, and 3168. Each of the controllers 3172, 3174, 3176, and 3178 may be capable of directing the one or more control devices 3162, 3164, 3166, and 3168 to operate the valves 3133, 3135, 3136, and 3137 to change an amount of flow of the working fluid. For example, controller 3172 may be capable of issuing an instruction to control device 3162 to open or close the hot side valve 3133 by a specified amount (e.g., open, partially open, closed, partially closed). The controllers 3172, 3174, 3176, and 3178 may be any practical form known in the art, including those commonly used in industrial control systems, such as PLC controllers.

Each of the controllers 3172, 3174, 3176, and 3178 may also be in communication with one or more of the sensors. For clarity of illustration, connections are not shown in FIG. 31 between each of the controllers 3172, 3174, 3176, and 3178 and each of the illustrated sensors with which they may be communicating, but it should be understood that each of the controllers 3172, 3174, 3176, and 3178 may be able to receive sensor data from a relevant sensor. Controllers 3172, 3174, 3176, and 3178 may be in communication with and receive data from the sensors in any practical form, including hardwired electrical data communication, wireless data communication, optical transmission, and/or from intermediary sources, or via other forms known in the art.

Each of the controllers 3172, 3174, 3176, and/or 3178 may be capable of comparing calculated data or data reported from one or more sensors to data reported from one or more other sensors, historical sensor data, internal setpoints, or other comparators. For example, a controller 3172, 3174, 3176, and/or 3178 could compare the reported data from at least two of sensors 3142, 3144, 3146, and 3148. Additionally, the controllers 3172, 3174, 3176, and/or 3178 could determine a phase difference between generated electrical power and grid power by comparing reported data from sensors 3154 and 3156.

A heat engine may further include one or more recuperative heat exchangers (or "recuperators") which may transfer heat between the working fluid at various stages within the closed cycle flow path. FIG. 32 illustrates a variable pressure inventory control system 3200 implemented in a Brayton cycle heat engine. The variable pressure inventory control system 3200 is similar to the variable pressure inventory control system 3100, except that the variable pressure inventory control system 3200 includes a recuperative heat exchanger 3211. Components in the system 3200 with the same reference number as in the system 3100 are of the same configuration and function in a similar manner unless otherwise noted.

Preferably, the recuperative heat exchanger 3211 is a counterflow heat exchanger. As illustrated in the example heat engine in FIG. 32, the recuperative heat exchanger 3211 is thermally contacting the working fluid downstream of the compressor 3103 and upstream of the hot side heat exchanger 3107 with the working fluid downstream of the turbine 3105 and upstream of the cold side heat exchanger 3109, preferably in counterflow. In the system 3200, the working fluid may circulate through a closed cycle fluid path that includes, in sequence, the compressor 3103, the recuperative heat exchanger 3211, the hot side heat exchanger 3107, the turbine 3105, the recuperative heat exchanger 3211 again (in thermal counterflow contact with the prior stream), the cold side heat exchanger 3109, and back to the compressor 3103. Other variations are possible and this stream path is for illustrative purposes only. The closed cycle fluid path may include a high pressure leg 3206 and a low pressure leg 3208. The high pressure leg 3206 may be all or a portion of the closed cycle fluid path downstream from the compressor 3103 upstream from the turbine 3105. Further, the low pressure leg 3208 may be all or a portion of the closed cycle fluid path upstream from the compressor 3103 and downstream from the turbine 3105. Pressure of working fluid in the high pressure leg 3206 may be greater than pressure of working fluid in the low pressure leg 3208.

There may be no recuperative heat exchangers in a heat engine, or there may be more than one recuperative heat exchanger in a heat engine and the one or more recuperative heat exchangers may be located at alternative locations than the location shown within the circulation scheme illustrated in FIG. 32.

A. Example Removal of Working Fluid from the Closed Cycle Fluid Path

In a Brayton cycle system, it may be desirable to remove a quantity of working fluid from the closed cycle fluid path to reduce power of the system. In some embodiments, removing a quantity of working fluid from the closed cycle fluid path may reduce a mass flow rate of the working fluid in the closed cycle fluid path and thereby reduce a speed of a rotating shaft of the compressor and/or a rotating shaft of the turbine. Reducing the speed of the rotating shaft(s) may in turn reduce an amount of electricity generated by the system.

Using the illustration in FIG. 31, a working fluid may be circulated in a closed cycle fluid path that includes, in sequence, the compressor 3103, the hot side heat exchanger 3107, the turbine 3105, and the cold side heat exchanger 3109. The closed cycle fluid path includes the high pressure leg 3106 and the low pressure leg 3108.

1. Example Removal with a Single Pressure Tank

In some implementations, variable pressure inventory control with a single pressure tank, such as the high pressure tank 3132, may be implemented to reduce power output of the system 3100. In one implementation, in the system 3100, where the compression ratio of the compressor 3103 and the turbine 3105 is 5, the high pressure leg 3106 has a nominal (e.g., initial) pressure of 50 bar, the low pressure leg 3108 has a nominal pressure of 10 bar, and the high pressure tank has a nominal pressure of 11 bar, opening the hot side valve 3133 with the other valves 3135, 3136, and 3137 closed, may result in a state of the system 3100 in which pressure of the working fluid in the high pressure leg 3106 may decrease to 25 bar and pressure of the working fluid in the high pressure tank 3132 may increase to 25 bar. Correspondingly, pressure of the working fluid in the lower pressure leg 3108 may decrease to 5 bar. The amount of time for pressures to change in the system 3100 may be based, at least in part, on a ratio of the volume of the high pressure tank 3132 to the volume of the closed cycle fluid path.

Variable pressure inventory control with a single tank has some limitations. For example, a large volume tank may be required to significantly reduce the pressure in the closed cycle fluid path if a large amount of working fluid is circulated. The large volume tank will have to be rated to operate through the entire pressure range of the high pressure leg 3106, and that can be very costly to construct and maintain. Additionally, to use pressure-based (i.e., non-pumped) inventory control from the tank to manage circulating working fluid mass, the operating point of pressure in the high pressure tank 3132 should be between the pressures in the high pressure leg 3106 and low pressure leg 3108.

2. Example Removal with Two Pressure Tanks

Variable pressure inventory control with two pressure tanks, such as the high pressure tank 3132 and the intermediate pressure tank 3134, may be implemented to further and/or more cost effectively reduce power output of the system 3100. Beneficially, variable pressure inventory control with two tanks may improve the range of power outputs at which the system 3100 may operate. In discharge mode, variable pressure inventory control with two tanks may implemented for, among other things, load following and frequency regulation of the electricity generated by the system 3100. And in charge mode, variable pressure inventory control with two tanks may be implemented for, among other things, variable charging of the system 3100.

In an example embodiment, a first quantity of working fluid may be removed from the closed cycle fluid path by opening a first fluid connection between the high pressure leg 3106 and the high pressure tank 3132, such that pressure of the working fluid in the high pressure leg 3106 decreases and pressure of the working fluid in the high pressure tank 3132 increases. Further, the first fluid connection may be closed. Further still, a second quantity of working fluid from the closed cycle fluid path may be removed by opening a second fluid connection between the high pressure leg 3106 and the intermediate pressure tank 3134, such that pressure of the working fluid in the high pressure leg 3106 decreases and pressure of the working fluid in the intermediate pressure tank 3134 increases. In some embodiments, the first fluid connection may take the form of the hot side valve 3133 and the second fluid connection may take the form of the hot side valve 3135. However, in other embodiments, the first fluid connection and/or the second fluid connections may take different forms. For example, the first fluid connection and/or the second fluid connection may be two or more valves arranged in series or parallel. As another example, the first fluid connection and/or the second fluid connection may be one or more other components, including flanges, fittings, couplings, and/or gaskets.

In one implementation, in the system 3100, where the compression ratio of the compressor 3103 and the turbine 3105 is 5, the high pressure leg 3106 has a nominal pressure of 50 bar, the low pressure leg 3108 has a nominal pressure of 10 bar, the high pressure tank has a nominal pressure of 10 bar, and the intermediate pressure tank has nominal pressure of 5 bar, opening the hot side valve 3133 with the other valves 3135, 3136, and 3137 closed, may result in a first state of the system 3100 in which pressure of the working fluid in the high pressure leg 3106 may decrease to 25 bar and pressure of the working fluid in the high pressure tank may 3132 may increase to 25 bar. In the first state, pressure of the working fluid in the low pressure leg 3108 may decrease to 5 bar and pressure of the working fluid in the intermediate pressure tank 3134 may still be at be 5 bar. Then, closing the hot side valve 3133 and opening the hot side valve 3135 with the other valves 3136 and 3137 closed may result in a second state of the system 3100 in which pressure of the working fluid in the high pressure leg 3106 may decrease to 10 bar and pressure of the working fluid in the intermediate pressure tank 3134 may increase to 10 bar. In the second state, pressure of the working fluid in the low pressure leg 3108 may decrease to 2 bar and pressure of the working fluid in the high pressure tank 3132 may still be at 25 bar.

The control devices 3162 and 3164 may operate the hot side valve 3133 and the hot side valve 3135, respectively. In some implementations, the hot side valve 3133 may be closed by the control device 3162 when pressure of the working fluid in the high pressure tank 3132 reaches a first threshold pressure value. The first threshold pressure value may be defined in a variety of ways. In some embodiments, the first threshold pressure value may be defined as an equilibrium pressure between pressure of the working fluid in the high pressure leg 3106 and pressure of the working fluid in the high pressure tank 3132. Further, in some embodiments, the first threshold pressure value may be defined as a pressure less than an equilibrium pressure between pressure of the working fluid in the high pressure leg 3106 and pressure of the working fluid in the high pressure tank 3132. Moreover, in some embodiments, controller 3172 may determine an operating condition of the system 3100 and the first threshold pressure value may be defined based on the determined operating condition. The first threshold pressure value may be defined based on any of the operating conditions described above, including turbine torque, turbine RPM, generator torque, and generator RPM; and current, voltage, phase, frequency, and/or quantity of electrical power generated and/or distributed by the generator and/or its discrete components. Additionally, in some implementations, the hot side valve 3135 may be opened by the control device 3164 in response to the control device 3162 closing the hot side valve 3133.

Further, in some implementations, the hot side valve 3135 may be closed by the control device 3164 when pressure of the working fluid in the intermediate pressure tank 3134 reaches a second threshold pressure value. The second threshold pressure value may be defined in a similar manner as the first threshold pressure is defined. In some embodiments, the second threshold pressure value may be defined as an equilibrium pressure between pressure of the working fluid in the high pressure leg 3106 and pressure of the working fluid in the intermediate pressure tank 3134. Further, in some embodiments, the second threshold pressure value may be defined as a pressure less than an equilibrium pressure between pressure of the working fluid in the high pressure leg 3106 and pressure of the working fluid in the intermediate pressure tank 3134. Moreover, in some embodiments, controller 3174 may determine an operating condition of the system 3100 and the second threshold pressure value may be defined based on the determined operating condition. The second threshold pressure value may be defined based on any of the operating conditions that the first threshold pressure value is defined.

In another example embodiment, the hot side valve 3133 may be closed by the control device 3162 when pressure of the working fluid reaches the first threshold pressure value. Pressure sensors 3142, 3144, 3146, and/or 3148 may determine and report to controller 3172 pressures of the working fluid in the system 3100. The controller 3172 may, based on at least one of the operating conditions reported by the sensors, direct the control device 3162 to close the hot side valve 3133. In some embodiments, the hot side valve 3133 may be closed when pressure of the working fluid in the high pressure leg 3106 reaches the first threshold pressure value. Moreover, in some embodiments, the hot side valve 3133 may be closed when pressure of the working fluid in the low pressure leg 3108 reaches the first threshold pressure value. Further, in some embodiments, the hot side valve 3133 may be closed when pressure of the working fluid in the high pressure tank 3132 reaches the first threshold pressure value. Additionally, the hot side valve 3133 may be closed by the control device 3162 when a derived pressure of the working fluid reaches the first threshold pressure value. The derived pressure may be any combination of pressure of the working fluid in the high pressure leg 3106, pressure of the working fluid in the low pressure leg 3108, pressure of the working fluid in the high pressure tank 3132, and pressure of the working fluid in the intermediate pressure tank 3134.

In another example embodiment, the hot side valve 3135 may be closed by the control device 3164 when pressure of the working fluid reaches the second threshold pressure value. Pressure sensors 3142, 3144, 3146, and/or 3148 may determine and report to controller 3174 pressures of the working fluid in the system 3100. The controller 3174 may, based on at least one of the operating conditions reported by the sensors, direct the control device 3164 to close the hot side valve 3135. In some embodiments, the hot side valve 3135 may be closed when pressure of the working fluid in the high pressure leg 3106 reaches the second threshold pressure value. Moreover, in some embodiments, the hot side valve 3135 may be closed when pressure of the working fluid in the low pressure leg 3108 reaches the second threshold pressure value. Additionally, the hot side valve 3135 may be closed by the control device 3164 when a derived pressure of the working fluid reaches the second threshold pressure value. The derived pressure may be any combination of pressure of the working fluid in the high pressure leg 3106, pressure the working fluid in the low pressure leg 3108, pressure of the working fluid in the high pressure tank 3132, and pressure of the working fluid in the intermediate pressure tank 3134.

While example removal of working fluid from the closed cycle fluid path has been described above with reference to system 3100, working fluid may be removed from the closed cycle fluid path of system 3200 as well. The working fluid may be removed from the closed cycle fluid path of system 3200 in a similar manner as the working fluid is removed from the closed cycle fluid path in the system 3100.

B. Example Addition of Working Fluid to the Closed Cycle Fluid Path

In a Brayton cycle system, it may be desirable to add a quantity of working fluid to the closed cycle fluid path to increase power of the heat engine. For example, it may be desirable to add a quantity of working fluid back to the closed cycle fluid path that was previously removed from the closed cycle fluid path.

In some embodiments, adding a quantity of working fluid to the closed cycle path may increase a mass flow rate of the working fluid in the closed cycle path and thereby increase a speed of and/or increase the torque applied on a rotating shaft of the compressor and/or a rotating shaft of the turbine. Increasing the speed of the rotating shaft(s) and/or increasing the torque applied may in turn increase an amount of electricity generated by the system. In variable pressure inventory control embodiments described herein, removing a quantity of working fluid from the closed cycle fluid path and adding the quantity of working fluid back to the closed cycle fluid path may be reversible processes.

Using the illustration in FIG. 31, a working fluid may be circulated a closed cycle fluid path that includes, in sequence, the compressor 3103, the hot side heat exchanger 3107, the turbine 3105, and the cold side heat exchanger 3109. The closed cycle fluid path includes the high pressure leg 3106 and the low pressure leg 3108.

In an example embodiment, a first quantity of working fluid may be added to the closed cycle fluid path by opening a first fluid connection between the low pressure leg 3108 and the intermediate pressure tank 3134, where the intermediate pressure tank 3134 contains working fluid at a first storage pressure greater than a pressure of the working fluid in the low pressure leg 3108, such that pressure of the working fluid in the low pressure leg 3108 increases and pressure of the working fluid in the intermediate pressure tank 3134 decreases. Further, the first fluid connection may be closed. Further still, a second quantity of working fluid may be added to the closed cycle fluid path by opening a second fluid connection between the low pressure leg 3108 and the high pressure tank 3132, where the high pressure tank 3132 contains working fluid at a second storage pressure greater than the first storage pressure and greater than pressure of the working fluid in the low pressure leg 3108, such that pressure of the working fluid in the low pressure leg 3108 increases and pressure of the working fluid in the high pressure tank 3132 decreases. In some embodiments, the first fluid connection may take the form of the cold side valve 3137 and the second fluid connection may take the form of the cold side valve 3136. However, in other embodiments, the first fluid connection and/or the second fluid connections may take different forms. For example, the first fluid connection and/or the second fluid connections may be two or more valves arranged in series or parallel. As another example, the first fluid connection and/or the second fluid connection may be one or more other components, including flanges, fittings, couplings, and/or gaskets.

For example, in the system 3100, where the compression ratio of the compressor 3103 and the turbine 3105 is 5, the high pressure leg 3106 has a nominal pressure of 10 bar, the low pressure leg 3108 has a nominal pressure of 2 bar, the high pressure tank 3132 has a nominal pressure of 25 bar, and the intermediate pressure tank has nominal pressure of 10 bar, opening the cold side valve 3137 with the other valves 3133, 3135, and 3136 closed may result in a first state of the system 3100 in which pressure of the working fluid in the low pressure leg 3108 may increase to 5 bar and pressure of the working fluid in the intermediate pressure tank may 3134 may decrease to 5 bar. In the first state, pressure of the working fluid in the high pressure leg 3106 may increase to 25 bar and pressure in the high pressure tank 3132 may be 25 bar. Then, closing the cold side valve 3137 and opening the cold side valve 3136 with the other valves 3133 and 3135 closed may result in a second state of the system 3100 in which pressure of the working fluid in the low pressure leg 3108 may increase to 10 bar and pressure of the working fluid in the high pressure tank 3132 may decrease to 10 bar. In the second state, pressure of the working fluid in the high pressure leg 3106 may increase to 50 bar and pressure of the working fluid in the intermediate pressure tank 3134 may be 5 bar.

The control devices 3166 and 3168 may operate the cold side valve 3136 and the cold side valve 3137, respectively. In some implementations, the cold side valve 3137 may be closed by the control device 3168 when pressure of the working fluid in the intermediate pressure tank 3134 reaches a first threshold pressure value. The first threshold pressure value may be defined in a variety of ways. In some embodiments, the first threshold pressure value may be defined as an equilibrium pressure between pressure of the working fluid in the low pressure leg 3108 and pressure of the working fluid in the intermediate pressure tank 3134. Further, in some embodiments, the first threshold pressure value may be defined as a pressure less than an equilibrium pressure between pressure of the working fluid in the low pressure leg 3108 and pressure of the working fluid in the intermediate pressure tank 3134. Moreover, in some embodiments, controller 3178 may determine an operating condition of the system 3100 and the first threshold pressure value may be defined based on the determined operating condition. The first threshold pressure value may be defined based on any of the operating conditions described above, including turbine torque, turbine RPM, generator torque, and generator RPM; and current, voltage, phase, frequency, and/or quantity of electrical power generated and/or distributed by the generator and/or its discrete components. Additionally, in some implementations, the cold side valve 3136 may be opened by the control device 3166 in response to the control device 3168 closing the cold side vale 3137.

Further, in some implementations, the cold side valve 3136 may be closed by the control device 3166 when pressure of the working fluid in the high pressure tank 3132 reaches a second threshold pressure value. The second threshold pressure value may be defined in a similar manner as the first threshold pressure value is defined. In some embodiments, the second threshold pressure value may be defined as an equilibrium pressure between pressure of the working fluid in the low pressure leg 3108 and pressure of the working fluid in the high pressure tank 3132. Further, in some embodiments, the second threshold pressure value may be defined as a pressure less than an equilibrium pressure between pressure of the working fluid in the low pressure leg 3108 and pressure of the working fluid in the high pressure tank 3132. Moreover, in some embodiments, controller 3176 may determine an operating condition of the system 3100 and the second threshold pressure value may be defined based on the determined operating condition. The second threshold pressure value may be defined based on any of the operating conditions that the first threshold pressure value is defined.

In another example embodiment, the cold side valve 3137 may be closed by the control device 3168 when pressure of the working fluid reaches the first threshold pressure value.

Pressure sensors 3142, 3144, 3146, and/or 3148 may determine and report to controller 3178 pressures of the working fluid in the system 3100. The controller 3178 may, based on at least one of the operating conditions reported by the sensors, direct the control device 3168 to close the cold side valve 3137. In some embodiments, the cold side valve 3137 may be closed when pressure of the working fluid in the high pressure leg 3106 reaches the first threshold pressure value. Moreover, in some embodiments, the cold side valve 3137 may be closed when pressure of the working fluid in the low pressure leg 3108 reaches the first threshold pressure value. Further, in some embodiments, the cold side valve 3137 may be closed when pressure of the working fluid in the intermediate pressure tank 3134 reaches the first threshold pressure value. Additionally, the cold side valve 3137 may be closed by the control device 3168 when a derived pressure of the working fluid reaches the first threshold pressure value. The derived pressure may be any combination of pressure of the working fluid in the high pressure leg 3106, pressure the working fluid in the low pressure leg 3108, pressure of the working fluid in the high pressure tank 3132, and pressure of the working fluid in the intermediate pressure tank 3134.

In another example embodiment, the cold side valve 3136 may be closed by the control device 3166 when pressure of the working fluid reaches the second threshold pressure value. Pressure sensors 3142, 3144, 3146, and/or 3148 may determine and report to controller 3176 pressures of the working fluid in the system 3100. The controller 3176 may, based on at least one of the operating conditions reported by the sensors, direct the control device 3166 to close the cold side valve 3136. In some embodiments, the cold side valve 3136 may be closed when pressure of the working fluid in the high pressure leg 3106 reaches the second threshold pressure value. Moreover, in some embodiments, the cold side valve 3136 may be closed when pressure of the working fluid in the low pressure leg 3108 reaches the second threshold pressure value. Further, in some embodiments, the cold side valve 3136 may be closed when pressure of the working fluid in the intermediate pressure tank 3134 reaches the second threshold pressure value. Additionally, the cold side valve 3136 may be closed by the control device 3166 when a derived pressure of the working fluid reaches the second threshold pressure value. The derived pressure may be any combination of pressure of the working fluid in the high pressure leg 3106, pressure the working fluid in the low pressure leg 3108, pressure of the working fluid in the high pressure tank 3132, and pressure of the working fluid in the intermediate pressure tank 3134.

While example addition of working fluid to the closed cycle fluid path has been described above with reference to system 3100, working fluid may be added to the closed cycle fluid path of system 3200 as well. The working fluid may be added to the closed cycle fluid path of system 3200 in a similar manner as the working fluid is added to the closed cycle fluid path in the system 3100.

While first and second threshold pressure values are described above in both example removal of working fluid to the closed cycle fluid and example addition of working fluid to the closed cycle fluid path, the first and second threshold pressure values may be different. In some embodiments, at least one threshold pressure value related to removal of working fluid to the closed cycle path may be different than at least one threshold pressure value related to addition of working fluid to the closed cycle fluid path.

C. Quiescent Mode

Referring back to FIG. 31, the illustrated heat engine is illustrated in power generation mode. As discussed with respect to FIGS. 1-5 and FIGS. 13-18, Brayton cycle systems may operate in charge or discharge modes, where discharge mode is generally consistent with converting stored thermal energy into a substantial quantity of electrical energy for distribution to a grid or other significant power user and charge mode is generally consistent with storing substantial amounts of thermal energy in the system for later use. However, the Brayton cycle system may also operate in quiescent mode, where the system is neither producing a significant quantity of electrical energy nor storing a significant amount of thermal energy.

Non-operating pumps and/or turbo machinery in a quiescent mode will cause the temperature profile in a Brayton cycle heat exchanger to be significantly different than the desired temperature profile when the heat exchanger is operating in a charge or discharge mode. This difference can lead to long ramp-up times for a Brayton cycle system to come online and begin providing or accepting energy. It may also lead to additional thermal stresses upon temperature change. Beneficially, variable pressure inventory control described herein can be implemented to run the compressor and the turbine at a very low speed(s) to "leak" heat into or out of the heat exchangers to maintain a desired temperature profile in the heat exchangers that allows a fast transition to optimum operation in charge or discharge modes. For example, a power system may be operated in a quiescent mode such that the cycle is operated at a level sufficient to circulate working and/or thermal fluids, but is effectively generating no or negligible net electrical power. In the quiescent mode, variable pressure control inventory control described herein can be implemented to maintain desired mass flow rate in the closed cycle fluid path such that when the system transitions to, for example, discharge mode, the heat exchangers are already at or near operating temperatures. In that manner, cutover from quiescent to discharge modes may take very little time, for example, less than 15 seconds.

D. Variable Pressure Inventory Control with Three or More Pressure Tanks

Although examples described above involve variable pressure inventory control with two tanks, in other examples variable pressure inventory control may be implemented in Brayton cycle systems that include three or more pressure tanks. Variable pressure inventory control with three or more pressure tanks may be similar in form to variable pressure inventory control with the high pressure tank and the intermediate pressure tank described above.

In some implementations, working fluid may be removed from the closed cycle fluid path by opening a respective fluid connection between each tank of the three or more pressure tanks and a high pressure leg of the closed cycle fluid path, such that pressure of the working fluid in the high pressure leg decreases and pressure of the working fluid in each tank of the three or more pressure tanks increases. In some implementations, opening the respective fluid connections between each tank of the three or more pressure tanks and the high pressure leg of the closed cycle fluid path may involve opening each of the fluid connections sequentially and after pressure has increased in another pressure tank.

Further, in some implementations, working fluid may be added to the closed cycle fluid path by opening a respective fluid connection between each tank of the three or more pressure tanks and a low pressure leg of the closed cycle fluid path, wherein each tank contains working fluid at a respective storage pressure greater than pressure of the working fluid in the low pressure leg, such that pressure of the working fluid in the low pressure leg increases and pressure of the working fluid in each tank of the three or more pressure tanks decreases.

III. Illustrative Methods

Figure 33:
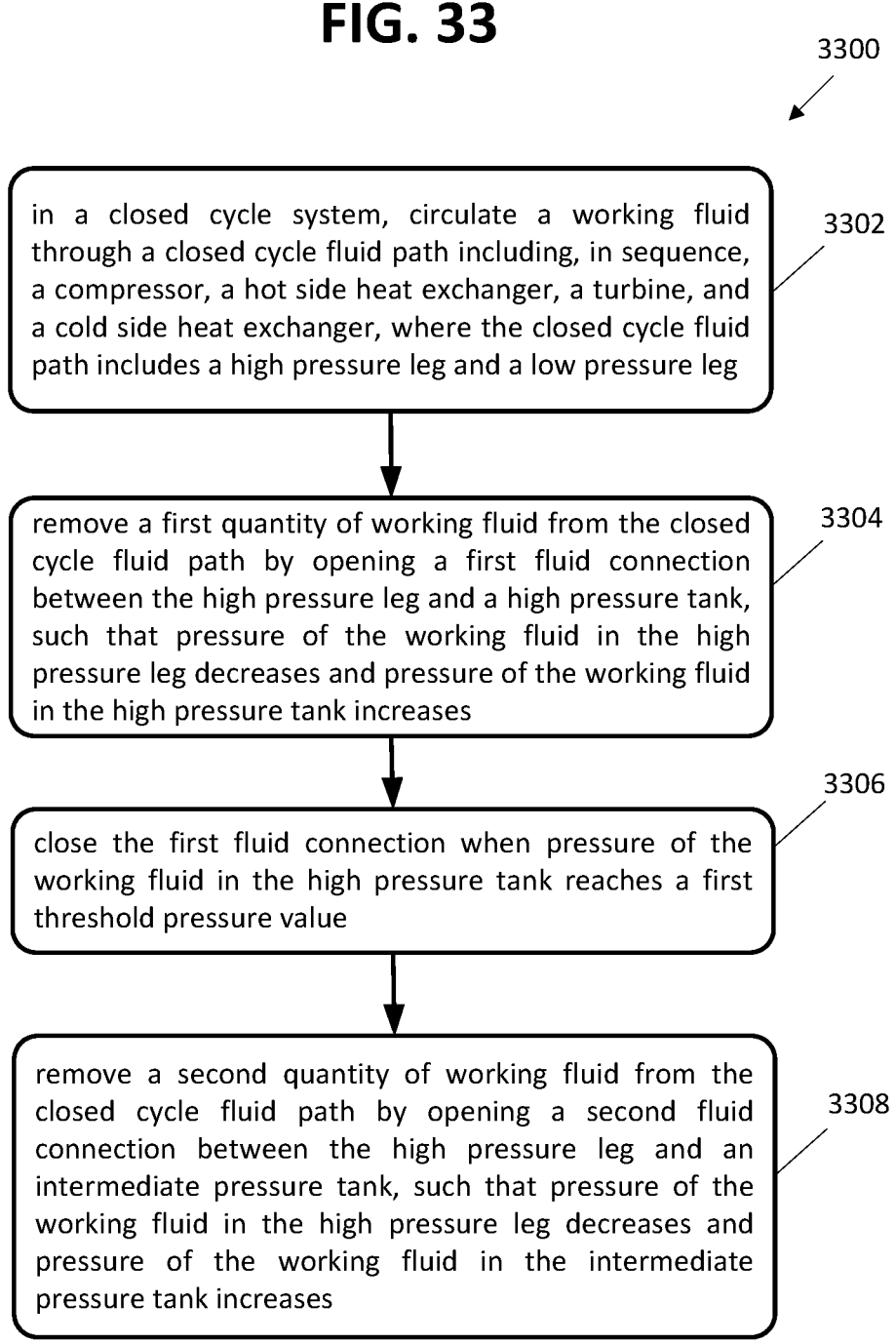
FIG. 33 illustrates a variable pressure inventory control method, according to an example embodiment.

FIG. 33 is a flow chart illustrating a method 3300 of variable pressure inventory control, according to an example embodiment. Illustrative methods, such as the method 3300, may be carried out in whole or in part by a component or components of a closed cycle system, such as the system 3100 and the system 3200.

As shown by block 3302, the method 3300 may involve in a closed cycle system, circulating a working fluid through a closed cycle fluid path including, in sequence, a compressor, a hot side heat exchanger, a turbine, and a cold side heat exchanger. The closed cycle fluid path may include a high pressure leg and a low pressure leg.

As shown by block 3304, the method 3300 may involve removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases.

As shown by block 3306, the method 3330 may involve closing the first fluid connection when pressure of the working fluid in the high pressure tank reaches a first threshold pressure value.

As shown by block 3308, the method 3300 may involve removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

In some embodiments, the closed cycle system may include a closed Brayton cycle system. Moreover, in some embodiments, the first threshold pressure value may be defined as an equilibrium pressure between pressure of the working fluid in the high pressure leg and pressure of the working fluid in the high pressure tank. Further, in some embodiments, the first threshold pressure value may be defined as a pressure less than an equilibrium pressure between pressure of the working fluid in the high pressure leg and pressure of the working fluid in the high pressure tank.

Further, in some embodiments, the method 3300 may further involve operating the closed cycle system in a power generation mode, where a generator coupled to the turbine produces electrical power; determining an operating condition of the power generation system; and defining the first threshold pressure value based on the determination of the operating condition of the power generation system.

Further still, in some embodiments, the method 3300 may further involve closing the second fluid connection when pressure of the working fluid in the intermediate pressure tank reaches a second threshold pressure value. In some embodiments, the second threshold pressure value may be defined as an equilibrium pressure between pressure of the working fluid in the high pressure leg and pressure of the working fluid in the intermediate pressure tank. Moreover, in some embodiments, the second threshold pressure value may be defined as a pressure less than an equilibrium pressure between pressure of the working fluid in the high pressure leg and pressure of the working fluid in the intermediate pressure tank. Further, in some embodiments, the method 3300 may further involve operating the closed cycle system in a power generation mode, wherein a generator coupled to the turbine produces electrical power; determining an operating condition of the power generation system; and defining the second threshold pressure value based on the determination of the operating condition of the power generation system.

Figure 34:
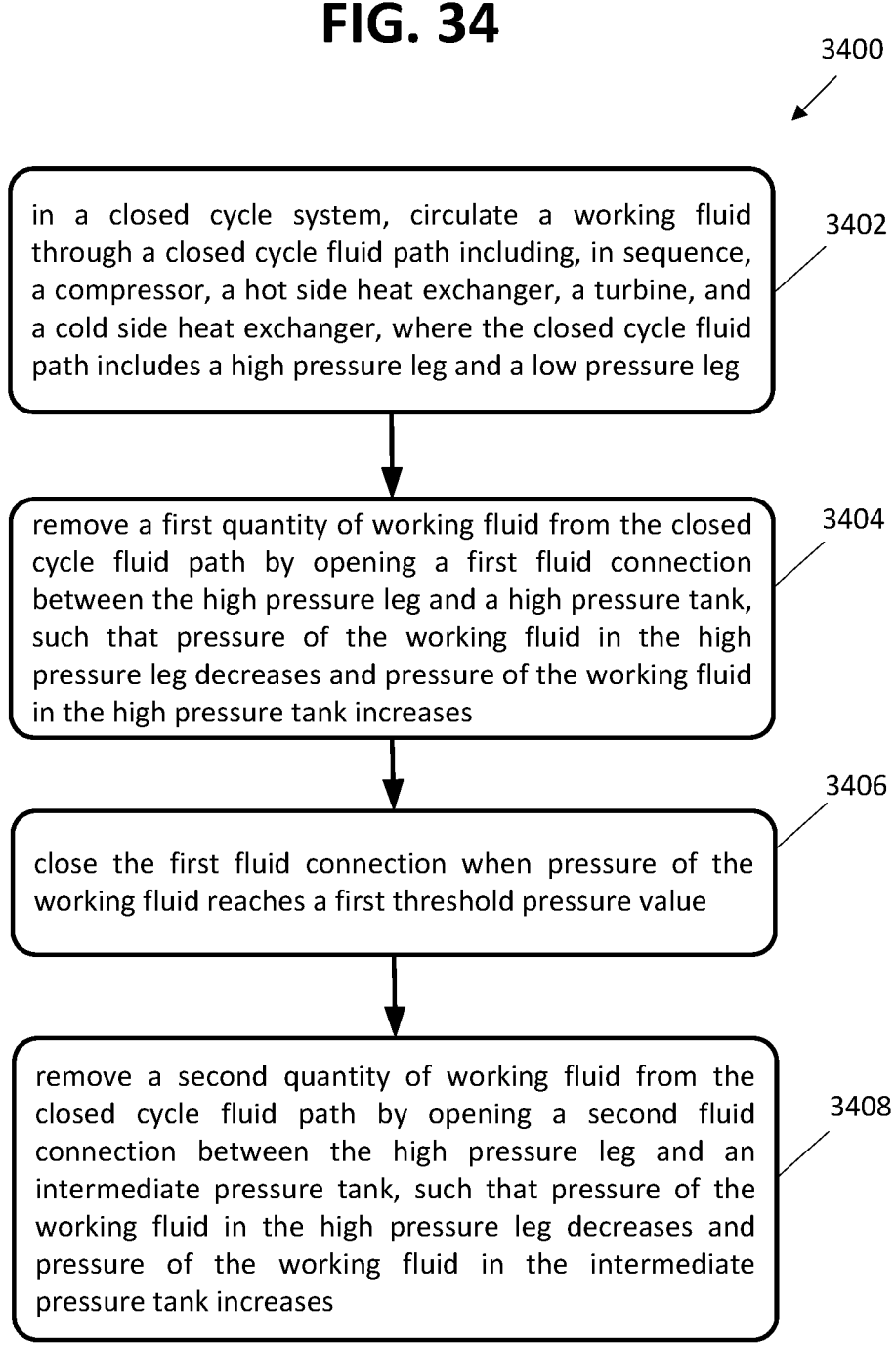
FIG. 34 illustrates a variable pressure inventory control method, according to an example embodiment.

FIG. 34 is a flow chart of illustrating a method 3400 of variable pressure inventory control, according to an example embodiment. The method 3400 may be carried out in whole or in part by a component or components of a closed cycle system, such as the system 3100 and the system 3200.

As shown by block 3402, the method 3400 may involve in a closed cycle system, circulating a working fluid through a closed cycle fluid path including, in sequence, a compressor, a hot side heat exchanger, a turbine, and a cold side heat exchanger. The closed cycle fluid path may include a high pressure leg and a low pressure leg.

As shown by block 3404, the method 3400 may involve removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases.

As shown by block 3406, the method 3400 may involve closing the first fluid connection when pressure of the working fluid reaches a first threshold pressure value.

As shown by block 3408, the method 3400 may involve removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

In some embodiments, closing the first fluid connection may involve closing the first fluid connection when pressure of the working fluid in the high pressure leg reaches the first threshold pressure value. Moreover, in some embodiments, closing the first fluid connection may involve closing the first fluid connection when pressure of the working fluid in the low pressure leg reaches the first threshold pressure value.

Figure 35:
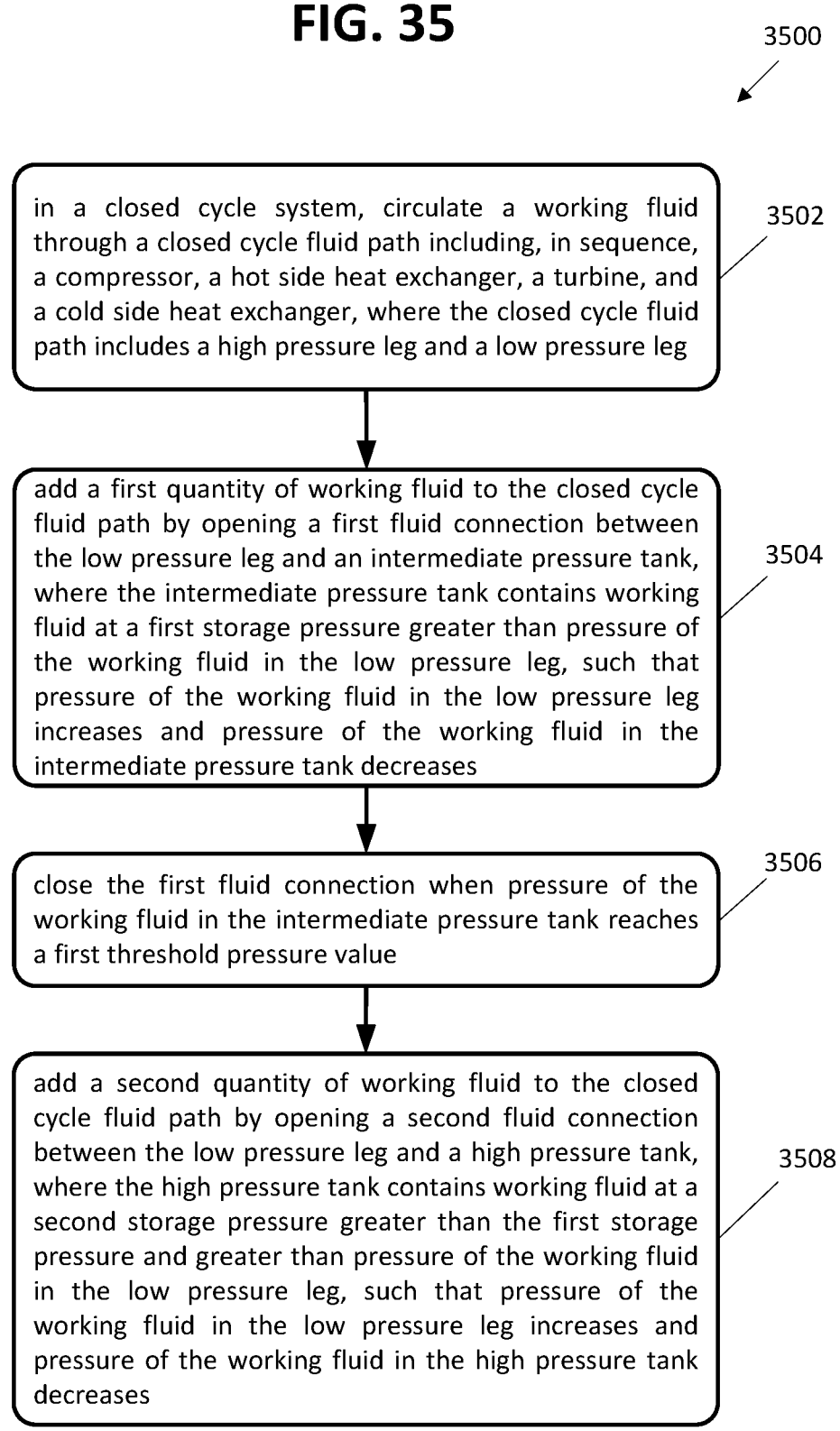
FIG. 35 illustrates a variable pressure inventory control method, according to an example embodiment.

FIG. 35 is a flow chart illustrating a method 3500 of variable pressure inventory control, according to an example embodiment. The method 3500 may be carried out in whole or in part by a component or components of a closed cycle system, such as the system 3100 and the system 3200.

As shown by block 3502, the method 3500 may involve in a closed cycle system, circulating a working fluid through a closed cycle fluid path including, in sequence, a compressor, a hot side heat exchanger, a turbine, and a cold side heat exchanger. The closed cycle fluid path may include a high pressure leg and a low pressure leg.

As shown by block 3504, the method 3500 may involve adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases.

As shown by block 3506, the method 3500 may involve closing the first fluid connection when pressure of the working fluid in the intermediate pressure tank reaches a first threshold pressure value.

As shown by block 3508, the method 3500 may involve adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

In some embodiments, the first threshold pressure value may be defined as an equilibrium pressure between pressure of the working fluid in the low pressure leg and pressure of the working fluid in the intermediate pressure tank. Moreover, in some embodiments, the first threshold pressure value may be defined as a pressure higher than an equilibrium pressure between pressure of the working fluid in the low pressure leg and pressure of the working fluid in the intermediate pressure tank.

Further, in some embodiments, the method 3500 may further involve operating the closed cycle system in a power generation mode, wherein a generator coupled to the turbine produces electrical power; determining an operating condition of the power generation system; and defining the first threshold pressure value based on the determination of the operating condition of the power generation system.

Further still, in some embodiments, the method 3500 may further involve closing the second fluid connection when pressure of the working fluid in the high pressure tank reaches a second threshold pressure value. In some embodiments, the second threshold pressure value may be defined as an equilibrium pressure between pressure of the working fluid in the low pressure leg and pressure of the working fluid in the high pressure tank. Moreover, in some embodiments, the second threshold pressure value may be defined as a pressure higher than an equilibrium pressure between pressure of the working fluid in the low pressure leg and pressure of the working fluid in the high pressure tank. Further, the method 3500 may further involve operating the closed cycle system in a power generation mode, wherein a generator coupled to the turbine produces electrical power; determining an operating condition of the power generation system; and defining the second threshold pressure value based on the determination of the operating condition of the power generation system.

Figure 36:
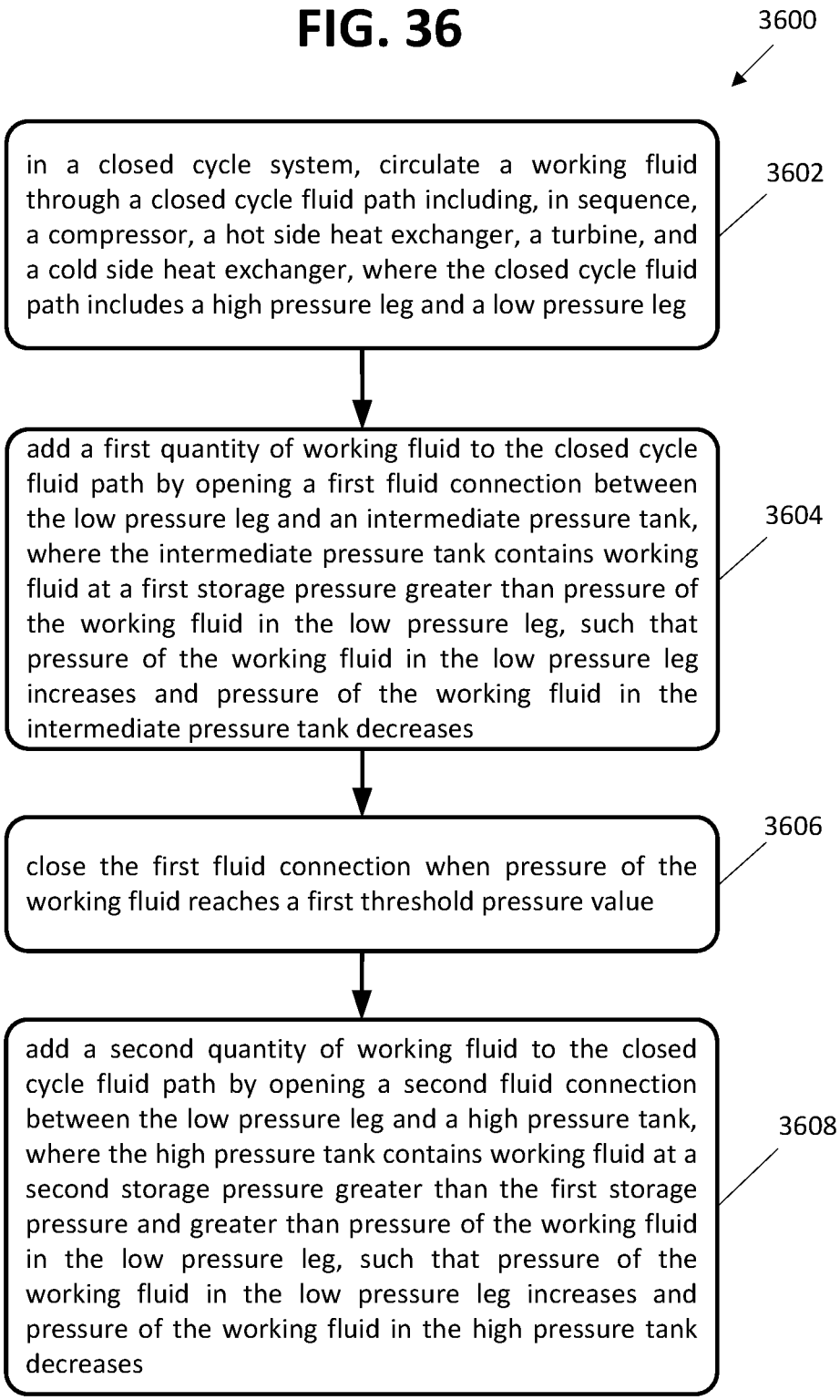
FIG. 36 illustrates a variable pressure inventory control method, according to an example embodiment.

FIG. 36 is a flow chart illustrating a method 3600 of variable pressure inventory control, according to an example embodiment. The method 3600 may be carried out in whole or in part by a component or components of a closed cycle system, such as the system 3100 and the system 3200.

As shown by block 3602, the method 3600 may involve in a closed cycle system, circulating a working fluid through a closed cycle fluid path including, in sequence, a compressor, a hot side heat exchanger, a turbine, and a cold side heat exchanger. The closed cycle fluid path may include a high pressure leg and a low pressure leg.

As shown by block 3604, the method 3600 may involve adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases.

As shown by block 3606, the method 3600 may involve closing the first fluid connection when pressure of the working fluid reaches a first threshold pressure value.

As shown by block 3608, the method 3600 may involve adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

In some embodiments, closing the first fluid connection may involve closing the first fluid connection when pressure of the working fluid in the high pressure leg reaches the first threshold pressure value. Moreover, in some embodiments, closing the first fluid connection may involve closing the first fluid connection when pressure of the working fluid in the low pressure leg reaches the first threshold pressure value.

IV. Illustrative Non-Transitory Computer Readable Media

Some or all of the functions described above and illustrated in FIGS. 33-36 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be the computer system 1901 as described and illustrated in FIG. 30.

The non-transitory computer readable medium may store instructions executable by a processor (e.g., CPU 1905) to perform various functions. The functions may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; closing the first fluid connection when pressure of the working fluid in the high pressure tank reaches a first threshold pressure value; and removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Moreover, the functions may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; removing a first quantity of working fluid from the closed cycle fluid path by opening a first fluid connection between the high pressure leg and a high pressure tank, such that pressure of the working fluid in the high pressure leg decreases and pressure of the working fluid in the high pressure tank increases; closing the first fluid connection when pressure of the working fluid reaches a first threshold pressure value; and removing a second quantity of working fluid from the closed cycle fluid path by opening a second fluid connection between the high pressure leg and an intermediate pressure tank, such that pressure of the working fluid in the high pressure leg decreases and pressure of the working fluid in the intermediate pressure tank increases.

Further, the functions may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; closing the first fluid connection when pressure of the working fluid in the intermediate pressure tank reaches a first threshold pressure value; and adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

Further still, the functions may include in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg; adding a first quantity of working fluid to the closed cycle fluid path by opening a first fluid connection between the low pressure leg and an intermediate pressure tank, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases; closing the first fluid connection when pressure of the working fluid reaches a first threshold pressure value; and adding a second quantity of working fluid to the closed cycle fluid path by opening a second fluid connection between the low pressure leg and a high pressure tank, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg, wherein the closed cycle system comprises (i) a first fluid connection between the high pressure leg and a high pressure tank and connected to the high pressure leg between an outlet of the hot side heat exchanger and an inlet of the turbine and (ii) a second fluid connection between the high pressure leg and an intermediate pressure tank and connected to the high pressure leg between the outlet of the hot side heat exchanger and the inlet of the turbine, and wherein the closed cycle system is configured to cycle between a charge mode and a discharge mode;
   determining an operating condition of the closed cycle system;
   defining a first threshold pressure value based on the determination of the operating condition of the closed cycle system;
   removing a first quantity of working fluid from the closed cycle fluid path by opening the first fluid connection, such that pressure of the working fluid in the high pressure leg decreases and pressure of the working fluid in the high pressure tank increases;
   closing the first fluid connection when pressure of the working fluid in the high pressure tank reaches the first threshold pressure value; and
   removing a second quantity of working fluid from the closed cycle fluid path by opening the second fluid connection, such that pressure of the working fluid in the high pressure leg decreases and pressure of the working fluid in the intermediate pressure tank increases.

2. The method of claim 1, wherein the first threshold pressure value is defined as an equilibrium pressure between pressure of the working fluid in the high pressure leg and pressure of the working fluid in the high pressure tank.

3. The method of claim 1, wherein the first threshold pressure value is defined as a pressure less than an equilibrium pressure between pressure of the working fluid in the high pressure leg and pressure of the working fluid in the high pressure tank.

4. The method of claim 1, further comprising closing the second fluid connection when pressure of the working fluid in the intermediate pressure tank reaches a second threshold pressure value.

5. The method of claim 4, wherein the second threshold pressure value is defined as an equilibrium pressure between pressure of the working fluid in the high pressure leg and pressure of the working fluid in the intermediate pressure tank.

6. The method of claim 4, wherein the second threshold pressure value is defined as a pressure less than an equilibrium pressure between pressure of the working fluid in the high pressure leg and pressure of the working fluid in the intermediate pressure tank.

7. The method of claim 4, further comprising:
   determining a second operating condition of the closed cycle system; and
   defining the second threshold pressure value based on the determination of the second operating condition of the closed cycle system.

8. A method comprising:
   in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg, wherein the closed cycle system comprises (i) a first fluid connection between the high pressure leg and a high pressure tank and connected to the high pressure leg between an outlet of the hot side heat exchanger and an inlet of the turbine and (ii) a second fluid connection between the high pressure leg and an intermediate pressure tank and connected to the high pressure leg between the outlet of the hot side heat exchanger and the inlet of the turbine, and wherein the closed cycle system is configured to cycle between a charge mode and a discharge mode;
   determining an operating condition of the closed cycle system;
   defining a first threshold pressure value based on the determination of the operating condition of the closed cycle system;
   removing a first quantity of working fluid from the closed cycle fluid path by opening the first fluid connection, such that pressure of the working fluid in the high pressure leg decreases and pressure of the working fluid in the high pressure tank increases;
   closing the first fluid connection when pressure of the working fluid reaches the first threshold pressure value; and
   removing a second quantity of working fluid from the closed cycle fluid path by opening the second fluid connection, such that pressure of the working fluid in the high pressure leg decreases and pressure of the working fluid in the intermediate pressure tank increases.

9. The method of claim 8, wherein closing the first fluid connection comprises closing the first fluid connection when pressure of the working fluid in the high pressure leg reaches the first threshold pressure value.

10. The method of claim 8, wherein closing the first fluid connection comprises closing the first fluid connection when pressure of the working fluid in the low pressure leg reaches the first threshold pressure value.

11. A method comprising:
    in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg, wherein the closed cycle system comprises (i) a first fluid connection between the low pressure leg and the intermediate pressure tank and connected to the low pressure leg between an outlet of the cold side heat exchanger and an inlet of the compressor and (ii) a second fluid connection between the low pressure leg and the high pressure tank and connected to the low pressure leg between the outlet of the cold side heat exchanger and the inlet of the compressor, and wherein the closed cycle system is configured to cycle between a charge mode and a discharge mode;

determining an operating condition of the closed cycle system;

defining a first threshold pressure value based on the determination of the operating condition of the closed cycle system;

adding a first quantity of working fluid to the closed cycle fluid path by opening the first fluid connection, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases;

closing the first fluid connection when pressure of the working fluid in the intermediate pressure tank reaches the first threshold pressure value; and adding a second quantity of working fluid to the closed cycle fluid path by opening the second fluid connection, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

12. The method of claim 11, wherein the first threshold pressure value is defined as an equilibrium pressure between pressure of the working fluid in the low pressure leg and pressure of the working fluid in the intermediate pressure tank.

13. The method of claim 11, wherein the first threshold pressure value is defined as a pressure higher than an equilibrium pressure between pressure of the working fluid in the low pressure leg and pressure of the working fluid in the intermediate pressure tank.

14. The method of claim 11, further comprising closing the second fluid connection when pressure of the working fluid in the high pressure tank reaches a second threshold pressure value.

15. The method of claim 14, wherein the second threshold pressure value is defined as an equilibrium pressure between pressure of the working fluid in the low pressure leg and pressure of the working fluid in the high pressure tank.

16. The method of claim 14, wherein the second threshold pressure value is defined as a pressure higher than an equilibrium pressure between pressure of the working fluid in the low pressure leg and pressure of the working fluid in the high pressure tank.

17. The method of claim 14, further comprising:

determining a second operating condition of the closed cycle system; and defining the second threshold pressure value based on the determination of the second operating condition of the closed cycle system.

18. A method comprising:

in a closed cycle system, circulating a working fluid through a closed cycle fluid path including, in sequence, a compressor, a hot side heat exchanger, a turbine, and a cold side heat exchanger, wherein the closed cycle fluid path comprises a high pressure leg and a low pressure leg, wherein the closed cycle system comprises (i) a first fluid connection between the low pressure leg and the intermediate pressure tank and connected to the low pressure leg between an outlet of the cold side heat exchanger and an inlet of the compressor and (ii) a second fluid connection between the low pressure leg and the high pressure tank and connected to the low pressure leg between the outlet of the cold side heat exchanger and the inlet of the compressor, and wherein the closed cycle system is configured to cycle between a charge mode and a discharge mode;

determining an operating condition of the closed cycle system;

defining a first threshold pressure value based on the determination of the operating condition of the closed cycle system;

adding a first quantity of working fluid to the closed cycle fluid path by opening the first fluid connection, wherein the intermediate pressure tank contains working fluid at a first storage pressure greater than pressure of the working fluid in the low pressure leg, such that pressure of the working fluid in the low pressure leg increases and pressure of the working fluid in the intermediate pressure tank decreases;

closing the first fluid connection when pressure of the working fluid reaches the first threshold pressure value; and adding a second quantity of working fluid to the closed cycle fluid path by opening the second fluid connection, wherein the high pressure tank contains working fluid at a second storage pressure greater than the first storage pressure and greater than pressure of the working fluid in the low pressure leg, such that pressure of the working fluid in the low pressure leg increases and pressure of the working fluid in the high pressure tank decreases.

19. The method of claim 18, wherein closing the first fluid connection comprises closing the first fluid connection when pressure of the working fluid in the high pressure leg reaches the first threshold pressure value.

20. The method of claim 18, wherein closing the first fluid connection comprises closing the first fluid connection when pressure of the working fluid in the low pressure leg reaches the first threshold pressure value.

* * * * *